US012647201B2

(12) United States Patent
Lee et al.

(10) Patent No.: US 12,647,201 B2
(45) Date of Patent: Jun. 2, 2026

(54) OUTER CODING HEADER FOR RAN-BASED NETWORK CODING

(71) Applicant: QUALCOMM Incorporated, San Diego, CA (US)

(72) Inventors: Hyun Yong Lee, San Diego, CA (US); Prashanth Haridas Hande, San Diego, CA (US); Sitaramanjaneyulu Kanamarlapudi, San Diego, CA (US); Jelena Damnjanovic, Del Mar, CA (US); Peerapol Tinnakornsrisuphap, San Diego, CA (US); Mickael Mondet, Louannec (FR); Diana Maamari, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 73 days.

(21) Appl. No.: 18/513,434

(22) Filed: Nov. 17, 2023

(65) Prior Publication Data

US 2025/0096926 A1     Mar. 20, 2025

Related U.S. Application Data

(60) Provisional application No. 63/583,135, filed on Sep. 15, 2023.

(51) Int. Cl.
H04L 1/00 (2006.01)
H04L 5/00 (2006.01)

(52) U.S. Cl.
CPC ............. H04L 1/004 (2013.01); H04L 5/0055 (2013.01)

(58) Field of Classification Search
CPC .............................. H04L 1/004; H04L 5/0055
See application file for complete search history.

(56) References Cited

U.S. PATENT DOCUMENTS

2007/0147542 A1    6/2007   Schmidt et al.
2017/0041100 A1*   2/2017   Xie ...................... H04L 1/0076
(Continued)

FOREIGN PATENT DOCUMENTS

WO      2022016488 A1     1/2022
WO      2022016501 A1     1/2022
(Continued)

OTHER PUBLICATIONS

Rivera Y., et al., "Fulcrum Rateless Multicast Distributed Coding Design", IEEE Access, vol. 11, May 1, 2023, 12 Pages.
(Continued)

*Primary Examiner* — Guerrier Merant
*Assistant Examiner* — Jack Kensington Barnett
(74) *Attorney, Agent, or Firm* — Procopio, Cory, Hargreaves & Savitch LLP

(57)     ABSTRACT

Aspects presented herein may improve the latency and power consumption for communications by enabling a wireless device to apply outer coding (OC) (with forward error correction (FEC)) to transmission(s). In one aspect, a wireless device segments each packet data convergence protocol (PDCP) packet in a plurality of PDCP packets into a set of OC symbols, where the plurality of PDCP packets corresponds to a packet data unit (PDU) set. The wireless device assembles multiple sets of OC symbols into an OC block. The wireless device applies an FEC encoding to the OC block. The wireless device outputs the OC block based on the FEC encoding. In some examples, the wireless device also adds an OC header to the OC block, where the OC header includes a symbol size, a set of source symbols, and/or a symbol index associated with the FEC encoding.

25 Claims, 29 Drawing Sheets

(56)        References Cited

U.S. PATENT DOCUMENTS

2019/0081746 A1*    3/2019    Han ...................... H04L 1/1896
2019/0104424 A1*    4/2019    Hariharan ............. H04L 1/1621
2021/0176345 A1*    6/2021    Urman ................... H04L 69/22
2021/0282220 A1*    9/2021    Hori ...................... H04W 80/08

FOREIGN PATENT DOCUMENTS

WO        2022056807 A1    3/2022
WO        2022122159 A1    6/2022
WO        2023028802 A1    3/2023

OTHER PUBLICATIONS

International Search Report and Written Opinion—PCT/US2024/043891—ISA/EPO—Dec. 12, 2024.
Tesema F., et al., "Layer 2 FEC in 5G Broadcast / Multicast Networks", NOMOR Research GmbH, Munich, Germany, Aug. 29, 2018, pp. 1-26, XP055505817, abstract, sections III, IV.

* cited by examiner

**Example FEC Code Structure
(e.g., an Application-level FEC)**

Source Symbols (K)  ~804

Example recovery probability of FEC code
(n = received symbols)
1. n < K → 0
2. n ≥ K → 1 / 256^(n-K)

Parity Symbols  ~806

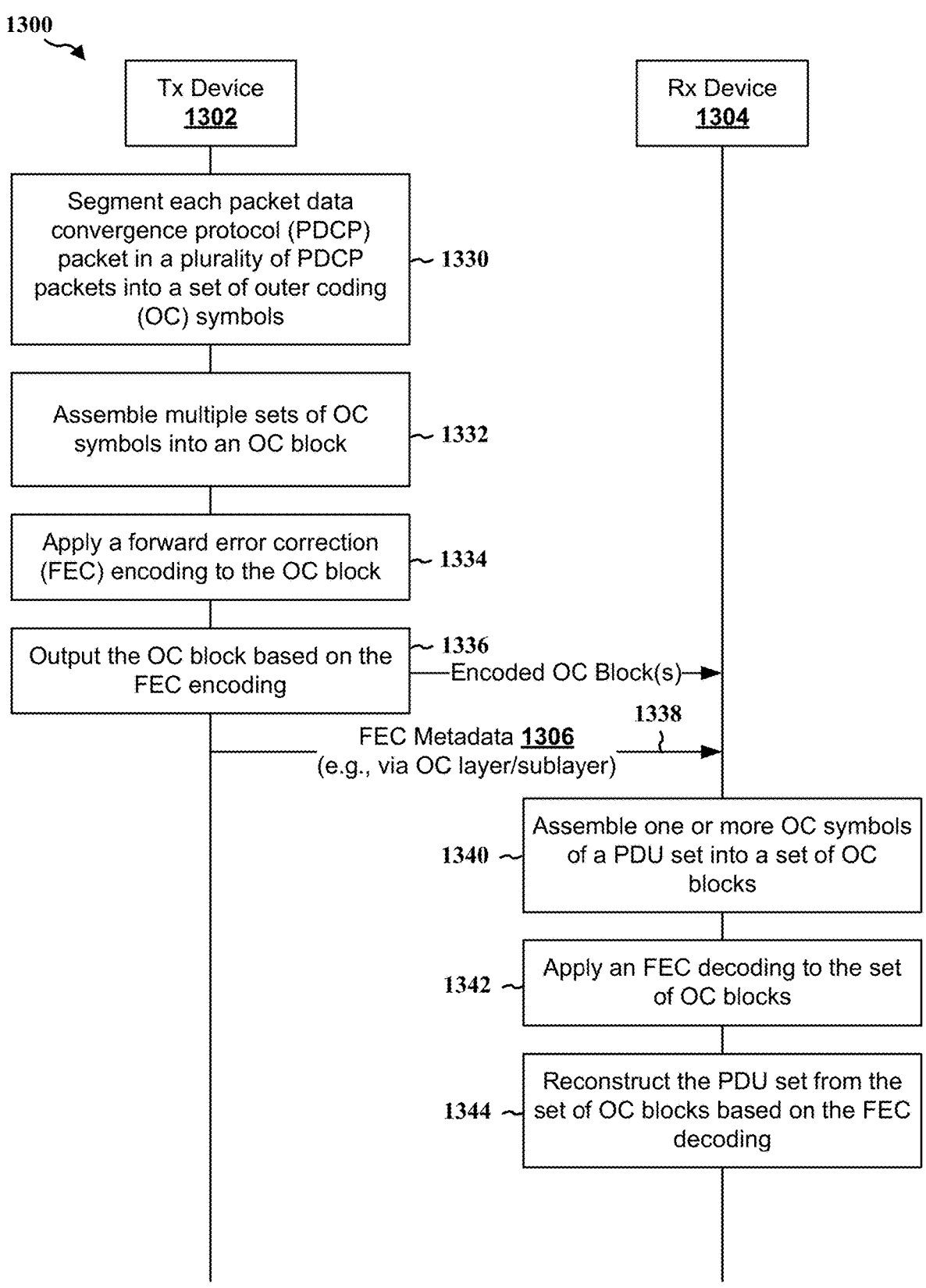

Tx Device
1302

Segment each packet data convergence protocol (PDCP) packet in a plurality of PDCP packets into a set of outer coding (OC) symbols ~ 1330

Assemble multiple sets of OC symbols into an OC block ~ 1332

Apply a forward error correction (FEC) encoding to the OC block ~ 1334

~ 1336
Output the OC block based on the FEC encoding

—Encoded OC Block(s)—▶

Rx Device
1304

FEC Metadata 1306
(e.g., via OC layer/sublayer)

1338

Assemble one or more OC symbols of a PDU set into a set of OC blocks 1340 ~

Apply an FEC decoding to the set of OC blocks 1342 ~

Reconstruct the PDU set from the set of OC blocks based on the FEC decoding 1344 ~

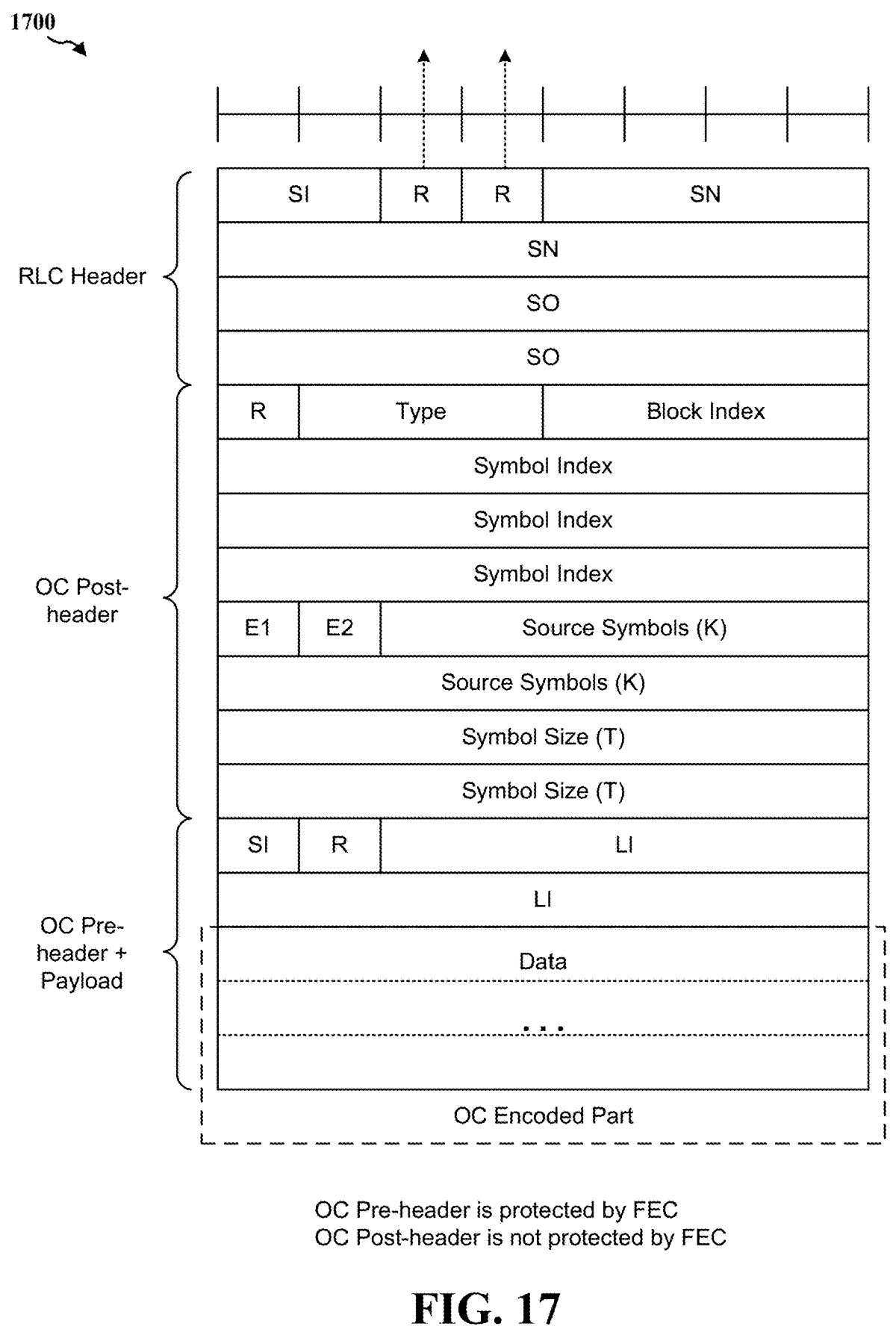

| SI | R | R | SN |
|---|---|---|---|
| SN | | | |
| SO | | | |
| SO | | | |
| R | Type | | Block Index |
| Symbol Index | | | |
| Symbol Index | | | |
| Symbol Index | | | |
| E1 | E2 | Source Symbols (K) | |
| Source Symbols (K) | | | |
| Symbol Size (T) | | | |
| Symbol Size (T) | | | |
| SI | R | LI | |
| LI | | | |
| Data | | | |
| . . . | | | |
| OC Encoded Part | | | |

RLC Header

OC Post-header

OC Pre-header + Payload

OC Pre-header is protected by FEC
OC Post-header is not protected by FEC

FIG. 17

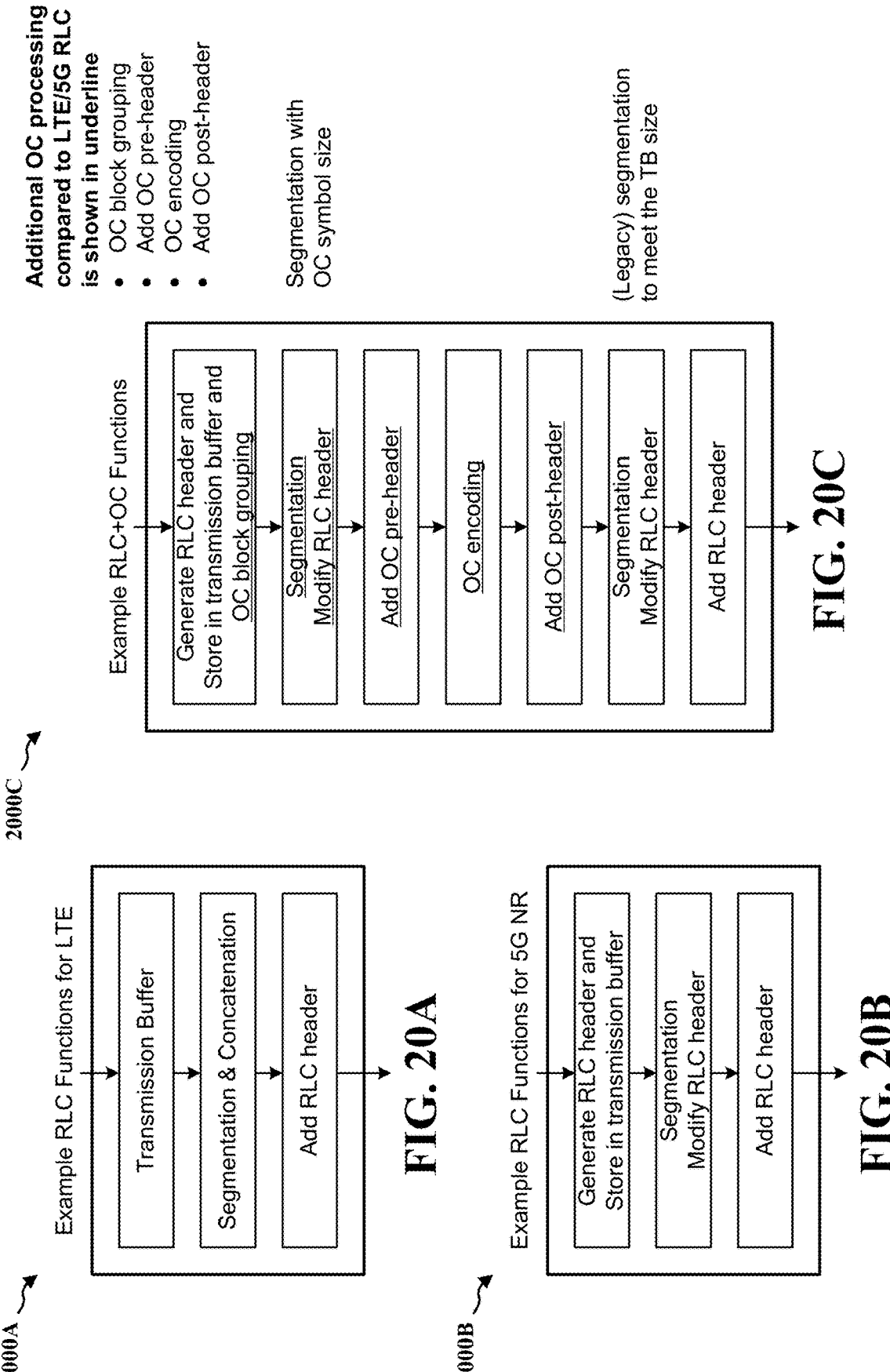

Additional OC processing compared to LTE/5G RLC is shown in underline
- OC block grouping
- Add OC pre-header
- OC encoding
- Add OC post-header Segmentation with OC symbol size (Legacy) segmentation to meet the TB size

2000C

Example RLC+OC Functions

Generate RLC header and Store in transmission buffer and <u>OC block grouping</u>

Segmentation <u>Modify RLC header</u>

<u>Add OC pre-header</u>

<u>OC encoding</u>

<u>Add OC post-header</u>

Segmentation Modify RLC header

Add RLC header

Example RLC Functions for LTE

Transmission Buffer

Segmentation & Concatenation

Add RLC header

Example RLC Functions for 5G NR

Generate RLC header and Store in transmission buffer

Segmentation Modify RLC header

Add RLC header

Segment each packet data convergence protocol (PDCP) packet in a plurality of PDCP packets into a set of outer coding (OC) symbols - the plurality of PDCP packets corresponds to a packet data unit (PDU) set

2104

Assemble multiple sets of OC symbols into an OC block

2106

Apply a forward error correction (FEC) encoding to the OC block

2108

Output the OC block based on the FEC encoding

2200

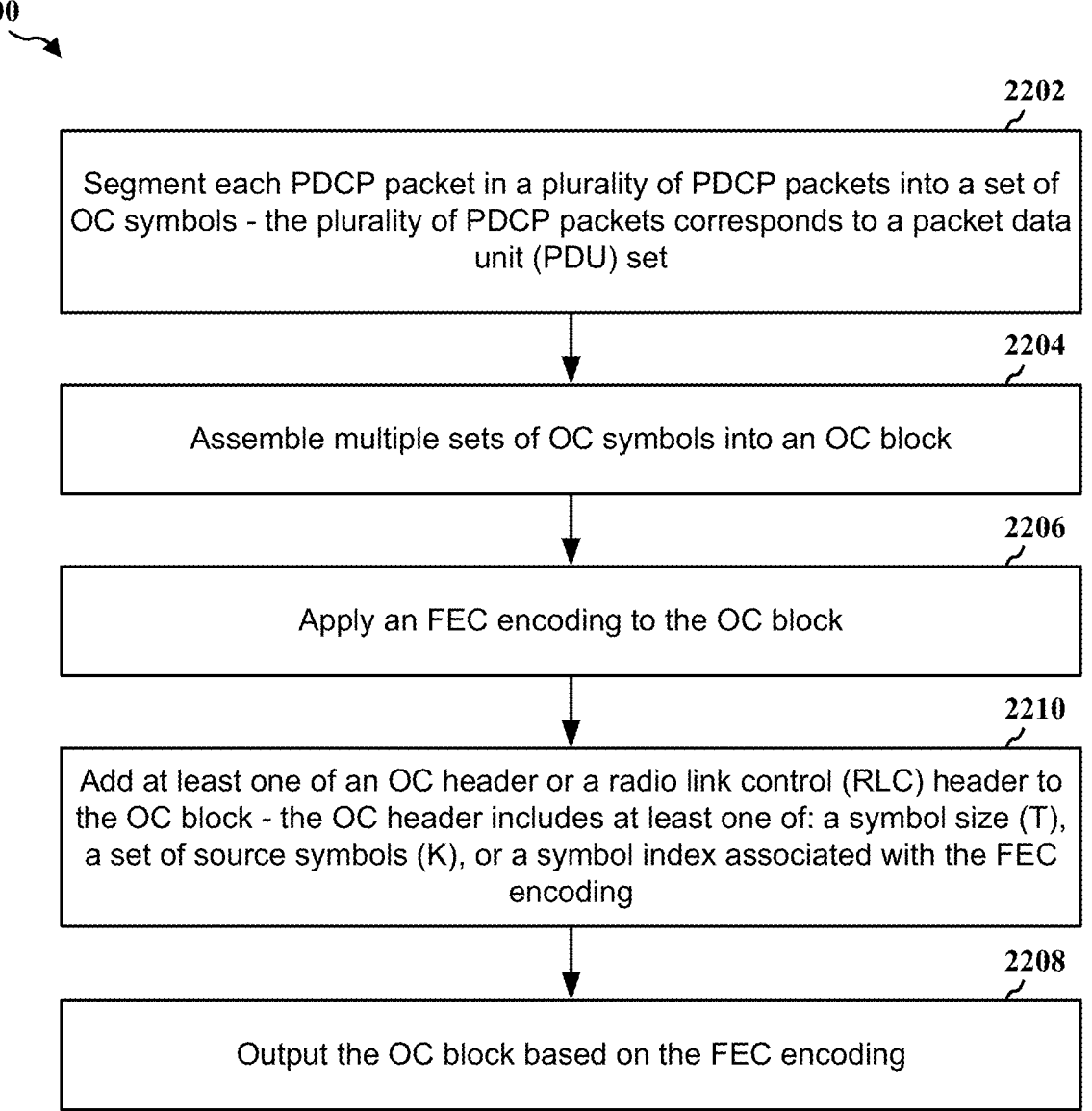

2202

Segment each PDCP packet in a plurality of PDCP packets into a set of OC symbols - the plurality of PDCP packets corresponds to a packet data unit (PDU) set

2204

Assemble multiple sets of OC symbols into an OC block

2206

Apply an FEC encoding to the OC block

2210

Add at least one of an OC header or a radio link control (RLC) header to the OC block - the OC header includes at least one of: a symbol size (T), a set of source symbols (K), or a symbol index associated with the FEC encoding

2208

Output the OC block based on the FEC encoding

Memory
2444

Transceiver(s)
2446

Antennas
2480

RU Processor(s)
2442

Component
199

Memory 2442'

Communications
Interface
2448

2402

Midhaul
Link

Fronthaul
Link

2410

Memory
2414

Communications
Interface
2418

CU Processor(s)
2412

Component
199

Memory 2412'

2430

Memory
2434

Communications
Interface
2438

DU Processor(s)
2432

Component
199

Memory 2432'

2400

2500

2502

Assemble one or more OC symbols of a PDU set into a set of OC blocks, where the PDU set includes a plurality of PDCP packets - each PDCP packet in the plurality of PDCP packets includes a set of OC symbols

2504

Apply an FEC decoding to the set of OC blocks

2506

Reconstruct the PDU set from the set of OC blocks based on the FEC decoding

OUTER CODING HEADER FOR RAN-BASED NETWORK CODING

CROSS REFERENCE TO RELATED APPLICATION(S)

This application claims the benefit of and priority to U.S. Provisional Application Ser. No. 63/583,135, entitled "OUTER CODING HEADER FOR RAN-BASED NET-WORK CODING" and filed on Sep. 15, 2023, which is expressly incorporated by reference herein in its entirety.

TECHNICAL FIELD

The present disclosure relates generally to communication systems, and more particularly, to a wireless communication involving outer coding (OC).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

As wireless communication may be interrupted from time to time, it may be common for a receiving device to request a transmitting device to retransmit certain data packets that have not been received successfully by the receiving device. However, while retransmission of data packets may correct packet error(s), the retransmission may degrade the latency and power consumption between the receiving device and the transmitting device. Thus, the retransmission mechanism may not be suitable for applications that specify short latency period and/or low power consumption.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus segments each packet data convergence protocol (PDCP) packet in a plurality of PDCP packets into a set of outer coding (OC) symbols, where the plurality of PDCP packets corresponds to a packet data unit (PDU) set. The apparatus assembles multiple sets of OC symbols into an OC block. The apparatus applies a forward error correction (FEC) encoding to the OC block. The apparatus outputs the OC block based on the FEC encoding.

In an aspect of the disclosure, a method, a computer-readable medium, and an apparatus are provided. The apparatus assembles one or more OC symbols of a PDU set into a set of OC blocks, where the PDU set includes a plurality of PDCP packets, where each PDCP packet in the plurality of PDCP packets includes a set of OC symbols. The apparatus applies an FEC decoding to the set of OC blocks. The apparatus reconstructs the PDU set from the set of OC blocks based on the FEC decoding.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11B is a diagram illustrating an example of decoding an OC block with FEC in accordance with various aspects of the present disclosure.

FIG. 12B is a diagram illustrating an example of decoding an OC block with FEC in accordance with various aspects of the present disclosure.

FIG. 13 is a communication flow illustrating an example communication between wireless devices based on FEC and OC block(s) in accordance with various aspects of the present disclosure.

FIG. 15 is a diagram illustrating an example RLC segmentation in accordance with various aspects of the present disclosure.

FIG. 17 is a diagram illustrating an example of an OC block with FEC metadata in accordance with various aspects of the present disclosure.

FIG. 20A is a diagram illustrating an example of RLC functions for Long Term Evolution (LTE) in accordance with various aspects of the present disclosure.

FIG. 20B is a diagram illustrating an example of RLC functions for 5G New Radio (NR) in accordance with various aspects of the present disclosure.

FIG. 20C is a diagram illustrating an example of RLC and OC functions in accordance with various aspects of the present disclosure.

FIG. 22 is a flowchart of a method of wireless communication.

DETAILED DESCRIPTION

Figure 1:
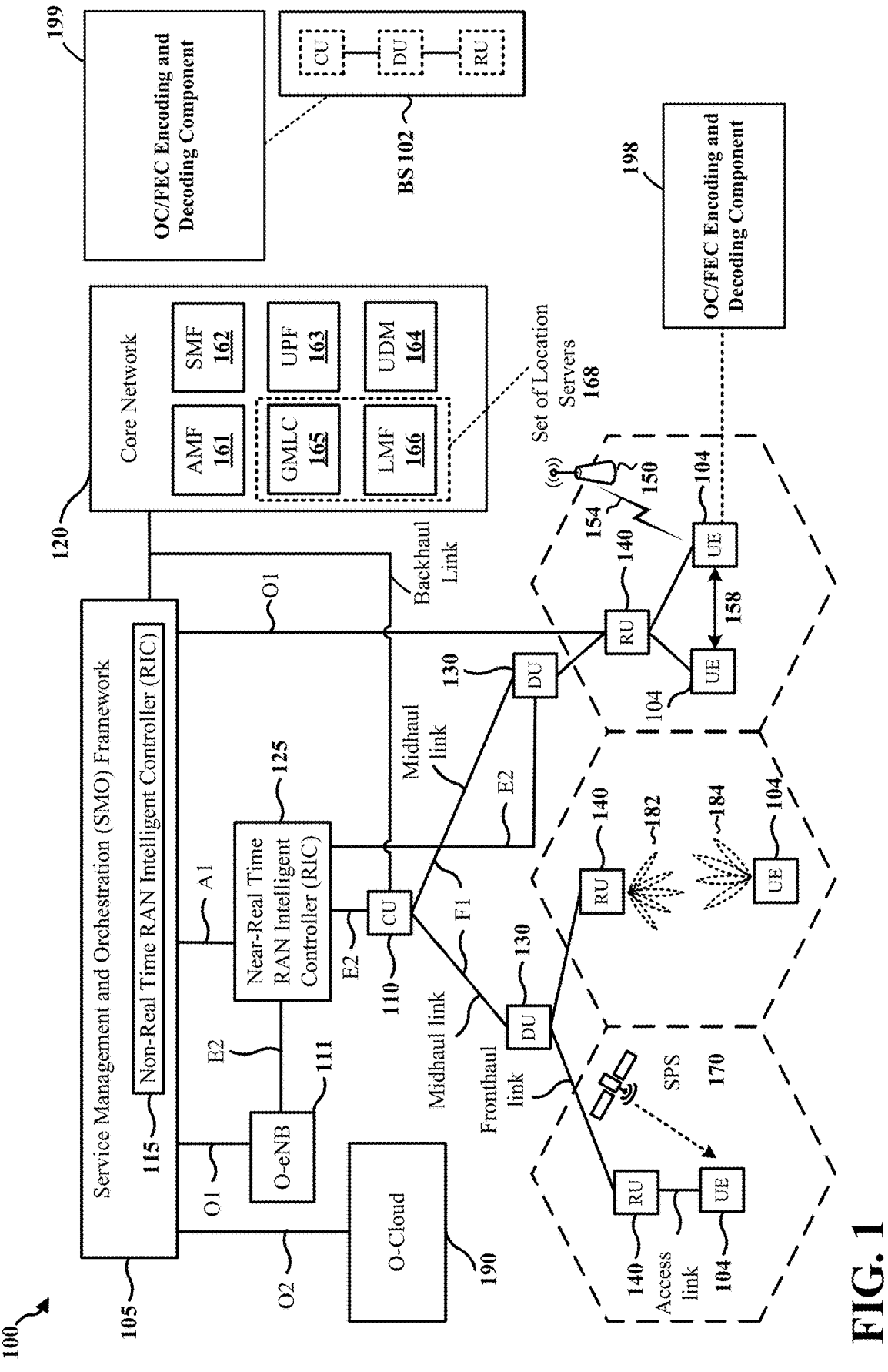
FIG. 1 is a diagram illustrating an example of a wireless communications system and an access network.

Aspects presented herein may improve the latency and power consumption for communications between wireless devices by enabling a transmitting wireless device to apply outer coding (OC) (e.g., with forward error correction (FEC)) to transmission(s), such that a receiving wireless device may be able to repair error transmissions without requesting retransmissions from the transmitting wireless device. Aspects presented herein may also improve the efficiency and reliability of FEC decoding (e.g., for OC block(s)) by enabling a transmitting wireless device to provide information (e.g., metadata) related to the FEC encoding and the OC block(s) to a receiving wireless device, such that the receiving wireless device may decode the OC block(s) encoded with FEC effectively based on the information.

Aspects presented herein may enable network coding at a radio access network (RAN), which may improve the system performances of latency and power consumption. Based on the concept of outer code (OC) for wireless system, aspects presented herein provide OC between RLC and PDCP layers.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface).

For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an OC/FEC encoding and decoding component 198 and/or the base station 102 may have an OC/FEC encoding and decoding component 199 that may be configured to segment each PDCP packet in a plurality of PDCP packets into a set of OC symbols, where the plurality of PDCP packets corresponds to a PDU set; assemble multiple sets of OC symbols into an OC block; apply an FEC encoding to the OC block; and output the OC block based on the FEC encoding. In certain aspects, the OC/FEC encoding and decoding component 198/199 may also be configured to assemble one or more OC symbols of a PDU set into a set of OC blocks, where the PDU set includes a plurality of PDCP packets, where each PDCP packet in the plurality of PDCP packets includes a set of OC symbols; apply an FEC decoding to the set of OC blocks; and reconstruct the PDU set from the set of OC blocks based on the FEC decoding.

Figures 2A, 2B, 2C, 2D:
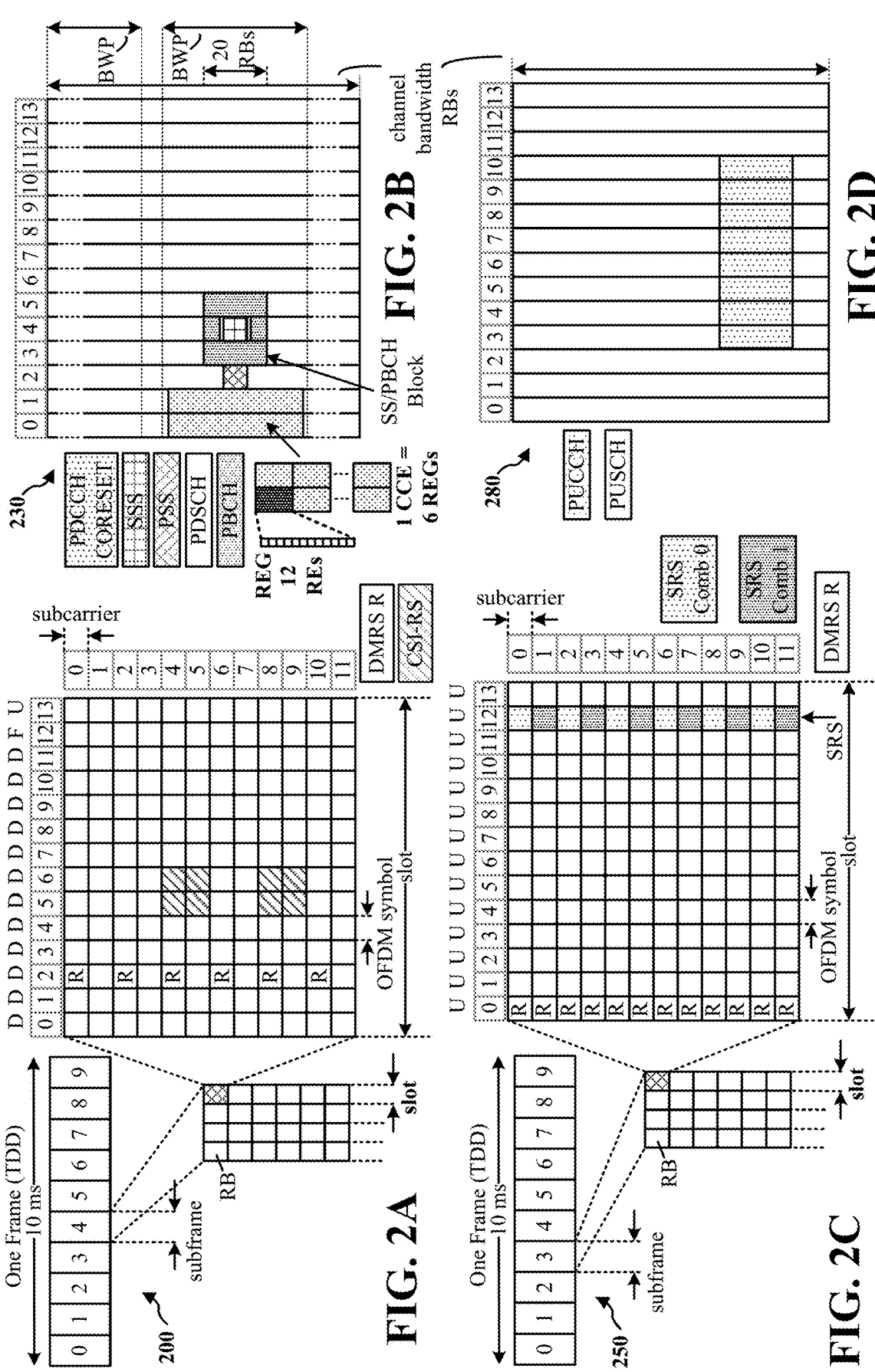
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS<br>$\Delta f = 2^\mu \cdot 15$[kHz] | Cyclic prefix |
| 0 | 15 | Normal |
| 1 | 30 | Normal |
| 2 | 60 | Normal,<br>Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
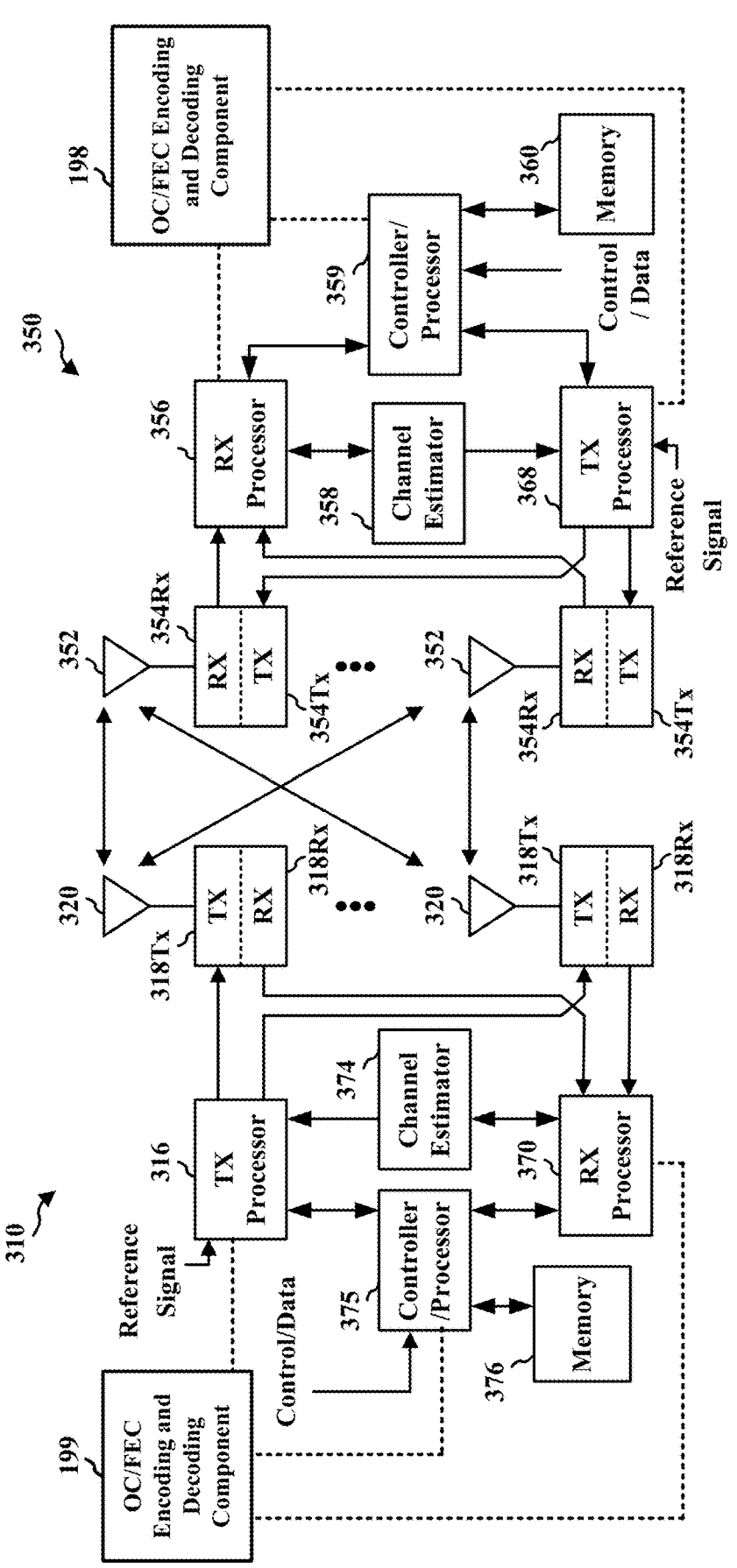
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving. rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to a different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the OC/FEC encoding and decoding component 198 of FIG. 1.

At least one of the TX processor 316, the RX processor 370, and the controller/processor 375 may be configured to perform aspects in connection with the OC/FEC encoding and decoding component 199 of FIG. 1.

Figure 4:
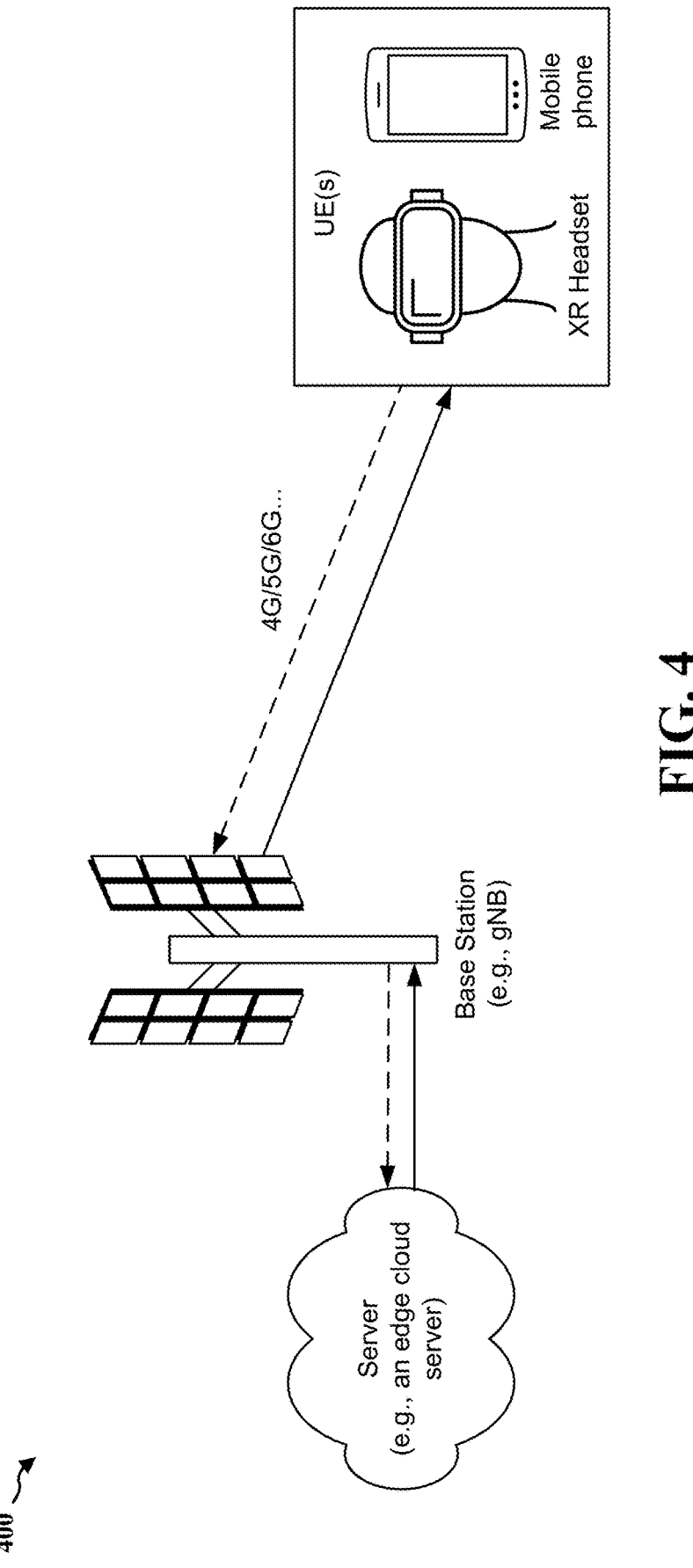
FIG. 4 is a diagram illustrating an example communication between a server, a base station and one or more UEs in accordance with various aspects of the present disclosure.

FIG. 4 is a diagram 400 illustrating an example communication between a server, a base station, and one or more UEs in accordance with various aspects of the present disclosure. With improvements to the transmission (Tx) and reception (Rx) speed, latency, and/or reliability of wireless communications (e.g., 4G LTE, 5G NR, 6G, etc.) over the last few years, various devices and applications have been designed and configured to take advantage of these improvements. As such, some devices/applications may have very tight/strict specifications for wireless communication. For example, extended reality (XR) applications and certain mobile devices (collectively as UEs) may have very tight specifications for latency and power, such as specifying a packet delay budget to be less than 10 milliseconds (ms) and/or a power consumption to be less than 1 Watt (W). For purposes of the present disclosure, XR may refer to technologies that combine the physical and digital worlds, creating immersive and interactive environments for users. XR may be an umbrella term that encompasses virtual reality (VR), augmented reality (AR), and/or mixed reality (MR).

As wireless communication may be interrupted from time to time (e.g., due to blockage), it may be common for a receiving device to request a transmitting device to retransmit certain data packets that have not been received by the receiving device, include errors, and/or are undecodable, etc. However, while retransmission of such data packets (e.g., based on using hybrid automatic repeat request (HARQ) and/or automatic repeat request (ARQ) mechanism(s)) may correct packet error(s), the retransmission may degrade the latency and power consumption between the receiving device and the transmitting device due to its (long) turn-around time. For example, a HARQ turn-around time may be approximately 7 ms, and a radio link control (RLC) retransmission time may be approximately 35 ms, etc.

In some scenarios, a device or an application may be configured to use outer coding (OC) to avoid the retransmission procedure by utilizing redundant parity, thus improving the latency and power consumption for communications between device. Depending on the implementations, OC may specify radio access network (RAN)-related information to optimize the performance (e.g., transport block (TB) size, block error rate (BLER), etc.). Thus, applying/implementing OC at RAN may be advantageous.

For purposes of the present disclosure, "network coding" may refer to a technique that is capable of optimizing the flow of data within a network. Traditionally, data packets in a network may be configured to be forwarded from one node to another node without any modification. However, network coding may enable nodes in the network to perform mathematical operations on incoming data packets before forwarding them. This may lead to improved efficiency, increased network throughput, and better resilience to packet loss. "Outer coding (OC)" may refer to a technique that may enable transmissions, such as physical (PHY) layer transmissions from a transmitting device (e.g., a UE, a base station, etc.), to include both data and parity (e.g., data bits and parity bits). A receiving device (e.g., a UE, a base station, etc.) may use the data and the parity to recover one or more portions of a data packet that are not successfully received, based on an outer coding scheme. The outer coding scheme may provide that the data and the parity are included in a single transmission, such as a single physical layer transmission. In some implementations, network coding may include applying outer coding at the network.

Figures 5A, 5B:
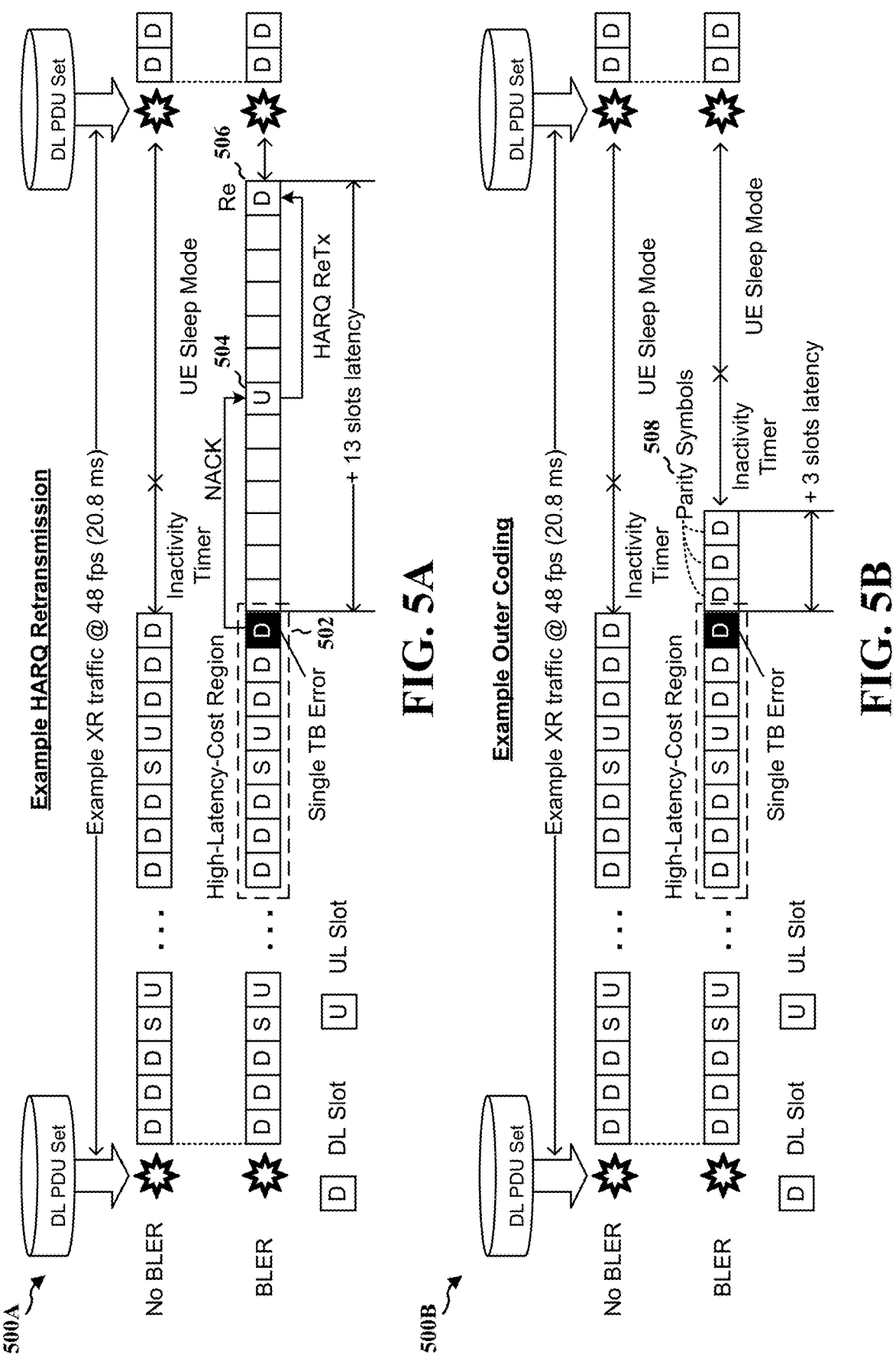
FIG. 5A is a diagram illustrating an example hybrid automatic repeat request (HARQ) retransmission in accordance with various aspects of the present disclosure.
FIG. 5B is a diagram illustrating an example outer coding (OC) in accordance with various aspects of the present disclosure.

FIG. 5A is a diagram 500A illustrating an example HARQ retransmission in accordance with various aspects of the present disclosure. In some examples, retransmissions (and lower modulation and coding scheme (MCS)) may be less efficient for applications/devices that specify tight latency as retransmissions may increase the latency of traffic bursts, such as XR traffic burst. In addition, retransmissions may also prevent a wireless device (e.g., a UE) from entering a sleep state early. For example, as shown at 502, when a UE receives a downlink (DL) packet data unit (PDU) from a base station (which may also be referred to as a network entity in some examples) and detects that one of the DL transport block (TB) includes an error (e.g., not being transmitted completely), the UE may transmit a negative acknowledgement (NACK) for that TB to the base station using next uplink (UL) slot, such as shown at 504. Then, as shown at 506, in response to the NACK from the UE, the base station may retransmit that DL TB (e.g., using a DL slot after few slots). The HARQ turn-around time for the error TB may take approximately 7 ms, and the retransmission of the error TB (e.g., an RLC retransmission) may take approximately 35 ms. This retransmission process will also delay the time the UE is able to enter into a sleep mode, which may cause additional power consumption at the UE. In addition, when a lower MCS is used by a transmitting device, it may result in a higher latency compared to forward error correction (FEC) when there is no error (e.g., 50-90 percentile latency). Also, lower MCS may result in a lower capacity compared to FEC with feedback.

FEC at application layer may reduce communication entities' reliance on retransmission (or request for retransmission). FEC is a method of providing error control in data transmission in which the source (e.g., a transmitting entity such as a UE or a base station) may send redundant data and the destination (e.g., a receiving entity such as a UE or a base station) may recognize just the portion of the data that contains no apparent errors. For example, when a transmitting entity is configured to apply FEC to its transmission, the transmitting entity may be configured to transmit each packet twice. The receiving entity may check both instances of each packet for adherence to the protocol being used. If conformity occurs in both instances, the receiving entity may accept the packet. If conformity occurs in one instance and not in the other, the receiving entity may accept the packet that conforms to the protocol. If conformity does not occur in either instance, the receiving entity may reject the packet.

Figure 6:
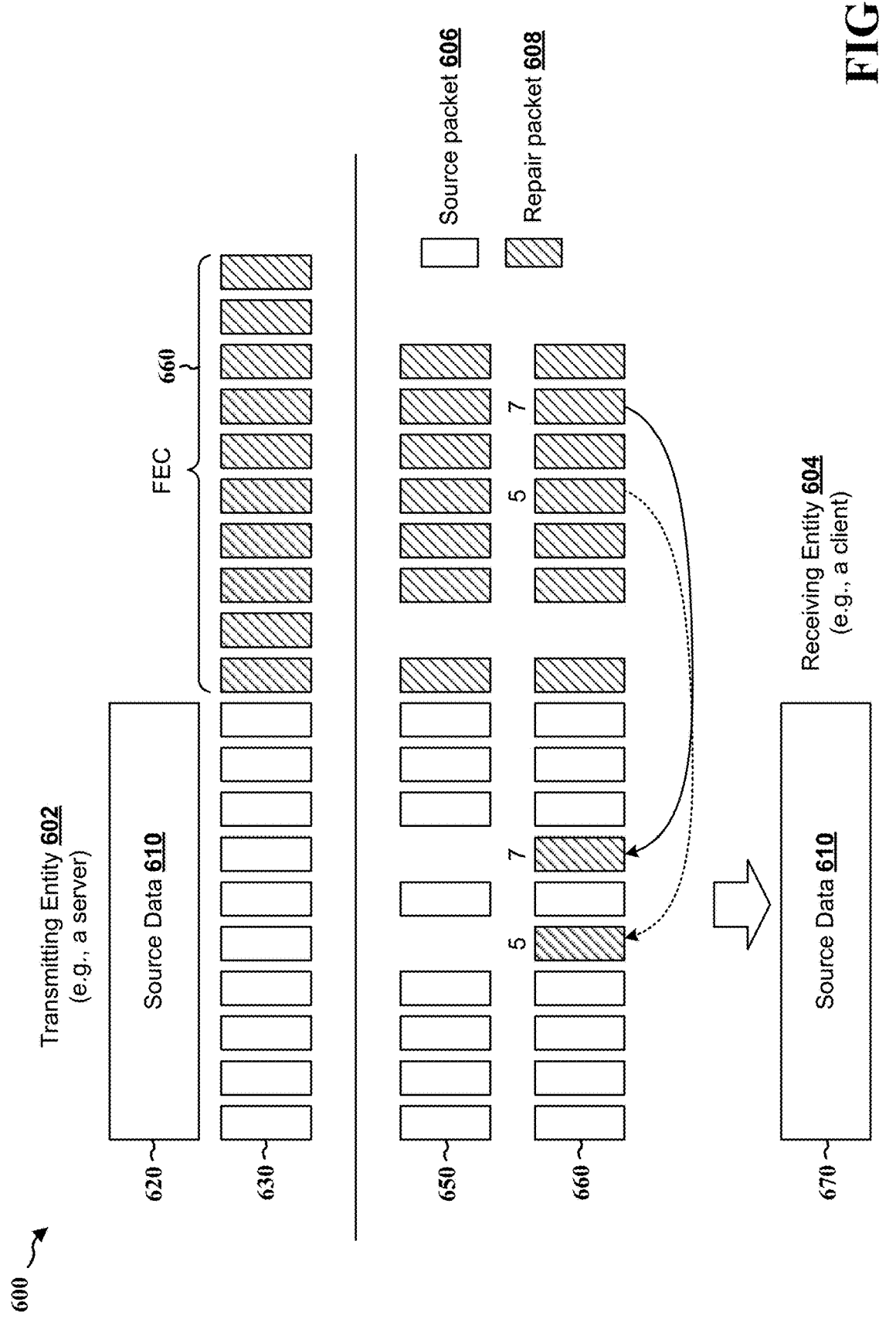
FIG. 6 is a diagram illustrating an example forward error correction (FEC) operation in accordance with various aspects of the present disclosure.

FIG. 6 is a diagram 600 illustrating an example FEC operation in accordance with various aspects of the present disclosure. As shown at 620, a transmitting entity 602 (e.g., a UE, a base station, a TRP, an application server, a user plane function (UPF), etc.) may be configured to transmit source data 610 (which may be referred to as a set of protocol data units (PDUs)) to a receiving entity 604 (e.g., a UE, a base station, a TRP, an application server, a UPF, etc.).

As shown at 630, the transmitting entity 602 may segment the source data 610 into multiple source packets 606, such as source packets 1 to 10 (e.g., the number of source packets may depend on the capability of the transmitting entity 602, the available bandwidth configured for the transmitting entity, etc.). In addition to the multiple source packets 606, based on FEC rate, the transmitting entity 602 may also be configured to transmit certain number of repair packets 608 (which may also be referred to as "parity packets," "parity bits," and/or "redundant packets," etc.). For example, the transmitting entity 602 may be configured to transmit X source packets 606 and Y repair packets 608 (e.g., Y being the same as or different from X).

As shown at 650, after the transmitting entity 602 transmits the source packets 606 and the repair packets 608, the receiving entity 604 may receive just a portion of the source packets 606 (and also just a portion of the repair packets 608), where some source packets may be missing (e.g., source packets #5 and #7). However, as shown at 660, if the receiving entity 604 successfully receives at least two repair packets, the receiving entity 604 may accept/use these repair packets to recover the lost source packets.

Then, as shown at 670, after sufficient packets are received (e.g., a total of ten source and/or repair packets), the receiving entity 604 may decode the received packets to obtain the source data 610. In other words, application FEC may enable data, e.g., a video frame/slice, a PDU set, etc., to be decoded once sufficient packets are received.

As FEC may enable a receiving entity to recover certain lost packets without requesting the transmitting entity to retransmit (reTx) these lost packets, the application-layer FEC may provide benefit over radio access network (RAN) optimization (e.g., modulation and coding scheme (MCS), block error rate (BLER) target, etc.) as communication entities may have control over the percentage of FEC (FEC rate/redundancy (%)) applied.

In some implementations, an application (App) may determine an FEC rate to be applied to a transmission based on end-to-end performance measures (e.g., based on round-trip time (RTT), frame error rate (FER), etc.). An FEC rate may refer to a ratio of the number of repair packets to the number of source packets in an FEC operation. In some examples, FEC rate may also be referred as a redundancy rate/percentage. For example, the FEC rate for the example discussed in connection with FIG. 6 may be (Y/X) %. Also, for instance, if the FEC rate applied is 50% or ½, then the number of repair packets is half of the number of source packets (e.g., 10 source packets 606 and 5 repair packets 608).

FIG. 5B is a diagram 500B illustrating an example outer coding (OC) in accordance with various aspects of the present disclosure. In some scenarios, outer coding may improve the latency and power consumption for communication between wireless devices (e.g., between a UE and a base station). As described in connection with FIG. 6. FEC may generate parity (e.g., repair/redundant) symbols from source symbols (e.g., RaptorQ code, Reed-Solomon (RS) code, etc.), where a transmitting entity (e.g., a network entity, a base station, etc.) may send extra parity symbols to a receiving entity (e.g., a UE) without waiting/specifying the retransmission turn-around time. As such, FEC outer coding (e.g., using FEC for the outer coding) may generate redundant parity symbols and ensure high recovery probability without waiting for HARQ turn-around time. For example, as shown at 508, after the UE detects the error TB, the UE may use the parity symbols to repair and decode the received packets, which may use a number of slots (e.g., 3 slots) that is much shorter compared to a retransmission (e.g., using 13 slots). The approximate recovery probability of FEC (M≥K) may be calculated based on $$1 - \frac{1}{256^{M-K+1}},$$

where M indicates the number of received symbols and K indicates the number of source symbols. As shown by the diagram 500B, outer coding with FEC may enable a receiving device (e.g., the UE) to finish the reception/transmission earlier, thereby enabling better latency and power consumption for the receiving device.

Figure 7:
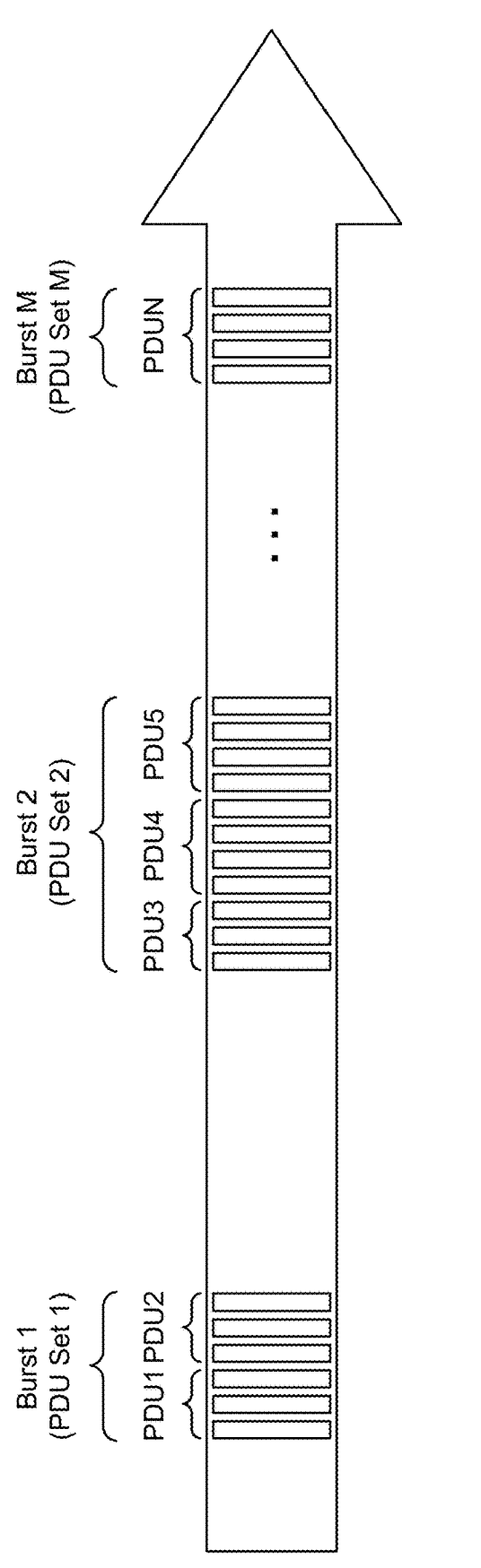
FIG. 7 is a diagram illustrating an example packet data unit (PDU) set in accordance with various aspects of the present disclosure.

FIG. 7 is a diagram 700 illustrating an example packet data unit (PDU) set in accordance with various aspects of the present disclosure. In some scenarios, certain applications, such as XR applications, may consume data in bigger PDU sets rather than Internet Protocol (IP) packets. For purposes of the present disclosure, an IP packet may refer to a unit of data in a network that contains information about the source and destination addresses and other control information specified to transport the packet over a network. A PDU may refer to a unit of data used in communication protocols (e.g., for transmitting a packet in a network layer), where PDUs may typically be used in networking protocols to carry information between computers and network devices. In some examples, a PDU may also be referred to as an "application data unit (ADU)" depending on the context. In some examples, in the application of transmitting videos, a transmitting device (e.g., a base station, a server, etc.) may be configured to transmit one video frame per "burst," and there may be a plurality of "slices" of a video frame per burst, etc. In some implementations, a burst may also be referred to as a PDU set, which include a set of IP packets representing a unit of information at an application (App). In some examples, slice(s) of a video frame may be FEC protected, such as described in connection with FIG. 6. In some implementations, a burst may also be referred to as a set of IP packets/PDUs/ADUs that are configured to be delivered to a receiving entity (e.g., a UE) with the same deadline, such as all slices of a video frame. Applications may have the capability to specify transport layer specifications on PDU set(s), e.g., specifications on "slices" of video frames.

Figure 8:
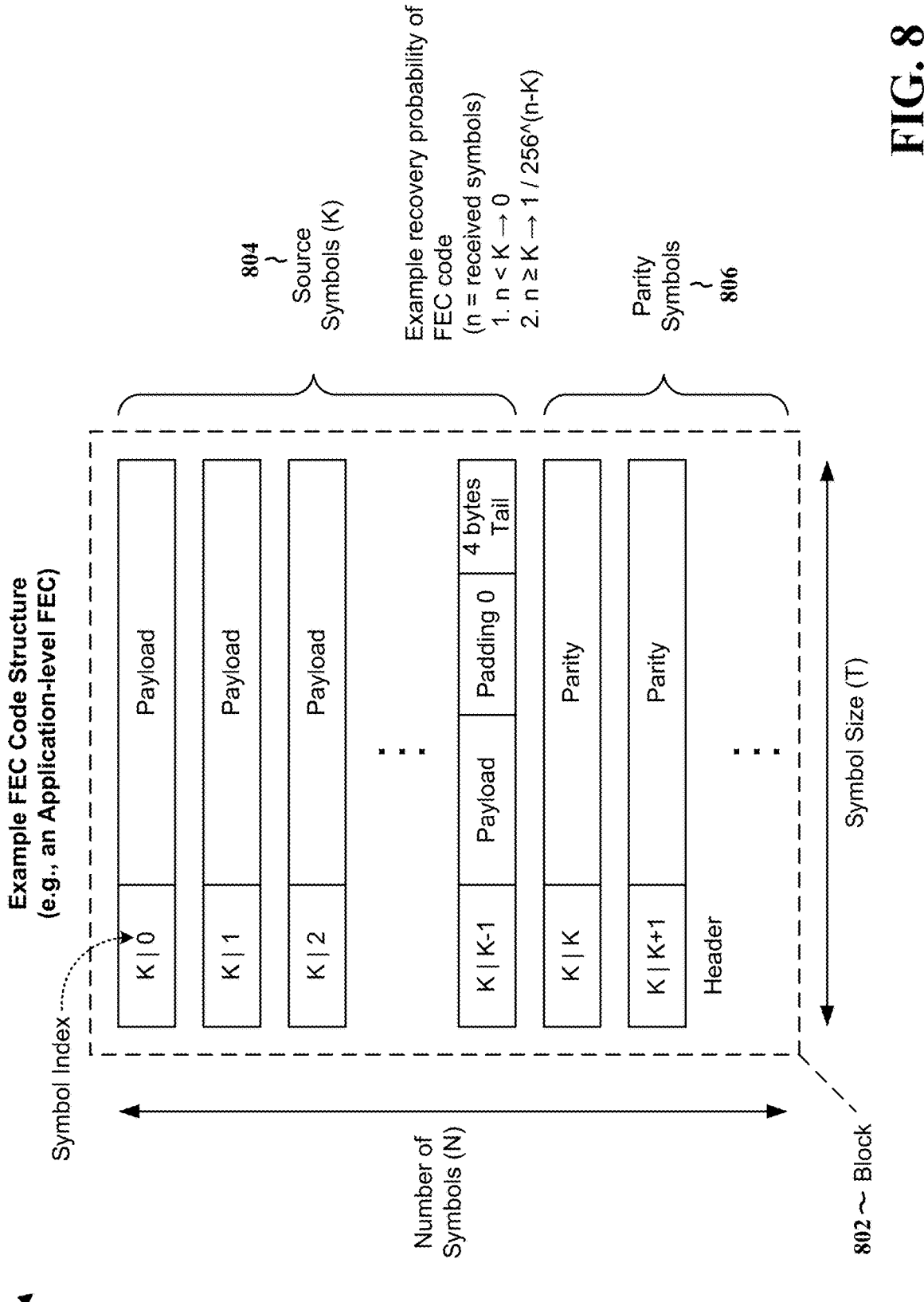
FIG. 8 is a diagram illustrating an example FEC structure in accordance with various aspects of the present disclosure.

FIG. 8 is a diagram 800 illustrating an example FEC structure (e.g., RaptorQ systematic code) in accordance with various aspects of the present disclosure. As shown at 802, for purposes of the present disclosure, a "block" may refer to a set of symbols considered together (e.g., concatenated) for FEC. For example, a block may be a PDU set. A symbol may refer to a unit of data for FEC (with symbol size (T)), which may also be referred to as an FEC symbol. Source symbol(s) may refer to symbol(s) that carry source data, such as described in connection with FIG. 6, where the first K symbols of the block may be source symbols as shown at 804. On the other hand, parity symbol(s) (repair symbol(s)) may refer to symbol(s) that carry repair/redundant packets, where the rest of the block may be parity symbols as shown at 806. A block that is protected (e.g., encoded) with FEC may be referred to as an FEC block. A block that includes a set of OC symbols may be referred to as an OC block, which may include a set of source symbols (which may also be referred to as OC source symbols) and also a set of parity symbols (which may also be referred to as OC parity symbols).

Figure 9:
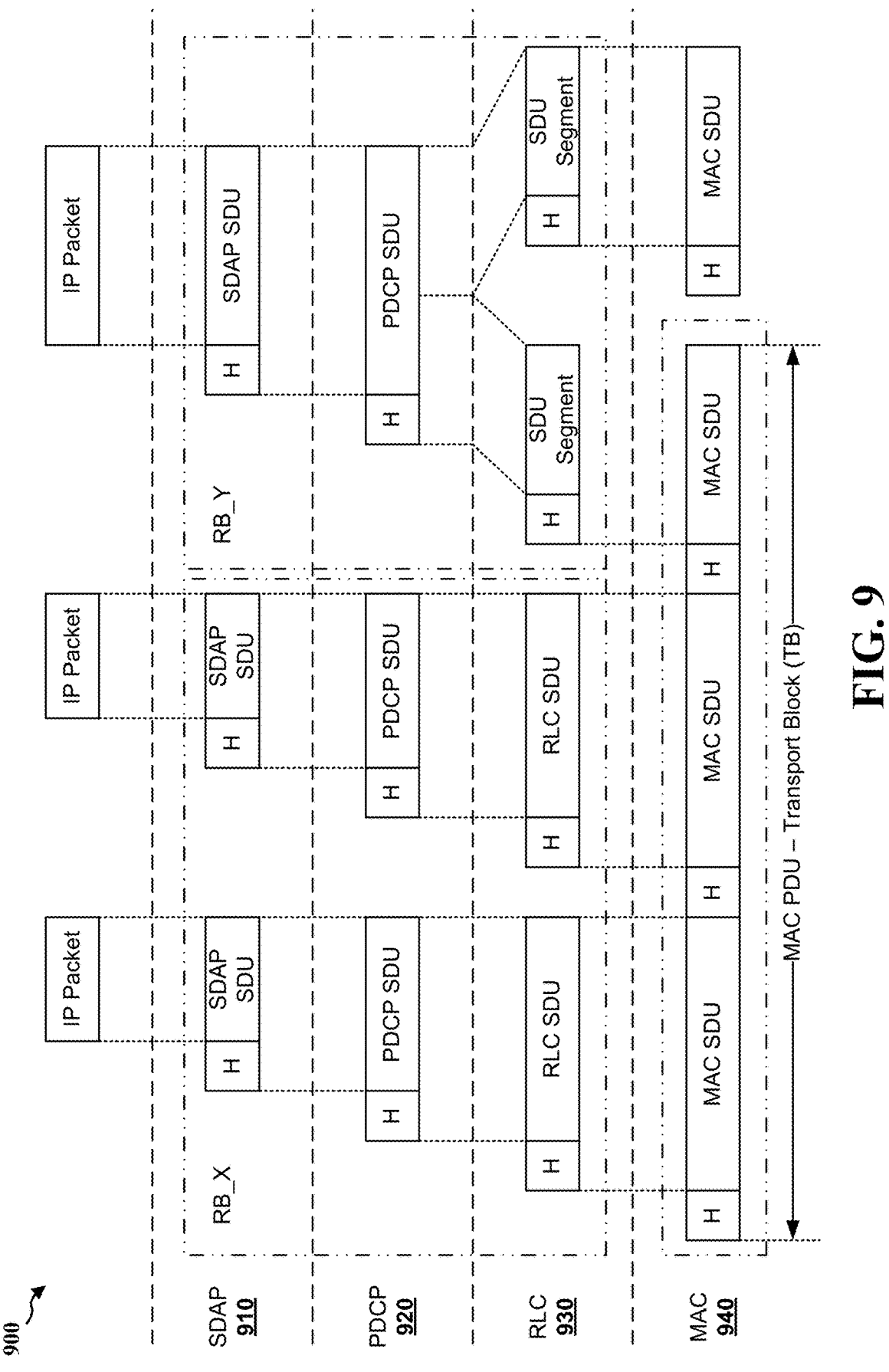
FIG. 9 is a diagram illustrating an example data flow through various protocol layers of a wireless communication stack in accordance with various aspects of the present disclosure.

FIG. 9 is a diagram 900 illustrating an example data flow through various protocol layers of a wireless communication (e.g., 5G NR) stack in accordance with various aspects of the present disclosure. As shown by the diagram 900, a wireless communication stack may include various protocol layers, such as a service data adaption protocol (SDAP) layer 910, a packet data convergence protocol (PDCP) layer 920, a radio link control (RLC) layer 930, and a medium access control (MAC) layer 940, etc. Depending on implementations, the SDAP layer may be responsible for mapping between a quality-of-service (QOS) flow from a core network (e.g., the 5G core network) and a data radio bearer, as well as marking the quality-of-service flow identifier (QFI) in uplink and downlink packets. The PDCP layer may be responsible for transfer of data (user plane or control plane), maintenance of PDCP sequence numbers (SNs), header compression and decompression using robust header compression (ROHC) protocol, ciphering and deciphering, integrity protection and integrity verification, timer based service data unit (SDU) discard, for split bearers, routing is performed, activation/deactivation of PDCP duplication, reordering and in-order delivery, out-of-order delivery, and/ or duplicate discarding, etc. The RLC layer may be responsible for transferring of upper layer PDUs in one of the three modes defined: AM (acknowledged mode), UM (unacknowledged mode), and TM (transparent mode), error correction through ARQ (automatic repeat request) for just AM data transfer, concatenation, segmentation, and reassembly of RLC SDU's, Re-segmentation of RLC data PDU's, reordering of RLC data PDU's, duplicate detection, RLC re-establishment and protocol error detection and recovery. The MAC layer may be responsible for controlling access to the physical transmission medium in local networks.

Figure 10:
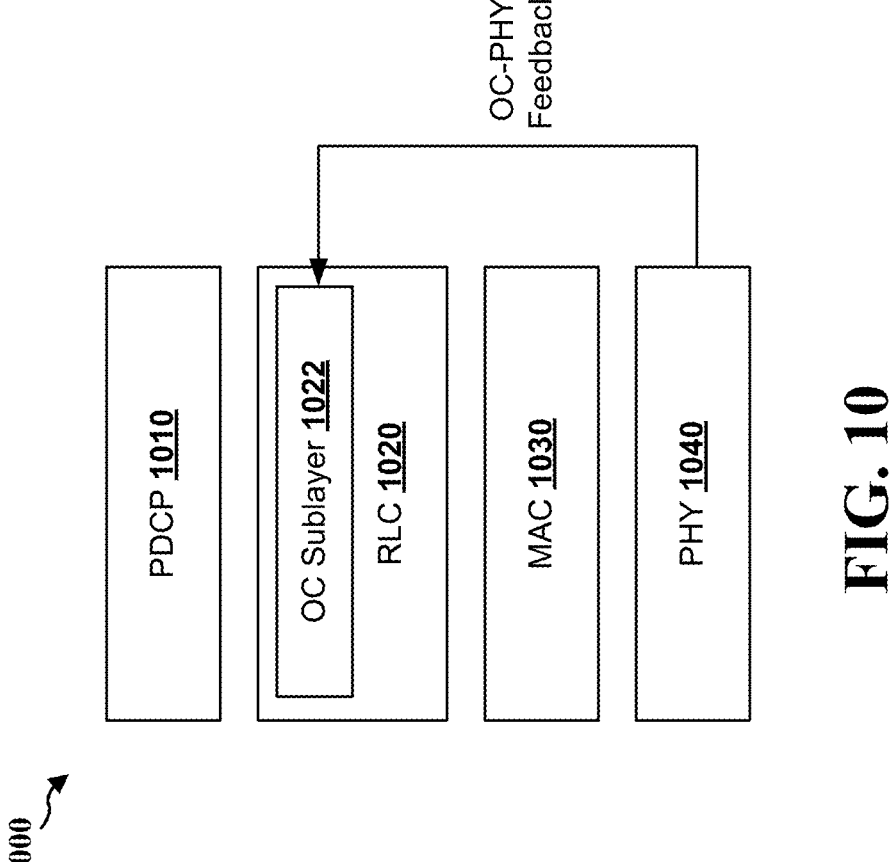
FIG. 10 is a diagram illustrating an example of a radio link control (RLC) integrated OC sublayer in accordance with various aspects of the present disclosure.

FIG. 10 is a diagram 1000 illustrating an example of an RLC integrated outer coding (OC) sublayer in accordance with various aspects of the present disclosure. In one aspect of the present disclosure, an OC sublayer 1022 (e.g., a layer responsible for performing OC functions) may be configured to be integrated into an RLC layer 1020. For purposes of the present disclosure, a set of PDCP packets belonging to a PDU set may also be identified (or referred to) as an "OC block" after segmented into a set of OC symbols. As shown by the diagram 1000, the OC sublayer 1022 may have the capability to receive feedback(s) from the physical (PHY) layer 1040 (which may be referred to as "PHY-feedback"), such as the OC symbol size. The OC sublayer 1022 may also have the capability to set RLC SDU size to the OC symbol size. Then, PDCP packets 1010 (or a group of OC symbols) may be segmented into a set of RLC SDUs. For purposes of the present disclosure, an OC symbol may refer to data of size in N symbols (N≥1) which is going to be outer coded. In some examples, an OC symbol may represent the same terminology "symbol" in FEC (forward error correction), which may be a basic unit of data for the FEC. Since the outer coding adopts FEC, it may be referred to as the OC symbol. Then, the set of RLC SDUs may be OC encoded with suitable/desirable redundancy (e.g., may depend on an early termination support), and handed to the RLC layer 1020, the MAC layer 1030, and the PHY layer 1040 for over-the-air (OTA) transmission.

In some scenarios, placing an OC sublayer in an RLC layer (e.g., performing/applying OC functions at the RLC layer) may provide more advantages and benefits compared to placing the OC sublayer in a MAC layer. For example, an RLC layer may have a segmentation functionality, whereas a MAC layer may not have such functionality. As such, it may be possible for an OC sublayer to efficiently use this existing RLC functionality with minimal changes and overhead due to OC. In addition, placing the OC sublayer just above the RLC layer may provide flexibility in performing OC on specific radio bearers (RBs) with specific QoS specifications, and there may be potential(s) for more efficient traffic-specific operation (e.g., a MAC SDU might have packets multiplexed from different RBs).

Similarly, placing an OC sublayer in an RLC layer (e.g., performing/applying OC functions at the RLC layer) may provide more advantages and benefits than placing the OC sublayer in an PDCP layer. For example, an RLC layer may have a segmentation functionality, whereas a PDCP layer may not have such functionality. As such, it may be possible for an OC sublayer to efficiently use this existing RLC functionality with minimal changes and overhead due to OC. Also, it may be difficult to add extra PDCP PDUs for FEC parity symbols at a PDCP layer. For example, in some network specifications (e.g., 5G specification), an IP packet may be a PDCP SDU (e.g., IP packet=PDCP SDU), and a PDCP SDU may be an RLC SDU (PDCP PDU=RLC SDU) (before segmentation). This structure/configuration may allow pre-processing to support high data-rate. Some modem hardware accelerators are also designed to ensure this 1:1 mapping relationship between an IP packet and a PDCP PDU (e.g., associated with ciphering, integrity, ROHC, routing, etc.). In another example, the RLC layer may allow distributed unit (DU) level processing instead of centralized unit (CU) level processing. As such, the OC may be adapted dynamically based on radio conditions for better radio resource management (RRM) as well as OC encoding/decoding. Also, in some implementations, the CU may be evolved and moved to cloud (e.g., a cloud server), and the RLC may be tightly located in DU(s).

In one aspect of the present disclosure, a wireless device (e.g., a transmitting device, a UE, a base station, etc.) may be configured to apply FEC to a set of (multiple) PDCP packets (e.g., apply to a PDU set, a burst, etc.) instead of applying to an individual PDCP packet (e.g., for typical wireless communications). In other words, the wireless device may apply the FEC to an OC block. As a PDU set may be a unit of data consumption at an application, such configuration (e.g., applying FEC to an OC block or a set of OC blocks) may provide better granularity for FEC protection, and also better probability to recover the PDU set. In addition, under such configuration, the PDCP size and the OC symbol size are not specified to be aligned, where the OC symbol size may be determined by a RAN, and the PDCP size (e.g., IP packet size plus (+) SDAP/PDCP headers) may be determined by an application.

Figure 11A:
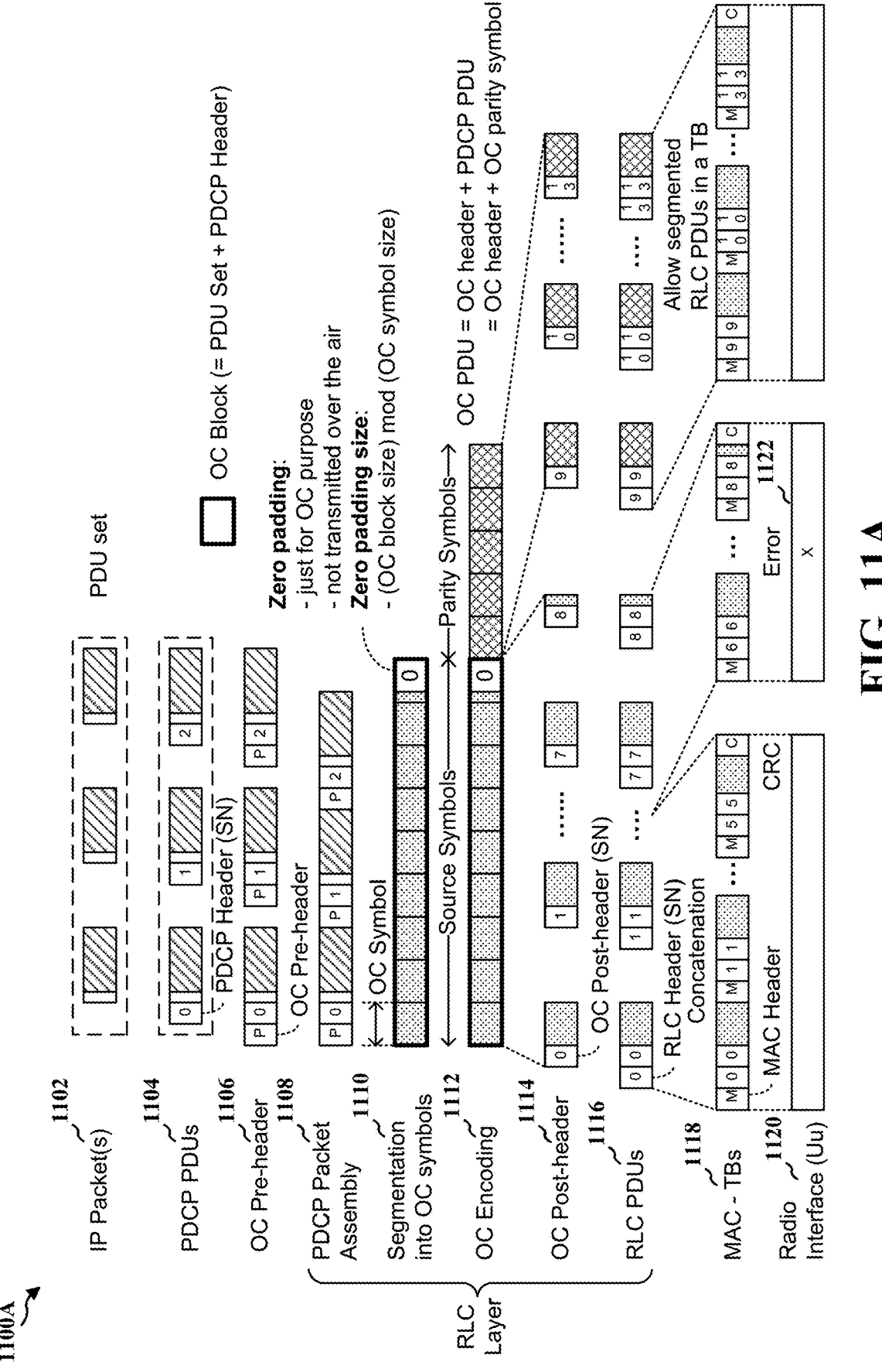
FIG. 11A is a diagram illustrating an example of applying FEC to an OC block where PDCP packets are assembled first and then segmented into OC symbols in accordance with various aspects of the present disclosure.

FIG. 11A is a diagram 1100A illustrating an example of applying FEC to an OC block where PDCP packets are assembled first and then segmented into OC symbols in accordance with various aspects of the present disclosure. In one example, at 1102, a PDU set may include a set of IP packets. At 1104, a wireless device (e.g., a transmitting device, a UE, a base station, etc.) may first convert the set of IP packets to a set of PDCP PDUs (which may also be referred to as PDCP packets) by adding a PDCP header (e.g., with a serial number (SN)) to each IP packet in the set of IP packets, and combine the set of PDCP PDUs into an OC block (e.g., OC block=PDU set+PDCP headers). Then, at 1106, the wireless device may add an OC pre-header to each PDCP PDU in the set of PDCP PDUs. Note that there may be no relationship between PDCP SN and RLC SN. In that sense, RLC SN may be able to be used for OC SN. At 1108, the wireless device may assemble the PDCP PDUs. At 1110, the wireless device may segment the assembled PDCP PDUs (e.g., the OC block) into a set of OC symbols and add a zero padding (e.g., for OC purpose and may not be specified to transmit OTA). Then, at 1112, the wireless device may apply an FEC (e.g., the OC encoding) to the set of OC symbols (e.g., the OC block) by adding a set of parity symbols. At 1114, the wireless device may add an OC post-header to each OC symbol. At 1116, the wireless device may add an RLC header (e.g., with an SN) to each OC symbol (which may be referred to as an RLC PDU). At 1118, the wireless device may concatenate the set of OC symbols/RLC PDUs into a set of TBs, and add MAC header(s) and a CRC to each TB. Then, at 1120, the wireless device may transmit the transport blocks (TBs).

FIG. 11A shows that the wireless device may transmit source (OC) symbols with parity symbols, such as described in connection with FIG. 6, by aggregating a set of PDCP packets/PDUs into an OC block first, and then segment the OC block. Such configuration may have the advantage of enabling a smaller number of OC symbols and optimizing the OC symbol size. However, under such configuration, parallel stack and OC processing may not be possible, and pipelined PDCP PDU may also not possible.

Figure 11B:
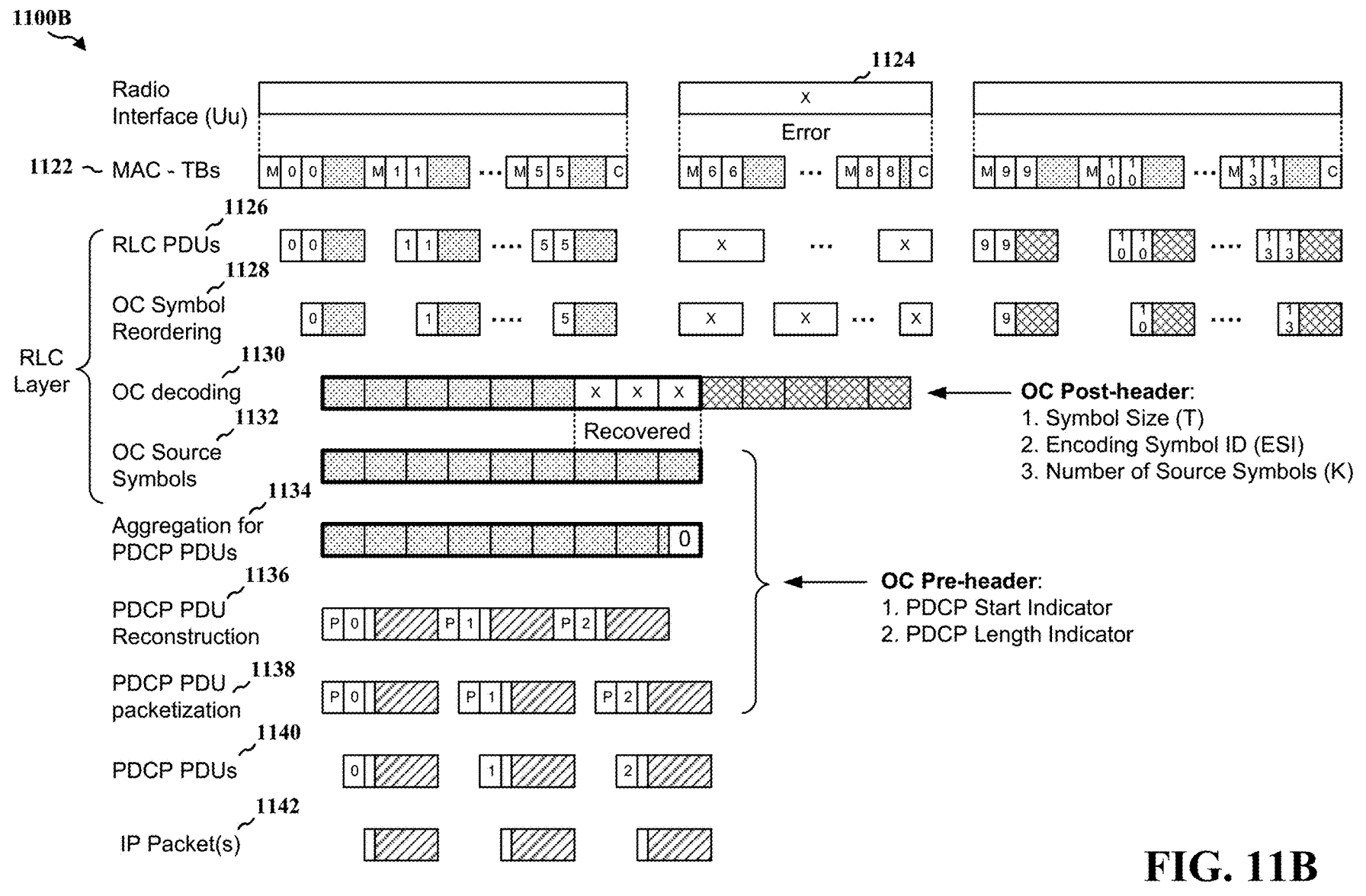

FIG. 11B is a diagram 1100B illustrating an example of decoding an OC block with FEC in accordance with various aspects of the present disclosure. At 1122, a wireless device (e.g., a receiving device, a UE, a base station, etc.) may receive the set of TBs from a transmitting device (e.g., as described in connection with FIG. 11A). As shown at 1124, assuming the wireless device is unable to decode at least one of the TBs. At 1126, the wireless device may remove the MAC header(s) and CRC from the TBs to obtain a set of RLC PDUs. At 1128, the wireless device may remove the RLC headers and reorder the OC symbols. At 1130, the wireless device may decode the set of OC symbols, such as based on information provided in OC post-header (e.g., symbol size (T), encoding symbol ID (ESI), and/or number of source symbols (K), etc.). The decoded OC symbols may include source symbols and parity symbols. At 1132, based on the decoding, the wireless device may obtain a set of OC source symbols, where the wireless device may recover the error packets (e.g., as shown at 1124) with the parity symbols. At 1134, the wireless device may aggregate the OC source symbols into a set of PDCP PDUs. At 1136, the wireless device may reconstruct the PDCP PDUs. At 1138, the wireless device may packetize the PDCP PDUs to obtain a set of PDCP PDUs/packets. Note the OC pre-header may include information such as PDCP start indicator and PDCP length indicator to enable the wireless device to perform steps described in connection with 1132 to 1138. At 1140, the wireless device may remove the OC pre-header from each PDCP PDU. At 1142, the wireless device may remove the PDCP header from each PDCP PDU to obtain a set of IP packets.

Figure 12A:
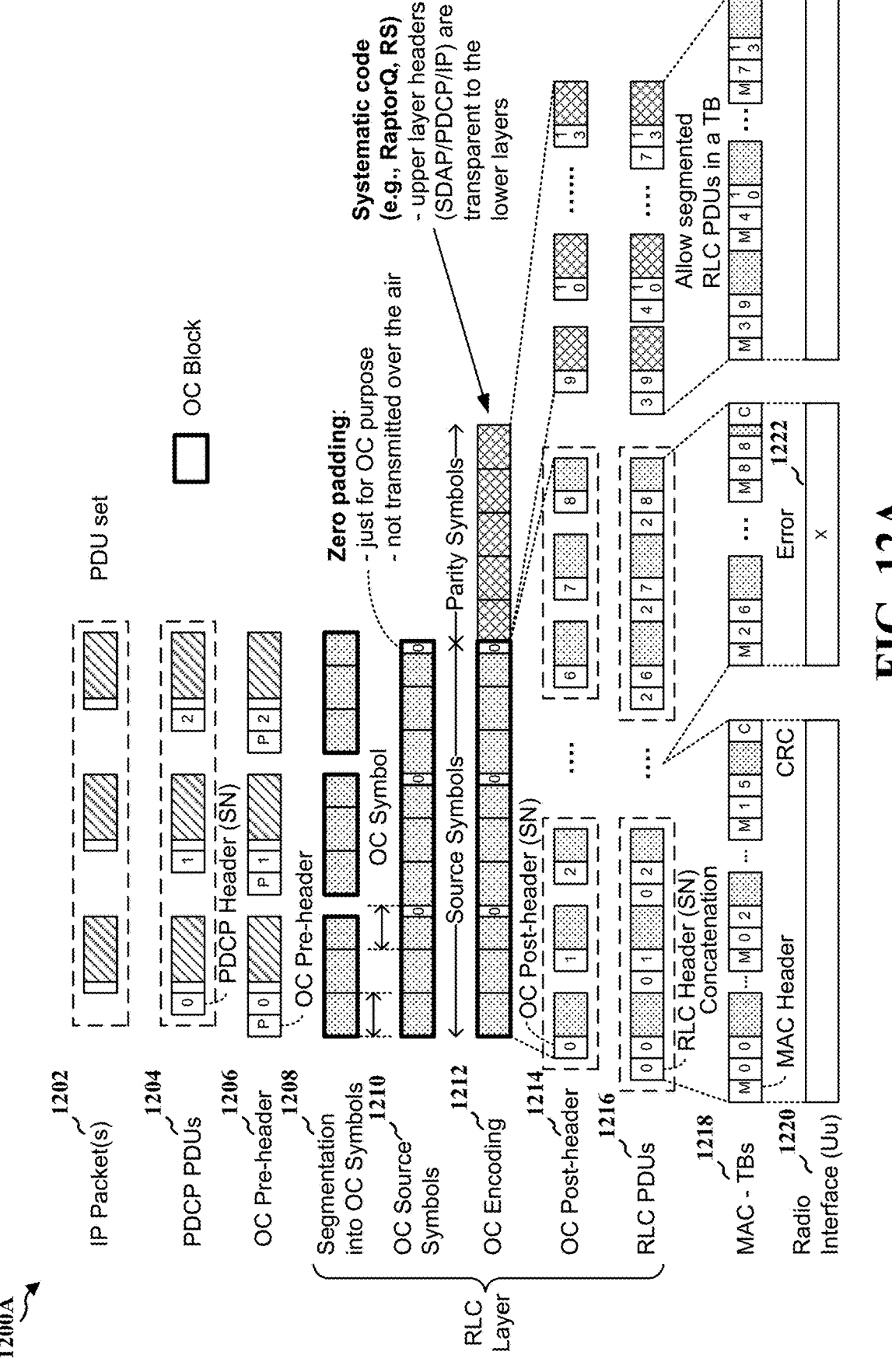
FIG. 12A is a diagram illustrating an example of applying FEC to an OC block where PDCP packets are segmented into OC symbols without assembling/aggregation in accordance with various aspects of the present disclosure.

FIG. 12A is a diagram 1200A illustrating an example of applying FEC to an OC block where PDCP packets are segmented into OC symbols without assembling/aggregation in accordance with various aspects of the present disclosure. At 1202, a PDU set may include a set of IP packets. At 1204, a wireless device (e.g., a transmitting device, a UE, a base station, etc.) may first convert the set of IP packets to a set of PDCP PDUs (which may also be referred to as PDCP packets) by adding a PDCP header (e.g., with an SN) to each IP packet in the set of IP packets, and combine the set of PDCP PDUs into an OC block (e.g., OC block=PDU set+PDCP headers). Then, at 1206, the wireless device may add an OC pre-header to each PDCP PDU in the set of PDCP PDUs. At 1208, the wireless device may segment each PDCP PDU into a set of OC symbols (each set of OC symbols may form a mini OC block). At 1210, the wireless device may add a zero padding (e.g., for OC purpose and may not be specified to transmit OTA) to each set of OC symbols (e.g., to each mini OC block) and convert/assemble multiple sets of OC symbols into a set of OC source symbols (e.g., into an OC block with OC source symbols). Then, at 1212, the wireless device may apply an FEC (e.g., the OC encoding) to the set of OC source symbols by adding a set of parity symbols (e.g., an OC block with OC source sybmols and OC parity symbols). In some examples, systematic code such as RaptorQ and RS may be used. In addition, upper layer headers (e.g., SDAP, PDCP, IP headers, etc.) may be transparent to the lower layers. At 1214, the wireless device may add an OC post-header to each OC symbol. At 1216, the wireless device may add an RLC header (e.g., with an SN) to each OC symbol (which may be referred to as an RLC PDU). At 1218, the wireless device may concatenate the set of OC symbols/RLC PDUs into a set of TBs, and add MAC header(s) and a CRC to each TB. Then, at 1220, the wireless device may transmit the TBs.

FIG. 12A shows that the wireless device may transmit source (OC) symbols with parity symbols, such as described in connection with FIG. 6, by segmenting each PDCP packets without aggregation (e.g., as shown at 1108 of FIG. 11A). Such configuration may have the advantage of optimizing the OC symbols size, enabling parallel stack and OC processing, and pipelined PDCP PDU may be possible. However, under such configuration, segmentation for each PDCP packet/PDU may be specified.

Figure 12B:
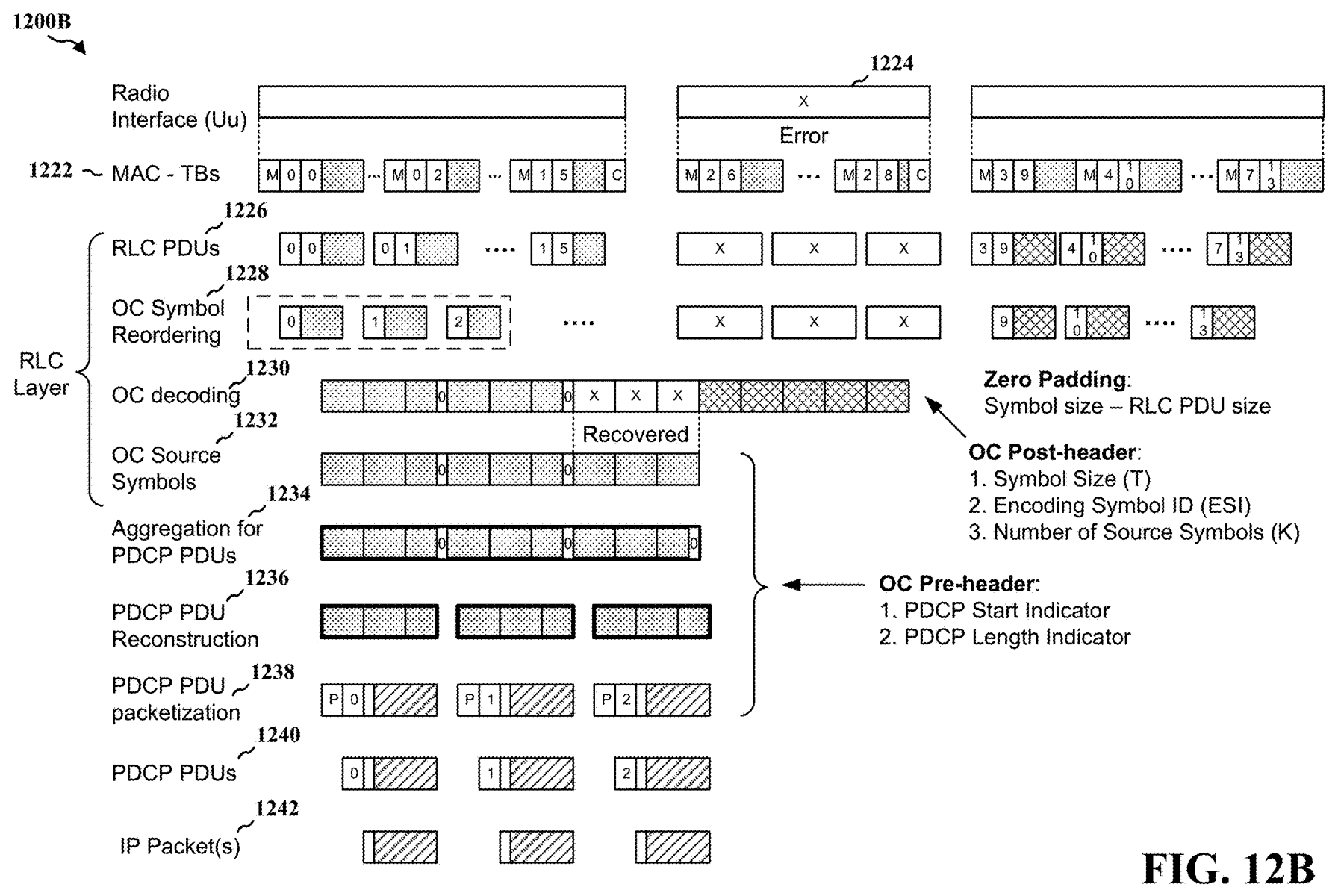

FIG. 12B is a diagram 1200B illustrating an example of decoding an OC block with FEC in accordance with various aspects of the present disclosure. At 1222, a wireless device (e.g., a receiving device, a UE, a base station, etc.) may receive the set of TBs from a transmitting device (e.g., as described in connection with FIG. 12A). As shown at 1224, assuming the wireless device is unable to decode at least one of the TBs. At 1226, the wireless device may remove the MAC header(s) and CRC from the TBs to obtain a set of RLC PDUs. At 1228, the wireless device may remove the RLC headers and reorder the OC symbols. At 1230, the wireless device may decode the set of OC symbols, such as based on information provided in OC post-header (e.g., symbol size (T), encoding symbol ID (ESI), and/or number of source symbols (K), etc.). The decoded OC symbols may include source symbols and parity symbols. At 1232, based on the decoding, the wireless device may obtain a set of OC source symbols, where the wireless device may recover the error packets (e.g., as shown at 1224) with the parity symbols. At 1234, the wireless device may aggregate the OC source symbols into a set of PDCP PDUs. At 1236, the wireless device may reconstruct the PDCP PDUs. At 1238, the wireless device may packetize the PDCP PDUs to obtain a set of PDCP PDUs/packets. Note the OC pre-header may include information such as PDCP start indicator and PDCP length indicator to enable the wireless device to perform steps described in connection with 1232 to 1238. At 1240, the wireless device may remove the OC pre-header from each PDCP PDU. At 1242, the wireless device may remove the PDCP header from each PDCP PDU to obtain a set of IP packets.

Referring back to FIG. 8, for a wireless device (e.g., a receiving device, a UE, a base station, etc.) to decode an OC block (or a set of OC blocks) that is protected (encoded) with FEC, the wireless device may specify FEC encoding information (which may be referred to as "FEC metadata" for purposes of the present disclosure). In other words, an OC decoder may specify FEC metadata to decode an OC block. For example, an OC decoder (e.g., a RaptorQ decoder) may specify at least the symbol size (T), the source symbols (K), and the symbol index to decode an FEC protected OC block (which may be referred to as an "encoded OC block" hereafter). In addition, the FEC metadata may be specified to change dynamically. For example, the source symbols may change depending on the PDU set size, the symbol index may increase for each RLC PDU, etc. Most wireless communications may not have suitable/appropriate protocols for one wireless device to indicate the FEC metadata to another wireless device.

Aspects presented herein may improve the latency and power consumption for communications between wireless devices by enabling a transmitting wireless device to apply outer coding (OC) (e.g., FEC) to transmission(s), such that a receiving wireless device may be able to repair error transmissions without requesting retransmissions from the transmitting wireless device. Aspects presented herein may also improve the efficiency and reliability of FEC decoding (e.g., for OC block(s)) by enabling a transmitting wireless device to provide information (e.g., metadata) related to the FEC encoding and the OC block(s) to a receiving wireless device, such that the receiving wireless device may decode the OC block(s) encoded with FEC effectively based on the information.

FIG. 13 is a communication flow 1300 illustrating an example communication between wireless devices based on FEC and OC block(s) in accordance with various aspects of the present disclosure. The numberings associated with the communication flow 1300 do not specify a particular temporal order/relationship and are merely used as references for the communication flow 1300. A transmitting (Tx) device 1302 may be configured to transmit a set of data (e.g., a set of IP/PDCP packets such as video frames) to a receiving (Rx) device 1304, where the set of data may be encoded with FEC. The Tx device 1302 and/or the Rx device 1304 may be a network entity (e.g., a base station) or a UE. For example, the Tx device 1302 may be a base station and the Rx device 1304 may be a UE or vice versa, or both the Tx device 1302 and the Rx device 1304 may be UEs, etc.

At 1330, the Tx device 1302 may be configured to segment each PDCP packet in a plurality of PDCP packets into a set of OC symbols, where the plurality of PDCP packets may correspond to a PDU set, such as described in connection with FIGS. 7, 11A, 11B, 12A, and 12B.

At 1332, the Tx device 1302 may assemble multiple sets of OC symbols into an OC block (or a set of OC blocks), such as described in connection with FIGS. 11A (e.g., at 1110 and 1112), and 12A (e.g., at 1210 and 1212).

At 1334, the Tx device 1302 may apply an FEC encoding to the OC block (or the set of OC blocks), such as described in connection with FIGS. 6, 8, 11A, 11B, 12A, and 12B. Then, at 1336, the Tx device 1302 may output the OC block (or the set of OC blocks) based on the FEC encoding. For example, the Tx device 1302 may transmit the OC block(s) based on the FEC encoding (e.g., the encoded OC block(s)), and/or the Tx device 1302 may store the OC block(s) based on the FEC encoding, etc.

In one example, as shown at 1338, in association with transmitting the encoded OC block(s), the Tx device 1302 may also transmit FEC metadata 1306 to the Rx device 1304, where the FEC metadata 1306 may include information related to the FEC encoding and the (encoded) OC block(s) that may be used by the Rx device 1304 for decoding the encoded OC blocks and repair the OC blocks (if there is an error). Depending on the context, the FEC metadata may also be referred to as (or used interchangeably with) "OC metadata." Note that while the communication flow 1300 depicts the FEC metadata 1306 via a separate signaling at 1338, it is merely for illustration purposes. The FEC metadata 1306 may also be configured to be transmitted with the encoded OC block(s). For example, information related to the FEC and/or the encoded OC block(s) may be included in the header added to the OC block, which may be referred to as an "OC header" (which may be an OC pre-header or an OC post-header).

For example, as described in connection with FIG. 10, the Tx device 1302 may be configured to apply the FEC encoding to the OC block(s) via an OC sublayer, where the OC sublayer may be within (or located with) an RLC layer. As such, prior to transmitting an OC block, the Tx device 1302 may add an OC header and/or an RLC header to that OC block. In other words, an OC sublayer may be introduced in the RLC layer, which is capable of applying FEC (OC) encoding and decoding to a set of multiple PDCP packets (e.g., to an individual PDU, a PDU set, or a burst, etc.). In addition, the Tx device 1302 may segment the set of PDCP packets into a set of RLC packets based on OC symbol size. The OC sublayer may be configured to have its own header (which may be referred to as an "OC header") to indicate the FEC metadata 1306 to the Rx device 1304. For example, the OC header may include at least the symbol size (T), the source symbol(s) (K), and the symbol index associated with the FEC encoding and/or the OC block(s), which may be used by the Rx device 1304 for decoding the encoded OC block(s) as described in connection with FIG. 8.

In another aspect, the FEC metadata 1306 may indicate the segmentation and/or concatenations for OC symbol(s), as described in connection with FIGS. 11 and 12. In one implementation, the Tx device 1302 may be configured to reuse an RLC header (e.g., an existing RLC header) to indicate the segmentation of OC symbol(s) to the Rx device 1304. For example, LTE RLC header: FI (Frame Indicator), and LI (Length Indicator); and 5G NR RLC header: SI (Segment Information), and SO (Segmentation Offset), etc. Thus, segmentation fields of the RLC header may include TB size alignment and OC symbol segmentation (e.g., TB size alignment+OC symbol segmentation). In some implementations, the RLC header may be able to indicate whether a segmentation is for RLC purpose (e.g., for TB size alignment) or for OC symbol purpose. In another implementation, the Tx device 1302 may be configured to use a specified (e.g., new) field in an OC header to indicate the segmentation of OC symbol(s). As such, the segmentation fields of an RLC header may be used for TB size alignment, and the segmentation fields of the OC header may be used for the OC symbol segmentation.

In another aspect, the bit lengths of OC header fields (for the OC sublayer) may be configurable with radio resource control (RRC) message (e.g., to optimize the overhead of an OC header). For example, a network entity (e.g., the Tx device 1302, the Rx device 1304, a base station, etc.) may configure the bit lengths of symbol index and/or the source symbol(s) for a UE (e.g., the Tx device 1302, the Rx device 1304) via an RRC message/configuration. This may be different from an RLC header where the bit length of a sequence number (SN) may be configurable in an RRC message (e.g., SN-FieldLengthUM=12-bit or 18-bit).

In another aspect, an OC header or an RLC header may be used for indicating whether a symbol or a set of symbols are source symbols or parity symbols. In one example, an OC decoder (e.g., used by the Rx device 1304) may determine if an RLC packet is a source symbol or a parity symbol by comparing source symbols with the symbol index. For example, referring back to FIG. 8, if the symbol index of a symbol is smaller than or equal to the number of source symbols (K), then the symbol is a source symbol (Symbol index≤Source symbols (K)→Source symbol). On the other hand, if the symbol index of a symbol is greater than the number of source symbols (K), then the symbol is a parity symbol. In another example, or as an alternative, the (existing) RLC header or the OC header field may indicate whether a payload/packet is source symbol(s) or parity symbol(s). For example, the reserved bits of an RLC header may be used for indicating whether a payload includes source symbol(s) or parity symbol(s).

In another aspect, an RLC header may be used for indicating whether a payload is encoded/protected by OC or not. For example, the reserved bits of an RLC header may be used for indicating whether a payload is encoded/protected by OC. Similarly, in another aspect, an RLC header may be used for indicating whether an FEC header is present or not. For example, the reserved bits of an RLC header may be used for indicating whether an FEC header is present.

In some implementations, the OC/RLC header field(s) described above may be configured to be transparent to an OC decoder (e.g., transparent to the Rx device 1304). As such, the Tx device 1302 may be configured not to encode these OC/RLC header field(s) with FEC. For purposes of the present disclosure, a header that is added to an OC block after the FEC is applied to the OC block (e.g., an encoded OC block) may be referred to as an "OC post-header," whereas a header that is added to an OC block prior to the FEC is applied to the OC block may be referred to as an "OC pre-header."

In another aspect, to reduce the overhead, the Tx device 1302 may be configured to transmit/deliver some information in the FEC metadata 1306 (which may also be referred to as "FEC metadata information") to the Rx device 1304 over a control plane (CP) message or PDU set metadata. For example, the Tx device 1302 may indicate the (OC) symbol size for the FEC encoding/OC block(s) to the Rx device 1304 over a CP message. In another example, the Rx device 1304 may be configured to estimate the symbol index for the FEC encoding/OC block(s) from the PDU index of a PDU set in PDU set metadata. In another example, the Rx device 1304 may be configured to estimate the block index for the FEC encoding/OC block(s) from the PDU set index in the PDU set metadata. In another example, the Rx device 1304 may be configured to estimate the source symbol(s) for the FEC encoding/OC block(s) from the PDU set size in PDU set metadata.

In another aspect, to reduce the overhead, an RLC header may be reused for providing some FEC metadata information. For example, the Rx device 1304 may be configured to estimate the symbol size for the FEC encoding/OC block(s) from the segmented RLC PDU size, and/or estimate the symbol index for the FEC encoding/OC block(s) from the RLC header information (e.g., SN, SI, SO, etc.).

In another aspect of the present disclosure, wireless communication system, such as 5G NR, may enable the Tx device 1302 and/or the Rx device 1304 to request a fixed IP packet size to application server or client.

At 1340, the Rx device 1304 may assemble one or more OC symbols of a PDU set received from the Tx device 1302 into a set of OC blocks. As described in connection with 1330, the PDU set may include a plurality of PDCP packets, and each PDCP packet in the plurality of PDCP packets may include a set of OC symbols.

At 1342, the Rx device 1304 may apply an FEC decoding to the set of OC blocks. For example, the Rx device 1304 may decode the encoded OC block(s)/symbol(s) from the Tx device 1302 based on the FEC metadata 1306. Then, at 1344, the Rx device 1304 may reconstruct the PDU set from the set of OC blocks based on the FEC decoding.

Figure 14:
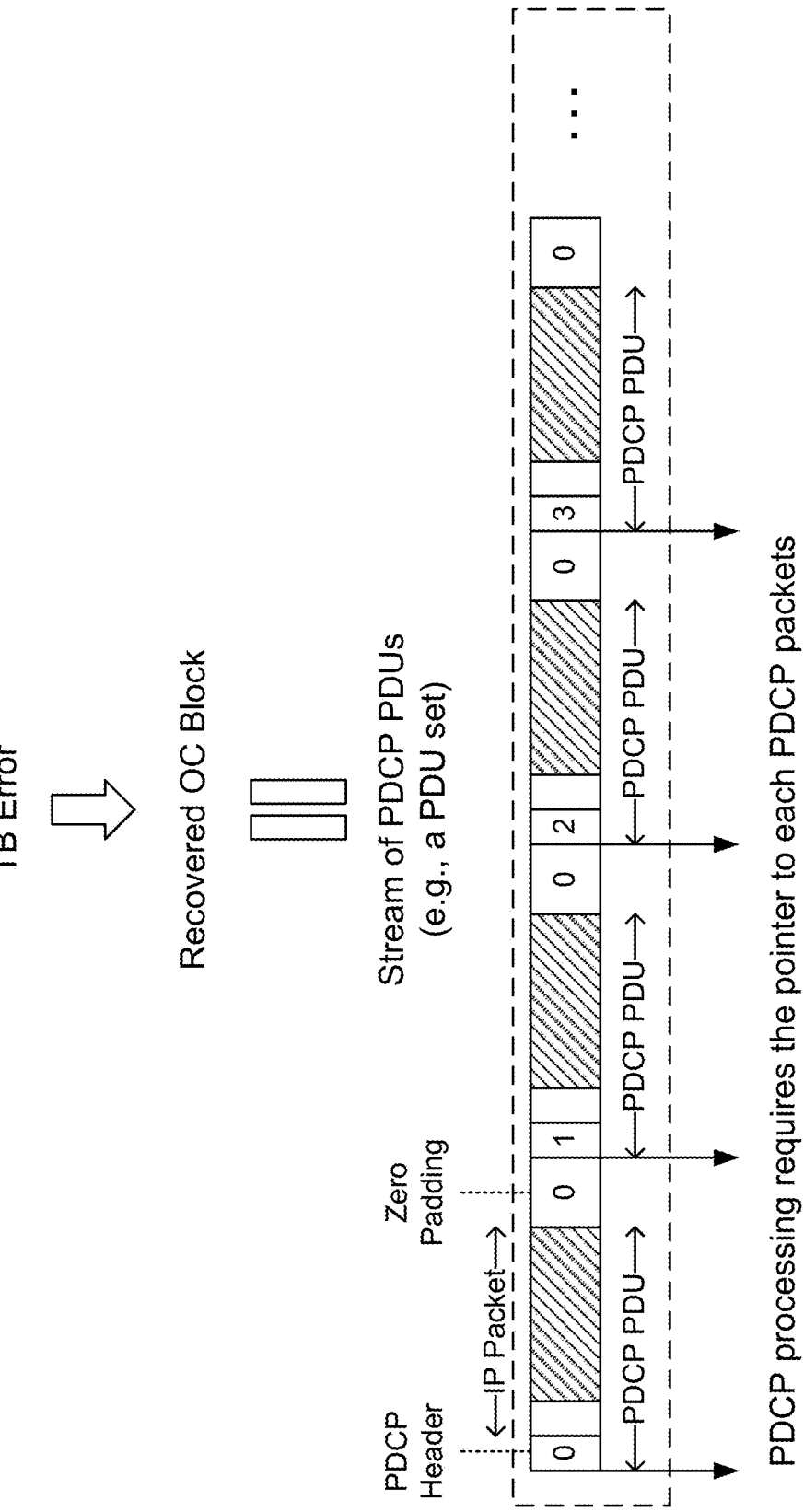
FIG. 14 is a diagram illustrating an example of recovering an OC block from a transport block (TB) error in accordance with various aspects of the present disclosure.

FIG. 14 is a diagram 1400 illustrating an example of recovering an OC block from a transport block (TB) error in accordance with various aspects of the present disclosure. When a TB error happens (e.g., the transmission of the TB is incomplete, the Rx device 1304 is unable to decode the TB, etc.), the PDCP PDUs related to the TB may be recovered from the OC block, where the recovered OC block may be represented by a stream of PDCP PDUs (e.g., a PDU Set). In some wireless communication implementations, PDCP processing may specify a pointer to each PDCP PDU in the stream of PDCP PDUs (e.g., even when the entire OC block is recovered). For example, PDCP processing functions (e.g., ciphering, integrity, ROHC, etc.) may be specified to be conducted for each PDCP PDU, and data radio bearer (DRB) IP protection check may be specified, etc. In some scenarios, there may be issues associated with specifying a pointer to each PDCP PDU in the stream of PDCP PDUs. For example, a PDCP header may not have a length indicator, an RLC header may not have a length indicator, and/or a MAC sub-header may have the length indicator but the MAC header may not be encoded by the OC block, etc. Thus, when an OC block is recovered by FEC, an OC decoder may not know the boundary of each PDCP PDU in a recovered OC block.

Figure 15:
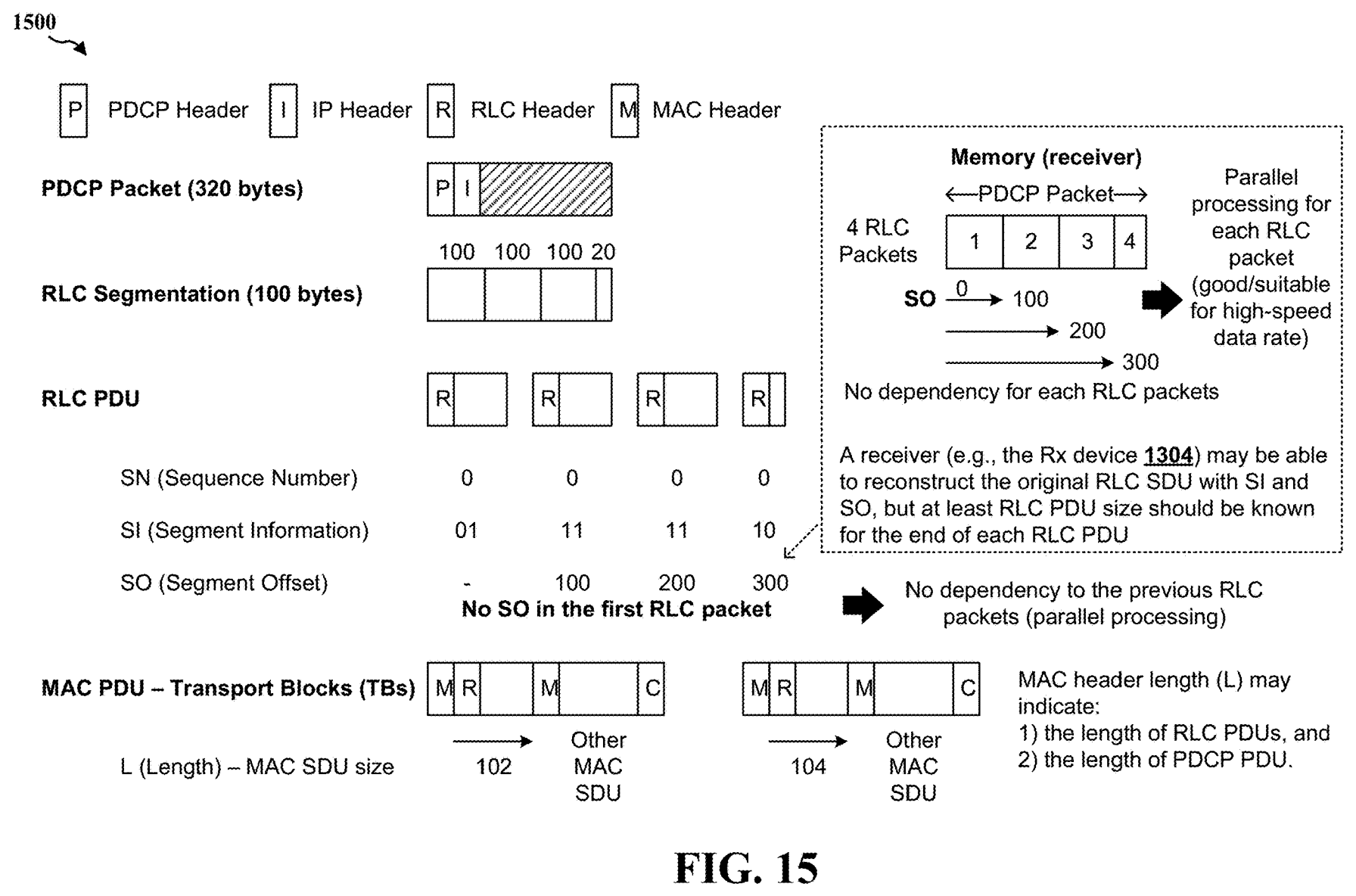

FIG. 15 is a diagram 1500 illustrating an example RLC segmentation in accordance with various aspects of the present disclosure. As shown by the diagram 1500, in most network implementations, the PDCP PDU size and/or the RLC PDU size may be indicated by the length of a MAC header. However, the MAC header may not be available when an OC block is recovered by FEC (e.g., OC at the RLC layer). Thus, an OC decoder (e.g., the Rx device 1304) may not know the boundary of PDCP packet(s) when an OC block is recovered.

Referring back to FIG. 13, in another aspect of the present disclosure, at 1338, the Tx device 1302 may be configured to indicate the boundary of a PDCP packet (or boundaries of PDCP packets) to the Rx device 1304, such as by including a PDCP boundary indication in the FEC metadata 1306 (e.g., in an OC header of an OC block). For example, the Tx device 1302 may be configured to add a field in an OC header which indicates the boundary (e.g., the length) of each PDCP PDU, and the Rx device 1304 (or its OC decoder) may recover the individual PDCP PDU based on this field information. The OC header (or the field information) may include a start indicator and/or a length indicator of a PDCP PDU, where the start indicator and/or the length indicator may be protected by FEC (e.g., they may be added to an OC pre-header).

In another example (or as an alternative), the Tx device 1302 may be configured to add a field in an OC header which indicates the segmentation (e.g., the segmentation information, length, etc.) of each RLC packet, and the Rx device 1304 (or its OC decoder) may recover the PDCP PDU(s) by aggregating the segmented RLC packets based on this field information. In some implementations, the Tx device 1302 may be configured to use/reuse an RLC header to indicate the segmentation of RLC PDUs. For example, an LTE RLC layer may have the length information (LI), but it may not allow to have the length information for the last segmented RLC PDU. On the other hand, a 5G RLC layer may not have the length information, but it may provide the segmented offset (SO) instead. As such, an RLC header may be configured to provide the length information for all segmented RLC PDUs including the last segmented RLC PDU. In another example, new fields in the OC header may be introduced/configured to indicate the segmentation for OC symbol. Similarly, the RLC PDU boundary indicator described herein (e.g., the RLC header and the new fields in the OC header) may be protected by FEC.

In another example (or as an alternative), the Rx device 1304 may be configured to inspect upper layer information (e.g., the total length in each IP header) to make/recover the individual PDCP PDU. However, as ciphering at a PDCP layer may make an IP header invisible/transparent at the RLC layer, the IP packets may be configured not be ciphered at the PDCP layer.

In some scenarios, when a set of source packets have error(s), the Rx device 1304 may be configured/specified to recover the fields mentioned above (e.g., the fields related to the boundary of PDCP PDU(s)/RLC packet(s)) by FEC in order to reconstruct the PDCP PDU(s). As such, in another aspect of the present disclosure, to indicate the boundary of PDCP PDU(s), the Tx device 1302 may be configured to add each PDCP length in an OC header with FEC protection. In other words, the Tx device 1302 may add these field(s) before FEC is applied (e.g., the field(s) is added to an OC pre-header), such that the FEC may apply to these field(s). In another example (or as an alternative), the Tx device 1302 may be configured to add a list of all PDCP lengths in an OC header with FEC protection. Similarly, the Tx device 1302 may add these field(s) before FEC is applied (e.g., the field(s) is added to an OC pre-header). Also, to list up all the PDCP lengths, the Tx device 1302 may be configured to add these fields in the last part of an OC block. In another example (or as an alternative), the Tx device 1302 may be configured to add the list of all the PDCP lengths in an OC header without FEC protection. In other words, the Tx device 1302 may add these field(s) after FEC is applied (e.g., the field(s) is added to an OC post-header). Such configuration may ensure that at least one of them is delivered to the Rx device 1304 (e.g., one or more parity symbols, or all parity symbols, etc.).

Figure 16:
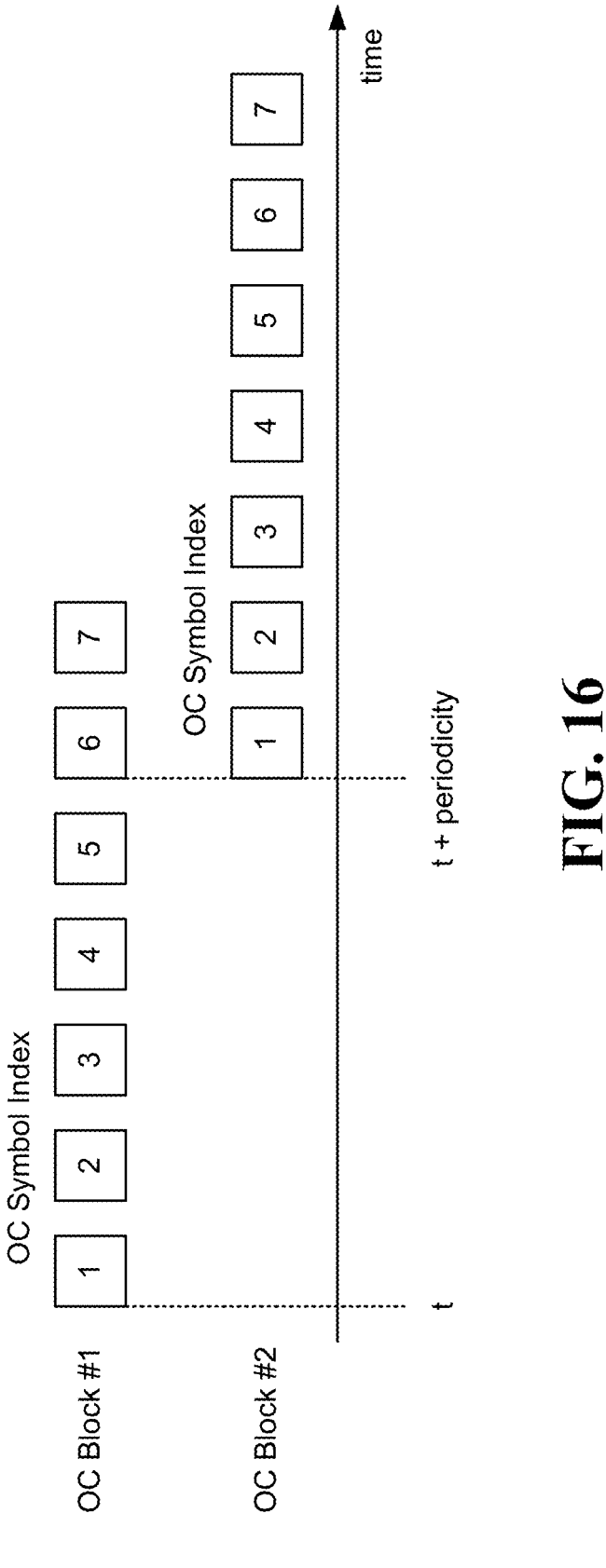
FIG. 16 is a diagram illustrating an example of OC block transmission overlapping in accordance with various aspects of the present disclosure.

FIG. 16 is a diagram 1600 illustrating an example of OC block transmission overlapping in accordance with various aspects of the present disclosure. In some scenarios, if an OC block transmission period (e.g., for a first OC block (#1 or #N) at a first point in time (t)) is delayed and it overlaps with the next OC block transmission period (e.g., for a second OC block (#2 or #N+1) at a second point in time (t+periodicity)), a receiving device (e.g., the Rx device 1304) may specify a mechanism/method to distinguish the received OC blocks (e.g., figure out which OC block the received OC symbol(s) comes from).

Referring back to FIG. 13, in another aspect of the present disclosure, at 1338, the Tx device 1302 may be configured to indicate index of OC block(s) (which may be referred to as an "OC block index" to the Rx device 1304, such as by including an OC block index indication in the FEC metadata 1306 (e.g., in an OC header of an OC block). For example, the Tx device 1302 may include/introduce an OC block index to indicate which OC block a set of OC symbols belong to. In addition, as this OC block index field may be transparent to an OC decoder (e.g., the Rx device 1304), the OC block index field may be configured not to be encoded by FEC (e.g., it may be added to an OC post-header). Based on knowing the index of OC block(s), a receiving device (e.g., the Rx device 1304) may be able to distinguish different OC blocks received and/or OC symbols belonging to a particular OC block.

FIG. 17 is a diagram 1700 illustrating an example of an OC block with FEC metadata (e.g., the FEC metadata 1306) in accordance with various aspects of the present disclosure. As shown by the diagram 1700, a transmitting device (e.g., the Tx device 1302) may add an RLC header, an OC post-header, and an OC pre-header to an OC block to provide FEC/OC metadata to a receiving device (e.g., the Rx device 1304), such as described in connection with FIG. 13. In addition, the transmitting device may be configured not to protect the RLC header and the OC post-header with FEC, and just protect the OC pre-header and the payload (e.g., data) with the FEC.

Table 2 below provides an example list of elements of an OC post-header. Note the bit sizes may vary based on the FEC model used.

TABLE 2

Example elements of an OC post-header

| Elements of OC post-header | Header | Bits | OC Encoding | Description |
|---|---|---|---|---|
| OC Encoding/ OC Metadata | RLC | 2 | No | To indicate whether a packet is encoded by OC/FEC or not. To indicate whether OC/FEC metadata is included or not |
| Type | OC | 3 | No | To indicate the OC/FEC Type (e.g., RaptorQ, RS, etc.) |
| Block Index | OC | 4 | No | To indicate the OC block index |
| Symbol Index | OC | 24 | No | To indicate the symbol index (ESI) |
| Extension | OC | 2 | No | To indicate the field extension for OC information |
| Symbol Size | OC | 16 | No | To indicate the OC symbol size (T) |
| Source Symbols | OC | 14 | No | To indicate the number of source symbols (K) |

In some examples, the transmitting device may send/indicate some elements, such as the symbol size and the source symbols, to the receiving device over a MAC sub-header per TB level to save the overhead of the OC/FEC metadata.

Table 3 below provides an example list of elements of an OC pre-header. Note the bit sizes may vary based on the FEC model used.

TABLE 3

Example elements of an OC pre-header

| Elements of OC pre-header | Header | Bits | OC Encoding | Description |
|---|---|---|---|---|
| OC Encoding/ OC Metadata | OC | 1 | Yes | To indicate the start of PDCP packet (similar to SI in an RLC header) |
| Type | OC | 14 | Yes | To indicate the size of PDCP packet (e.g., max 9000 byte = 14 bits) |

Referring back to FIG. 13. In some scenarios, the Tx device 1302 may be specified to process the PDCP PDU(s) before applying FEC to the OC block. In other words, PDCP processing may be specified to happen before FEC protection starts. For example, integrity and/or cyphering of PDCP PDU(s) may specify PDCP sequence(s). In addition, there may be no processing for service data adaptation protocol (SDAP) and PDCP headers. Also, FEC/OC metadata may be presented for both source symbols and parity symbols as an FEC/OC decoder (e.g., the Rx device 1304) may be configured to look into just the FEC/OC metadata. Then, the OC layer/sublayer may process an OC header and determine if an OC symbol is a source symbol or not. If a set of OC symbols are source symbols (e.g., SDAP/PDCP header in a payload), the OC layer/sublayer may send them to OC processing and PDCP processing. On the other hand, if a set of OC symbols are parity symbols (e.g., No SDAP/PDCP header in payload), the OC layer/sublayer may do the OC processing and then subsequently do the PDCP processing.

Figure 18:
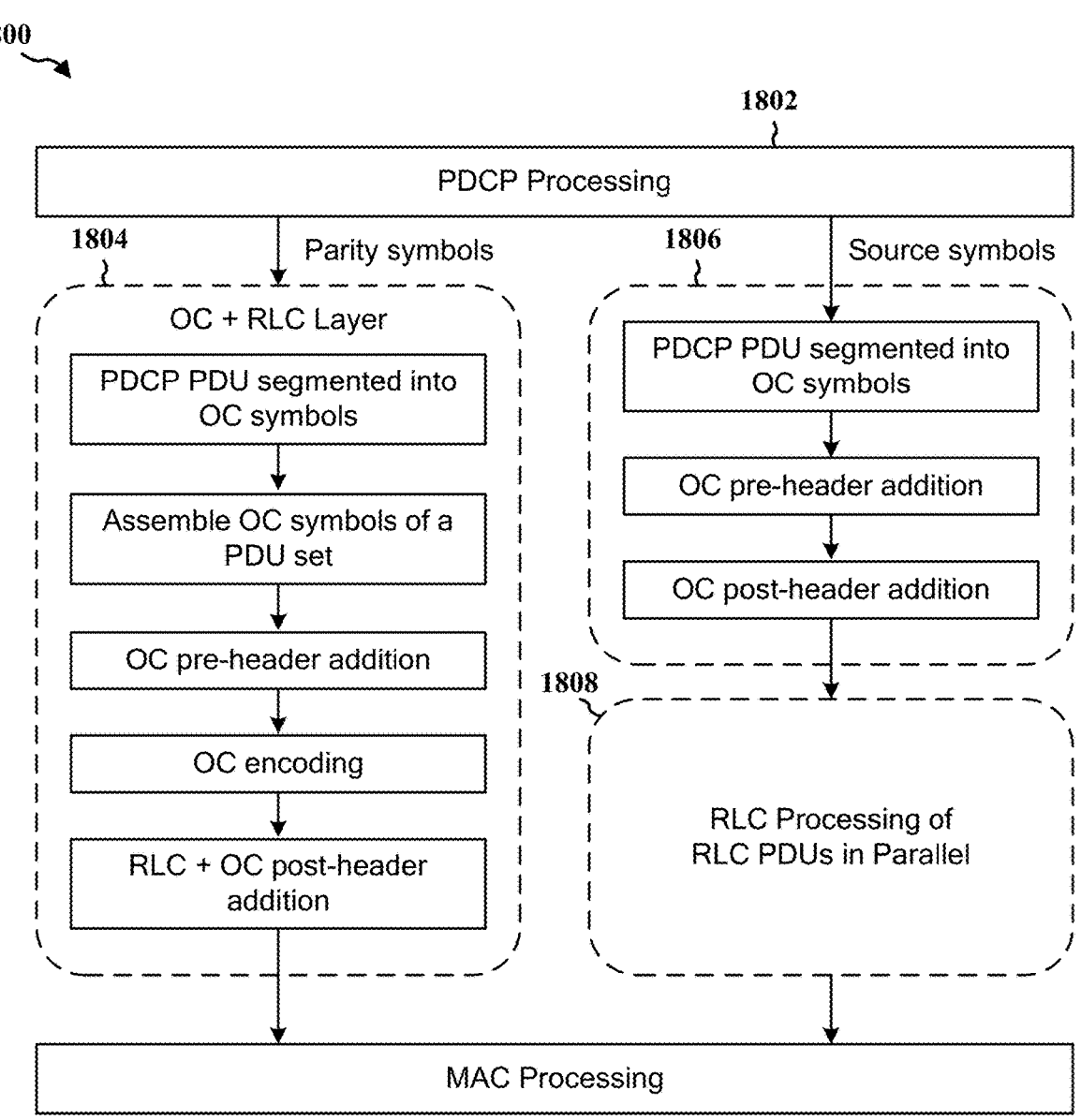
FIG. 18 is a diagram illustrating an example transmission sequence of operations for an RLC integrated OC sub-layer in accordance with various aspects of the present disclosure.

FIG. 18 is a diagram 1800 illustrating an example transmission sequence of operations for an RLC integrated OC sub-layer (e.g., performed by the Tx device 1302) in accordance with various aspects of the present disclosure. As shown at 1802, when a wireless device (e.g., the Tx device 1302) is configured to transmit a set of data (e.g., IP packets), the wireless device may first process the set of data at a PDCP layer, such as adding PDCP headers to the set of data as described in connection with FIGS. 9, 11A, 11B, 12A, and 12B. The set of data after the PDCP processing may be converted to a set of PDCP PDUs and passed to an RLC layer that is integrated with an OC layer/sublayer (e.g., an OC+RLC layer) as described in connection with FIGS. 10, 11A, 11B, 12A, and 12B, where the set of PDCP PDUs (e.g., an OC block) may include a set of source OC symbols followed by a set of parity OC symbols (e.g., for FEC) as described in connection with FIGS. 6, 8, 11A, 11B, 12A, and 12B.

As shown at 1804, at the OC+RLC layer, for PDCP PDU(s) that include the set of parity symbols, the wireless device may segment each PDCP PDU into a set of OC symbols, where the size of the OC symbol may be determined based on feedback(s) from a PHY layer. In addition, as described in connection with FIGS. 11 and 12, in some implementations, zero padding may be assumed in the generation of the last OC symbol of a PDCP PDU but not transmitted. Then, the wireless device (or the OC+RLC layer) may assemble OC symbols of a PDU set into an OC block, such as described in connection with FIGS. 11 and 12, and the wireless device may add an OC pre-header to each OC symbol. After that, the wireless device may apply an OC encoding to the OC block, where each encoded OC symbol may be considered as one RLC SDU. Then, the wireless device may add an OC post-header and an RLC header to the OC block and submit the OC block to a MAC layer.

On the other hand, as shown at 1806, at the OC+RLC layer, for PDCP PDU(s) that include the set of source symbols, the wireless device may also segment each PDCP PDU into a set of OC symbols, and add an OC pre-header and an OC post-header to the set of OC symbols. Then, as shown at 1808, the wireless device may perform RLC processing for the set of OC symbols (e.g., converting to a set of RLC PDUs), and submit the set of RLC processed OC symbols (e.g., the set of RLC PDUs) to the MAC layer (for transmission).

Figure 19:
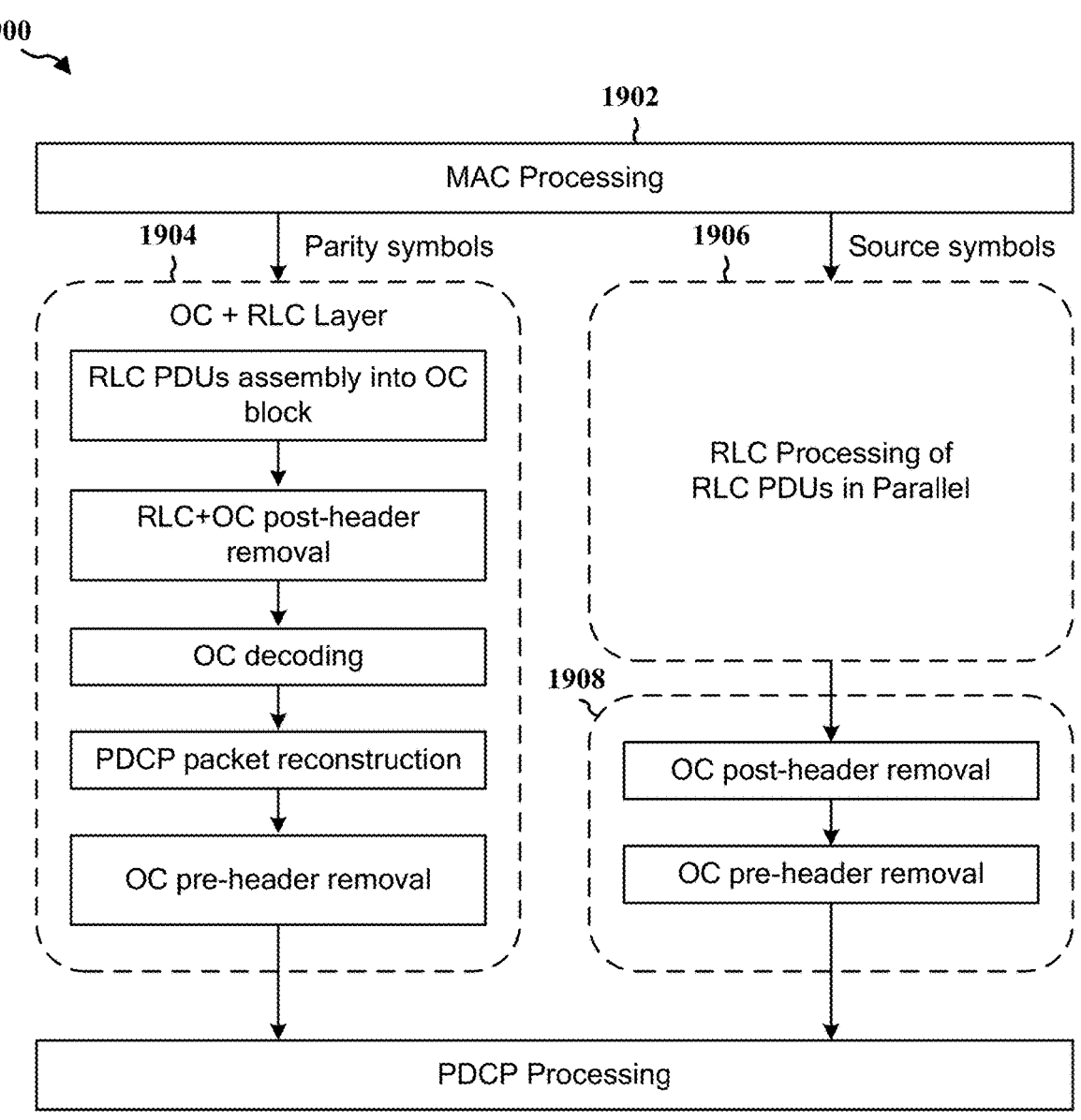
FIG. 19 is a diagram illustrating an example reception sequence of operations for an RLC integrated OC sub-layer in accordance with various aspects of the present disclosure.

FIG. 19 is a diagram 1900 illustrating an example reception sequence of operations for an RLC integrated OC sub-layer (e.g., performed by the Rx device 1304) in accordance with various aspects of the present disclosure. As shown at 1902, after a wireless device (e.g., the Rx device 1304) receives a set of RLC PDUs, the wireless device may first process the set of RLC PDUs at a MAC layer, where the set of RLC PDUs may also include a set of parity symbols and a set of source symbols.

As shown at 1904, at the OC+RLC layer, for RLC PDU(s) that include the set of parity symbols, the wireless device may assemble these RLC PDU(s) into OC symbols, and assemble OC symbols of a PDU set into an OC block. Then, the wireless device may remove the RLC header and the OC pre-header, and apply an OC decoding to the OC block. The wireless device then reconstructs the PDCP PDU(s) based on the OC decoding, remove OC pre-header from the reconstructed PDCP PDU(s), and submit them to the PDCP layer for processing.

On the other hand, as shown at 1906 and 1908, at the OC+RLC layer, for RLC PDU(s) that include the set of source symbols, the wireless device may perform RLC processing for these RLC PDUs in parallel, remove the OC pre-header and the OC post-header from these RLC PDUs, and submit these RLC PDUs to the PDCP layer for processing.

FIG. 20A is a diagram 2000A illustrating an example of RLC functions for LTE in accordance with various aspects of the present disclosure. As shown by the diagram 2000A, an RLC layer for LTE may include performing transmission buffer, segmentation and concatenation of packets, and addition of RLC header, etc.

FIG. 20B is a diagram 2000B illustrating an example of RLC functions for 5G NR in accordance with various aspects of the present disclosure. As shown by the diagram 2000B, an RLC layer for 5G NR may include generate RLC header and store in transmission buffer, segmentation and modify RLC header, and add RLC header, etc.

FIG. 20C is a diagram 2000C illustrating an example of RLC and OC functions in accordance with various aspects of the present disclosure. As shown by the diagram 2000C, the OC+RLC layer described in connection with FIGS. 18 and 19 may be configured to include additional functions such as OC block grouping, OC pre-header addition, OC encoding, and/or OC post-header addition compared to the RLC functions for LTE and 5G NR shown by the diagrams 2000A and 2000B.

In another aspect of the present disclosure, while aspects discussed in connection with FIGS. 10, 13, 17, 18, 19, and 20C are based on adding an OC layer/sublayer at an RLC layer (e.g., adding a set of OC functions to the RLC functions), aspects presented herein may also extend to other protocol layers, such as to an SDAP layer (e.g., an OC+SDAP layer), to a PDCP layer (e.g., an OC+PDCP layer), and/or to a MAC layer (e.g., an OC+MAC layer), etc. In another example (or as an alternative), the OC layer may be an individual layer (e.g., a new protocol layer) itself that is separated from existing layers (e.g., different layer from SDAP, PDCP, RLC, and MAC layer, etc.).

Aspects presented herein may enable network coding at RAN, which may improve the system performances of latency and power consumption. Based on the concept of outer code (OC) for wireless system, aspects presented herein provide OC between RLC and PDCP layers.

Figure 21:
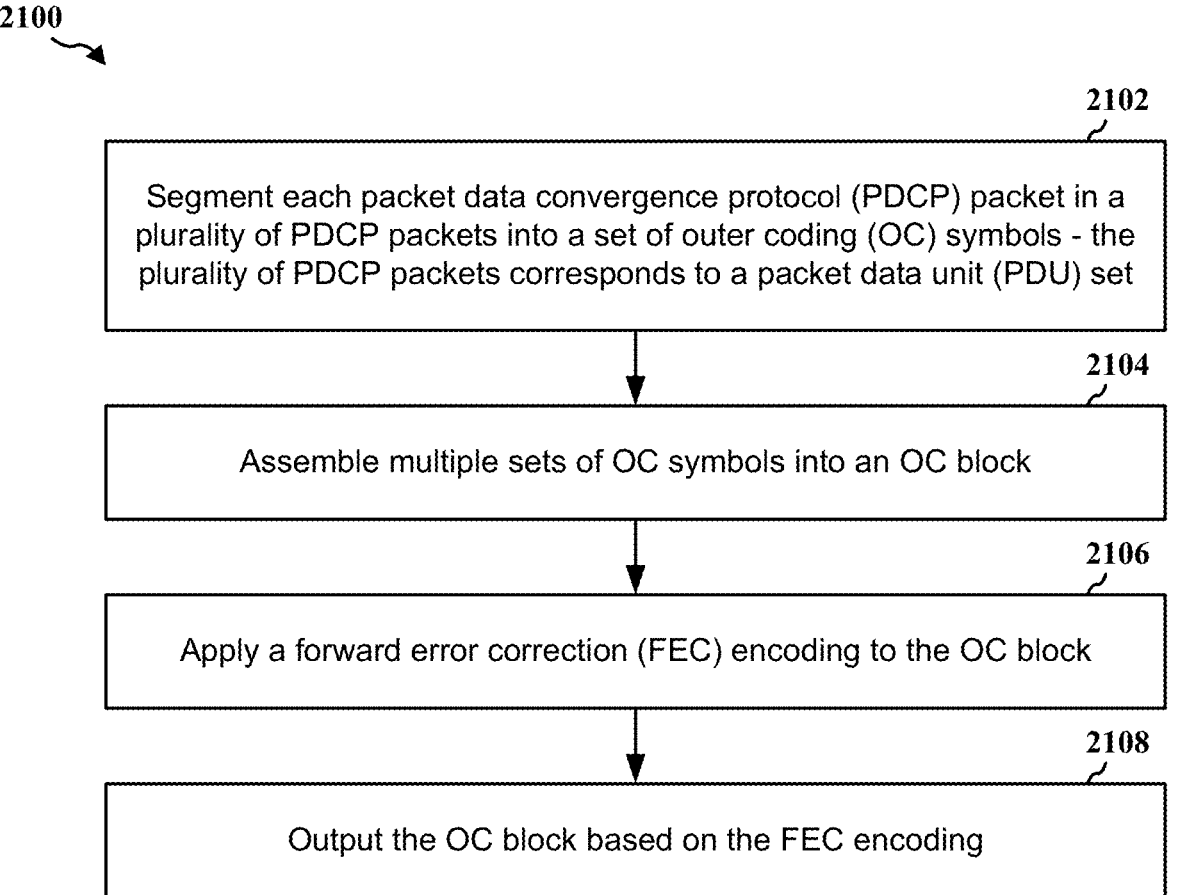
FIG. 21 is a flowchart of a method of wireless communication.

FIG. 21 is a flowchart 2100 of a method of wireless communication. The method may be performed by a wireless device (e.g., the UE 104; the Tx device 1302; the base station 102; the apparatus 2304; the network entity 2402). The method may enable the wireless device (e.g., a transmitting wireless device) to apply an FEC encoding to an OC block (e.g., a plurality of PDCP packets) and provide information (e.g., metadata) related to the FEC encoding and the OC block(s) to another wireless device (e.g., a receiving wireless device) receiving the OC block, thereby improving the latency and power consumption for communications between the two wireless devices.

At 2102, the wireless device may segment each PDCP packet in a plurality of PDCP packets into a set of OC symbols, where the plurality of PDCP packets corresponds to a PDU set, such as described in connection with FIGS. 11 to 13. For example, as discussed in connection with 1330 of FIG. 13, the Tx device 1302 may segment each PDCP packet in a plurality of PDCP packets into a set of OC symbols, where a PDU set may include a plurality of PDCP packets. The segmentation of each PDCP packet may be performed by, e.g., the OC/FEC encoding and decoding component 198, the transceiver(s) 2322, the cellular baseband processor(s) 2324, and/or the application processor(s) 2306 of the apparatus 2304 in FIG. 23, and/or may be performed by, e.g., the OC/FEC encoding and decoding component 199, the transceiver(s) 2446, the RU processor(s) 2442, the DU processor(s) 2432, and/or the CU processor(s) 2412, of the network entity 2402 in FIG. 24.

At 2104, the wireless device may assemble multiple sets of OC symbols into an OC block, such as described in connection with FIGS. 11 to 13. For example, as discussed in connection with 1332 of FIG. 13, the Tx device 1302 may assemble multiple sets of OC symbols into an OC block. The assembling of the one or more OC symbols may be performed by, e.g., the OC/FEC encoding and decoding component 198, the transceiver(s) 2322, the cellular baseband processor(s) 2324, and/or the application processor(s) 2306 of the apparatus 2304 in FIG. 23, and/or may be performed by, e.g., the OC/FEC encoding and decoding component 199, the transceiver(s) 2446, the RU processor(s) 2442, the DU processor(s) 2432, and/or the CU processor(s) 2412, of the network entity 2402 in FIG. 24.

At 2106, the wireless device may apply an FEC encoding to the OC block, such as described in connection with FIGS. 6, 8, and 11 to 13. For example, as discussed in connection with 1334 of FIG. 13, the Tx device 1302 may apply an FEC encoding to the OC block. The application of the FEC encoding may be performed by, e.g., the OC/FEC encoding and decoding component 198, the transceiver(s) 2322, the cellular baseband processor(s) 2324, and/or the application processor(s) 2306 of the apparatus 2304 in FIG. 23, and/or may be performed by, e.g., the OC/FEC encoding and decoding component 199, the transceiver(s) 2446, the RU processor(s) 2442, the DU processor(s) 2432, and/or the CU processor(s) 2412, of the network entity 2402 in FIG. 24.

At 2108, the wireless device may output the OC block based on the FEC encoding, such as described in connection with FIGS. 11 to 13. For example, as discussed in connection with 1336 of FIG. 13, the Tx device 1302 may output the OC block based on the FEC encoding, such as transmitting the encoded OC block(s) to the Rx device 1304. The outputting of the OC block may be performed by, e.g., the OC/FEC encoding and decoding component 198, the transceiver(s) 2322, the cellular baseband processor(s) 2324, and/or the application processor(s) 2306 of the apparatus 2304 in FIG. 23, and/or may be performed by, e.g., the OC/FEC encoding and decoding component 199, the transceiver(s) 2446, the RU processor(s) 2442, the DU processor(s) 2432, and/or the CU processor(s) 2412, of the network entity 2402 in FIG. 24.

In one example, to output the OC block based on the FEC encoding, the wireless device may transmit the OC block based on the FEC encoding, or store the OC block based on the FEC encoding.

In another example, the wireless device may transmit information related to the FEC encoding via a control plane (CP) message or based on PDU set metadata.

In another example, to apply the FEC encoding to the OC block, the wireless device may apply the FEC encoding to the OC block via an OC sublayer in an RLC layer.

In another example, the wireless device may add at least one of an OC header or an RLC header to the OC block, where the OC header may include at least one of: a symbol size (T), a set of source symbols (K), or a symbol index associated with the FEC encoding. In some implementations, to add at least one of the OC header or the RLC header to the OC block, the wireless device may add at least one of the OC header or the RLC header to the OC block after the application of the FEC encoding to the OC block. In some implementations, the OC header or the RLC header may indicate segmentation or concatenation information for the set of OC symbols. In some implementations, the wireless device may receive a bit length configuration for a set of OC header fields in the OC header via an RRC message. In some implementations, the OC header or the RLC header may indicate at least one of: whether a set of symbols in the OC block or a payload is a second set of source symbols or a set of parity symbols, whether the payload is protected by OC, or whether an FEC header is present. In some implementations, the OC header may include an indication of a boundary for a PDCP packet in the plurality of PDCP packets. In some implementations, the indication may include at least one of a start indicator of the PDCP packet, or a length indicator of the PDCP packet. In some implementations, the start indicator and the length indicator may be encoded by the FEC encoding. In some implementations, the OC header may include an indication of a boundary for an RLC packet. In some implementations, the OC header may include an OC block index for the OC block.

In another example, to apply the FEC encoding to the OC block, the wireless device may apply the FEC encoding to the OC block via at least one of: an OC layer, a first OC sublayer in a service data adaption protocol (SDAP) layer, a second OC sublayer in a PDCP layer, or a third OC sublayer in a medium access control (MAC) layer.

FIG. 22 is a flowchart 2200 of a method of wireless communication. The method may be performed by a wireless device (e.g., the UE 104; the Tx device 1302; the base station 102; the apparatus 2304; the network entity 2402). The method may enable the wireless device (e.g., a transmitting wireless device) to apply an FEC encoding to an OC block (e.g., a plurality of PDCP packets) and provide information (e.g., metadata) related to the FEC encoding and the OC block(s) to another wireless device (e.g., a receiving wireless device) receiving the OC block, thereby improving the latency and power consumption for communications between the two wireless devices.

At 2202, the wireless device may segment each PDCP packet in a plurality of PDCP packets into a set of OC symbols, where the plurality of PDCP packets corresponds to a PDU set, such as described in connection with FIGS. 11 to 13. For example, as discussed in connection with 1330 of FIG. 13, the Tx device 1302 may segment each PDCP packet in a plurality of PDCP packets into a set of OC symbols, where a PDU set may include a plurality of PDCP packets. The segmentation of each PDCP packet may be performed by, e.g., the OC/FEC encoding and decoding component 198, the transceiver(s) 2322, the cellular baseband processor(s) 2324, and/or the application processor(s) 2306 of the apparatus 2304 in FIG. 23, and/or may be performed by, e.g., the OC/FEC encoding and decoding component 199, the transceiver(s) 2446, the RU processor(s) 2442, the DU processor(s) 2432, and/or the CU processor(s) 2412, of the network entity 2402 in FIG. 24.

At 2204, the wireless device may assemble multiple sets of OC symbols into an OC block, such as described in connection with FIGS. 11 to 13. For example, as discussed in connection with 1332 of FIG. 13, the Tx device 1302 may assemble multiple sets of OC symbols into an OC block. The assembling of the one or more OC symbols may be performed by, e.g., the OC/FEC encoding and decoding component 198, the transceiver(s) 2322, the cellular baseband processor(s) 2324, and/or the application processor(s) 2306 of the apparatus 2304 in FIG. 23, and/or may be performed by, e.g., the OC/FEC encoding and decoding component 199, the transceiver(s) 2446, the RU processor(s) 2442, the DU processor(s) 2432, and/or the CU processor(s) 2412, of the network entity 2402 in FIG. 24.

At 2206, the wireless device may apply an FEC encoding to the OC block, such as described in connection with FIGS. 6, 8, and 11 to 13. For example, as discussed in connection with 1334 of FIG. 13, the Tx device 1302 may apply an FEC encoding to the OC block. The application of the FEC encoding may be performed by, e.g., the OC/FEC encoding and decoding component 198, the transceiver(s) 2322, the cellular baseband processor(s) 2324, and/or the application processor(s) 2306 of the apparatus 2304 in FIG. 23, and/or may be performed by, e.g., the OC/FEC encoding and decoding component 199, the transceiver(s) 2446, the RU processor(s) 2442, the DU processor(s) 2432, and/or the CU processor(s) 2412, of the network entity 2402 in FIG. 24.

At 2208, the wireless device may output the OC block based on the FEC encoding, such as described in connection with FIGS. 11 to 13. For example, as discussed in connection with 1336 of FIG. 13, the Tx device 1302 may output the OC block based on the FEC encoding, such as transmitting the encoded OC block(s) to the Rx device 1304. The outputting of the OC block may be performed by, e.g., the OC/FEC encoding and decoding component 198, the transceiver(s) 2322, the cellular baseband processor(s) 2324, and/or the application processor(s) 2306 of the apparatus 2304 in FIG. 23, and/or may be performed by, e.g., the OC/FEC encoding and decoding component 199, the transceiver(s) 2446, the RU processor(s) 2442, the DU processor(s) 2432, and/or the CU processor(s) 2412, of the network entity 2402 in FIG. 24.

In one example, to output the OC block based on the FEC encoding, the wireless device may transmit the OC block based on the FEC encoding, or store the OC block based on the FEC encoding.

In another example, the wireless device may transmit information related to the FEC encoding via a CP message or based on PDU set metadata.

In another example, to apply the FEC encoding to the OC block, the wireless device may apply the FEC encoding to the OC block via an OC sublayer in an RLC layer.

In another example, as shown at 2210, the wireless device may add at least one of an OC header or an RLC header to the OC block, where the OC header may include at least one of: a symbol size (T), a set of source symbols (K), or a symbol index associated with the FEC encoding, such as described in connection with FIGS. 11 to 13. For example, as discussed in connection with 1338 of FIG. 13, in association with transmitting the encoded OC block(s), the Tx device 1302 may also transmit FEC metadata 1306 to the Rx device 1304, where the FEC metadata 1306 may include information related the FEC encoding and the (encoded) OC block(s) that may be used by the Rx device 1304 for decoding the encoded OC blocks and repair the OC blocks (if there is an error). The FEC metadata 1306 may also be configured to be transmitted with the encoded OC block(s). For example, information related to the FEC and/or the encoded OC block(s) may be included in the header added to the OC block, which may be referred to as an "OC header" (which may be an OC pre-header or an OC post-header). The addition of the OC header of the RLC header may be performed by, e.g., the OC/FEC encoding and decoding component 198, the transceiver(s) 2322, the cellular baseband processor(s) 2324, and/or the application processor(s) 2306 of the apparatus 2304 in FIG. 23, and/or may be performed by, e.g., the OC/FEC encoding and decoding component 199, the transceiver(s) 2446, the RU processor(s) 2442, the DU processor(s) 2432, and/or the CU processor(s) 2412, of the network entity 2402 in FIG. 24. In some implementations, to add at least one of the OC header or the RLC header to the OC block, the wireless device may add at least one of the OC header or the RLC header to the OC block after the application of the FEC encoding to the OC block. In some implementations, the OC header or the RLC header may indicate segmentation or concatenation information for the set of OC symbols. In some implementations, the wireless device may receive a bit length configuration for a set of OC header fields in the OC header via an RRC message. In some implementations, the OC header or the RLC header may indicate at least one of: whether a set of symbols in the OC block or a payload is a second set of source symbols or a set of parity symbols, whether the payload is protected by OC, or whether an FEC header is present. In some implementations, the OC header may include an indication of a boundary for a PDCP packet in the plurality of PDCP packets. In some implementations, the indication may include at least one of a start indicator of the PDCP packet, or a length indicator of the PDCP packet. In some implementations, the start indicator and the length indicator may be encoded by the FEC encoding. In some implementations, the OC header may include an indication of a boundary for an RLC packet. In some implementations, the OC header may include an OC block index for the OC block.

In another example, to apply the FEC encoding to the OC block, the wireless device may apply the FEC encoding to the OC block via at least one of: an OC layer, a first OC sublayer in a SDAP layer, a second OC sublayer in a PDCP layer, or a third OC sublayer in a MAC layer.

Figure 23:
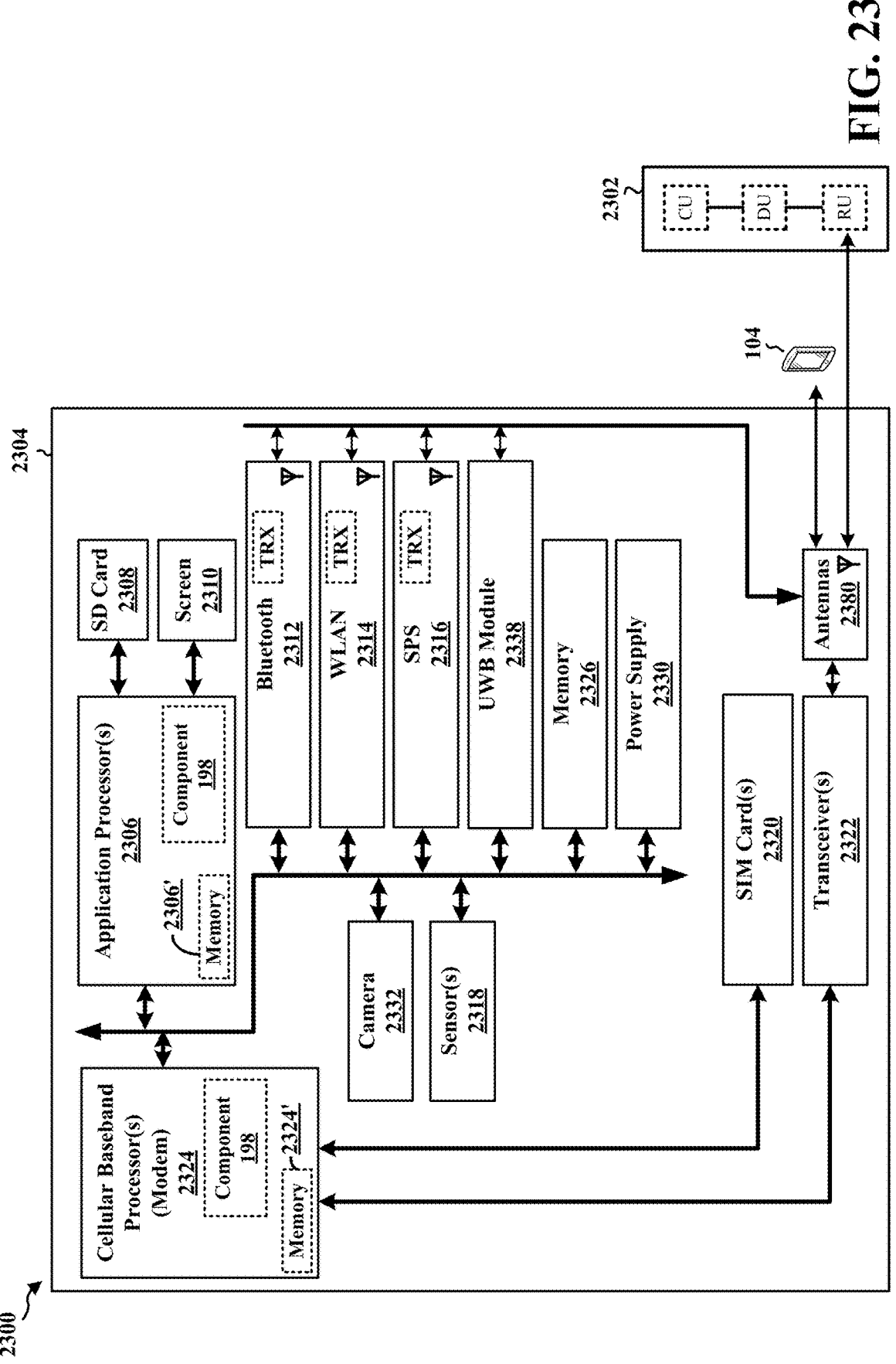
FIG. 23 is a diagram illustrating an example of a hardware implementation for an example apparatus and/or network entity.

FIG. 23 is a diagram 2300 illustrating an example of a hardware implementation for an apparatus 2304. The apparatus 2304 may be a UE, a component of a UE, or may implement UE functionality. In some aspects, the apparatus 2304 may include at least one cellular baseband processor 2324 (also referred to as a modem) coupled to one or more transceivers 2322 (e.g., cellular RF transceiver). The cellular baseband processor(s) 2324 may include at least one on-chip memory 2324'. In some aspects, the apparatus 2304 may further include one or more subscriber identity modules (SIM) cards 2320 and at least one application processor 2306 coupled to a secure digital (SD) card 2308 and a screen 2310. The application processor(s) 2306 may include on-chip memory 2306'. In some aspects, the apparatus 2304 may further include a Bluetooth module 2312, a WLAN module 2314, an ultrawide band (UWB) module 2338, an SPS module 2316 (e.g., GNSS module), one or more sensors 2318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2326, a power supply 2330, and/or a camera 2332. The Bluetooth module 2312, the UWB module 2338, the WLAN module 2314, and the SPS module 2316 may include an on-chip transceiver (TRX) (or in some cases, just a receiver (RX)). The Bluetooth module 2312, the WLAN module 2314, and the SPS module 2316 may include their own dedicated antennas and/or utilize the antennas 2380 for communication. The cellular baseband processor(s) 2324 communicates through the transceiver(s) 2322 via one or more antennas 2380 with the UE 104 and/or with an RU associated with a network entity 2302. The cellular baseband processor(s) 2324 and the application processor(s) 2306 may each include a computer-readable medium/memory 2324', 2306', respectively. The additional memory modules 2326 may also be considered a computer-readable medium/memory. Each computer-readable medium/memory 2324', 2306', 2326 may be non-transitory. The cellular baseband processor(s) 2324 and the application processor(s) 2306 are each responsible for general processing, including the execution of software stored on the computer-readable medium/memory. The software, when executed by the cellular baseband processor(s) 2324/application processor(s) 2306, causes the cellular baseband processor(s) 2324/application processor(s) 2306 to perform the various functions described supra. The cellular baseband processor(s) 2324 and the application processor(s) 2306 are configured to perform the various functions described supra based at least in part of the information stored in the memory. That is, the cellular baseband processor(s) 2324 and the application processor(s) 2306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 2324/application processor(s) 2306 when executing software. The cellular baseband processor(s) 2324/application processor(s) 2306 may be a component of the UE 350 and may include the at least one memory 360 and/or at least one of the TX processor 368, the RX processor 356, and the controller/processor 359. In one configuration, the apparatus 2304 may be at least one processor chip (modem and/or application) and include just the cellular baseband processor(s) 2324 and/or the application processor(s) 2306, and in another configuration, the apparatus 2304 may be the entire UE (e.g., see UE 350 of FIG. 3) and include the additional modules of the apparatus 2304.

As discussed supra, the OC/FEC encoding and decoding component 198 may be configured to segment each PDCP packet in a plurality of PDCP packets into a set of OC symbols, where the plurality of PDCP packets corresponds to a PDU set. The OC/FEC encoding and decoding component 198 may also be configured to assemble multiple sets of OC symbols into an OC block. The OC/FEC encoding and decoding component 198 may also be configured to apply an FEC encoding to the OC block. The OC/FEC encoding and decoding component 198 may also be configured to output the OC block based on the FEC encoding. The OC/FEC encoding and decoding component 198 may be within the cellular baseband processor(s) 2324, the application processor(s) 2306, or both the cellular baseband processor(s) 2324 and the application processor(s) 2306. The OC/FEC encoding and decoding component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2304 may include a variety of components configured for various functions. In one configuration, the apparatus 2304, and in particular the cellular baseband processor(s) 2324 and/or the application processor(s) 2306, may include means for segmenting each PDCP packet in a plurality of PDCP packets into a set of OC symbols, where the plurality of PDCP packets corresponds to a PDU set. The apparatus 2304 may further include means for assembling multiple sets of OC symbols into an OC block. The apparatus 2304 may further include means for applying an FEC encoding to the OC block. The apparatus 2304 may further include means for outputting the OC block based on the FEC encoding.

In one configuration, the means for outputting the OC block based on the FEC encoding may include configuring the apparatus 2304 to transmit the OC block based on the FEC encoding, or store the OC block based on the FEC encoding.

In another configuration, the apparatus 2304 may further include means for transmitting information related to the FEC encoding via a CP message or based on PDU set metadata.

In another configuration, the means for applying the FEC encoding to the OC block may include configuring the apparatus 2304 to apply the FEC encoding to the OC block via an OC sublayer in an RLC layer.

In another configuration, the apparatus 2304 may further include means for adding at least one of an OC header or an RLC header to the OC block, where the OC header may include at least one of: a symbol size (T), a set of source symbols (K), or a symbol index associated with the FEC encoding. In some implementations, the means for adding at least one of the OC header or the RLC header to the OC block may include configuring the apparatus 2304 to add at least one of the OC header or the RLC header to the OC block after the application of the FEC encoding to the OC block. In some implementations, the OC header or the RLC header may indicate segmentation or concatenation information for the set of OC symbols. In some implementations, the apparatus 2304 may further include means for receiving a bit length configuration for a set of OC header fields in the OC header via an RRC message. In some implementations, the OC header or the RLC header may indicate at least one of: whether a set of symbols in the OC block or a payload is a second set of source symbols or a set of parity symbols, whether the payload is protected by OC, or whether an FEC header is present. In some implementations, the OC header may include an indication of a boundary for a PDCP packet in the plurality of PDCP packets. In some implementations, the indication may include at least one of a start indicator of the PDCP packet, or a length indicator of the PDCP packet. In some implementations, the start indicator and the length indicator may be encoded by the FEC encoding. In some implementations, the OC header may include an indication of a boundary for an RLC packet. In some implementations, the OC header may include an OC block index for the OC block.

In another configuration, to apply the FEC encoding to the OC block, the wireless device may apply the FEC encoding to the OC block via at least one of: an OC layer, a first OC sublayer in a SDAP layer, a second OC sublayer in a PDCP layer, or a third OC sublayer in a MAC layer.

The means may be the OC/FEC encoding and decoding component 198 of the apparatus 2304 configured to perform the functions recited by the means. As described supra, the apparatus 2304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 24:
FIG. 24 is a diagram illustrating an example of a hardware implementation for an example network entity.

FIG. 24 is a diagram 2400 illustrating an example of a hardware implementation for a network entity 2402. The network entity 2402 may be a BS, a component of a BS, or may implement BS functionality. The network entity 2402 may include at least one of a CU 2410, a DU 2430, or an RU 2440. For example, depending on the layer functionality handled by the OC/FEC encoding and decoding component 199, the network entity 2402 may include the CU 2410; both the CU 2410 and the DU 2430; each of the CU 2410, the DU 2430, and the RU 2440; the DU 2430; both the DU 2430 and the RU 2440; or the RU 2440. The CU 2410 may include at least one CU processor 2412. The CU processor(s) 2412 may include on-chip memory 2412'. In some aspects, the CU 2410 may further include additional memory modules 2414 and a communications interface 2418. The CU 2410 communicates with the DU 2430 through a midhaul link, such as an F1 interface. The DU 2430 may include at least one DU processor 2432. The DU processor(s) 2432 may include on-chip memory 2432'. In some aspects, the DU 2430 may further include additional memory modules 2434 and a communications interface 2438. The DU 2430 communicates with the RU 2440 through a fronthaul link. The RU 2440 may include at least one RU processor 2442. The RU processor(s) 2442 may include on-chip memory 2442'. In some aspects, the RU 2440 may further include additional memory modules 2444, one or more transceivers 2446, antennas 2480, and a communications interface 2448. The RU 2440 communicates with the UE 104. The on-chip memory 2412', 2432', 2442' and the additional memory modules 2414, 2434, 2444 may each be considered a computer-readable medium/memory. Each computer-readable medium/memory may be non-transitory. Each of the processors 2412, 2432, 2442 is responsible for general processing, including the execution of software stored on the computer-readable medium/memory. The software, when executed by the corresponding processor(s) causes the processor(s) to perform the various functions described supra.

The computer-readable medium/memory may also be used for storing data that is manipulated by the processor(s) when executing software.

As discussed supra, the OC/FEC encoding and decoding component 199 may be configured to segment each PDCP packet in a plurality of PDCP packets into a set of OC symbols, where the plurality of PDCP packets corresponds to a PDU set. The OC/FEC encoding and decoding component 199 may also be configured to assemble multiple sets of OC symbols into an OC block. The OC/FEC encoding and decoding component 199 may also be configured to apply an FEC encoding to the OC block. The OC/FEC encoding and decoding component 199 may also be configured to output the OC block based on the FEC encoding. The OC/FEC encoding and decoding component 199 may be within one or more processors of one or more of the CU 2410, DU 2430, and the RU 2440. The OC/FEC encoding and decoding component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2402 may include a variety of components configured for various functions. In one configuration, the network entity 2402 may include means for segmenting each PDCP packet in a plurality of PDCP packets into a set of OC symbols, where the plurality of PDCP packets corresponds to a PDU set. The network entity 2402 may further include means for assembling multiple sets of OC symbols into an OC block. The network entity 2402 may further include means for applying an FEC encoding to the OC block. The network entity 2402 may further include means for outputting the OC block based on the FEC encoding.

In one configuration, the means for outputting the OC block based on the FEC encoding may include configuring the network entity 2402 to transmit the OC block based on the FEC encoding, or store the OC block based on the FEC encoding.

In another configuration, the network entity 2402 may further include means for transmitting information related to the FEC encoding via a CP message or based on PDU set metadata.

In another configuration, the means for applying the FEC encoding to the OC block may include configuring the network entity 2402 to apply the FEC encoding to the OC block via an OC sublayer in an RLC layer.

In another configuration, the network entity 2402 may further include means for adding at least one of an OC header or an RLC header to the OC block, where the OC header may include at least one of: a symbol size (T), a set of source symbols (K), or a symbol index associated with the FEC encoding. In some implementations, the means for adding at least one of the OC header or the RLC header to the OC block may include configuring the network entity 2402 to add at least one of the OC header or the RLC header to the OC block after the application of the FEC encoding to the OC block. In some implementations, the OC header or the RLC header may indicate segmentation or concatenation information for the set of OC symbols. In some implementations, the network entity 2402 may further include means for receiving a bit length configuration for a set of OC header fields in the OC header via an RRC message. In some implementations, the OC header or the RLC header may indicate at least one of: whether a set of symbols in the OC block or a payload is a second set of source symbols or a set of parity symbols, whether the payload is protected by OC, or whether an FEC header is present. In some implementations, the OC header may include an indication of a boundary for a PDCP packet in the plurality of PDCP packets. In some implementations, the indication may include at least one of a start indicator of the PDCP packet, or a length indicator of the PDCP packet. In some implementations, the start indicator and the length indicator may be encoded by the FEC encoding. In some implementations, the OC header may include an indication of a boundary for an RLC packet. In some implementations, the OC header may include an OC block index for the OC block.

In another configuration, to apply the FEC encoding to the OC block, the wireless device may apply the FEC encoding to the OC block via at least one of: an OC layer, a first OC sublayer in a SDAP layer, a second OC sublayer in a PDCP layer, or a third OC sublayer in a MAC layer.

The means may be the OC/FEC encoding and decoding component 199 of the network entity 2402 configured to perform the functions recited by the means. As described supra, the network entity 2402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 25:
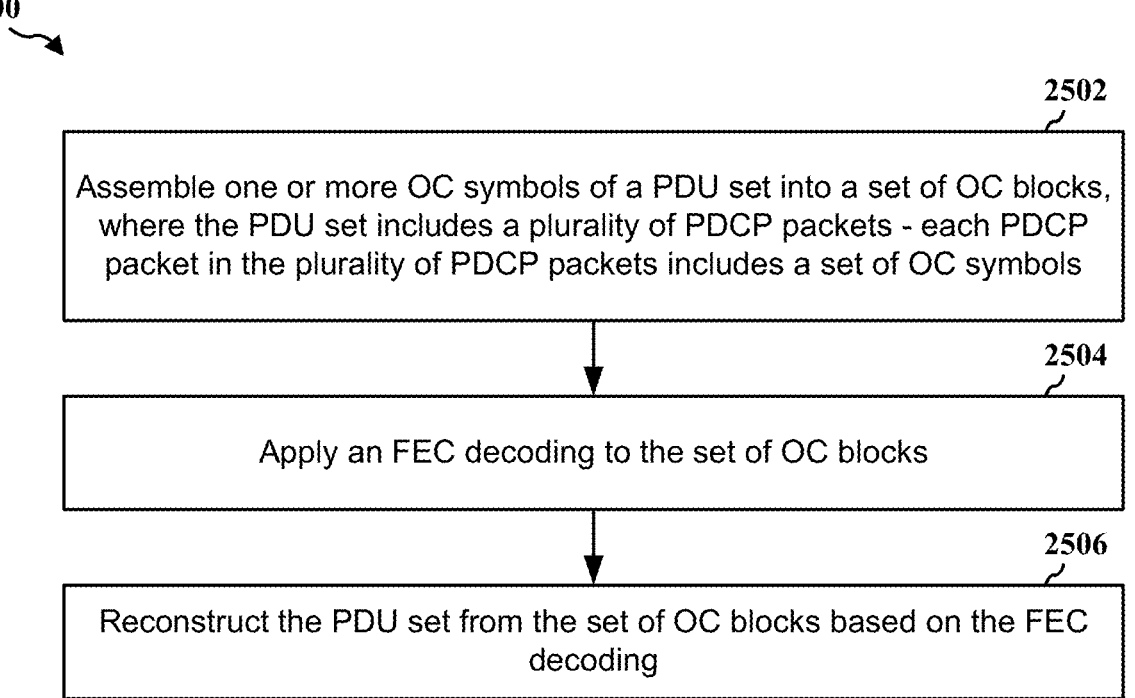
FIG. 25 is a flowchart of a method of wireless communication.

FIG. 25 is a flowchart 2500 of a method of wireless communication. The method may be performed by a wireless device (e.g., the UE 104; the Rx device 1304; the base station 102; the apparatus 2604; the network entity 2702). The method may enable the wireless device (e.g., a receiving wireless device) to apply an FEC decoding to a set of OC blocks and to reconstruct a PDU set based on the set of OC blocks without requesting retransmissions from a transmitting wireless device.

At 2502, the wireless device may assemble one or more OC symbols of a PDU set into a set of OC blocks, where the PDU set includes a plurality of PDCP packets, where each PDCP packet in the plurality of PDCP packets includes a set of OC symbols, such as described in connection with FIGS. 13 and 19. For example, as discussed in connection with 1340 of FIG. 13, the Rx device 1304 may assemble one or more OC symbols of a PDU set into a set of OC blocks, where the PDU set may include a plurality of PDCP packets, and each PDCP packet in the plurality of PDCP packets may include a set of OC symbols. The assembling of the one or more OC symbols may be performed by, e.g., the OC/FEC encoding and decoding component 198, the transceiver(s) 2622, the cellular baseband processor(s) 2624, and/or the application processor(s) 2606 of the apparatus 2604 in FIG. 26, and/or may be performed by, e.g., the OC/FEC encoding and decoding component 199, the transceiver(s) 2746, the RU processor(s) 2742, the DU processor(s) 2732, and/or the CU processor(s) 2712, of the network entity 2702 in FIG. 27.

At 2504, the wireless device may apply an FEC decoding to the set of OC blocks, such as described in connection with FIGS. 13 and 19. For example, as discussed in connection with 1342 of FIG. 13, the Rx device 1304 may apply an FEC decoding to the set of OC blocks. The application of the FEC decoding may be performed by, e.g., the OC/FEC encoding and decoding component 198, the transceiver(s) 2622, the cellular baseband processor(s) 2624, and/or the application processor(s) 2606 of the apparatus 2604 in FIG. 26, and/or may be performed by, e.g., the OC/FEC encoding and decoding component 199, the transceiver(s) 2746, the RU processor(s) 2742, the DU processor(s) 2732, and/or the CU processor(s) 2712, of the network entity 2702 in FIG. 27.

At 2506, the wireless device may reconstruct the PDU set from the set of OC blocks based on the FEC decoding, such as described in connection with FIGS. 13 and 19. For example, as discussed in connection with 1344 of FIG. 13, the Rx device 1304 may reconstruct the PDU set from the set of OC blocks based on the FEC decoding. The reconstruction of the PDU set may be performed by, e.g., the OC/FEC encoding and decoding component 198, the transceiver(s) 2622, the cellular baseband processor(s) 2624, and/or the application processor(s) 2606 of the apparatus 2604 in FIG. 26, and/or may be performed by, e.g., the OC/FEC encoding and decoding component 199, the transceiver(s) 2746, the RU processor(s) 2742, the DU processor(s) 2732, and/or the CU processor(s) 2712, of the network entity 2702 in FIG. 27.

In one example, the wireless device may receive information related to FEC encoding via a CP message or based on PDU set metadata, where the FEC decoding is based on the information related to the FEC encoding.

In another example, to apply the FEC decoding to the set of OC blocks, the wireless device may apply the FEC decoding to the set of OC blocks via an OC sublayer in an RLC layer.

In another example, each OC block in the set of OC blocks may include at least one of an OC header or an RLC header, where the OC header may include at least one of: a symbol size (T), a set of source symbols (K), or a symbol index associated with the FEC decoding. In some implementations, the OC header or the RLC header may indicate segmentation or concatenation information for the set of OC symbols. In some implementations, the OC header or the RLC header may indicate at least one of: whether a set of symbols in an OC block in the set of OC blocks or a payload is a second set of source symbols or a set of parity symbols, whether the payload is protected by OC, or whether an FEC header is present. In some implementations, the OC header may include an indication of a boundary for a PDCP packet in the plurality of PDCP packets. In some implementations, the indication may include at least one of a start indicator of the PDCP packet, or a length indicator of the PDCP packet. In some implementations, the OC header may include an indication of a boundary for an RLC packet. In some implementations, the OC header may include an OC block index for a corresponding OC block.

In another example, to apply the FEC decoding to the set of OC blocks, the wireless device may apply the FEC decoding to the set of OC blocks via at least one of: an OC layer, a first OC sublayer in a SDAP layer, a second OC sublayer in a PDCP layer, or a third OC sublayer in a MAC layer.

Figure 26:
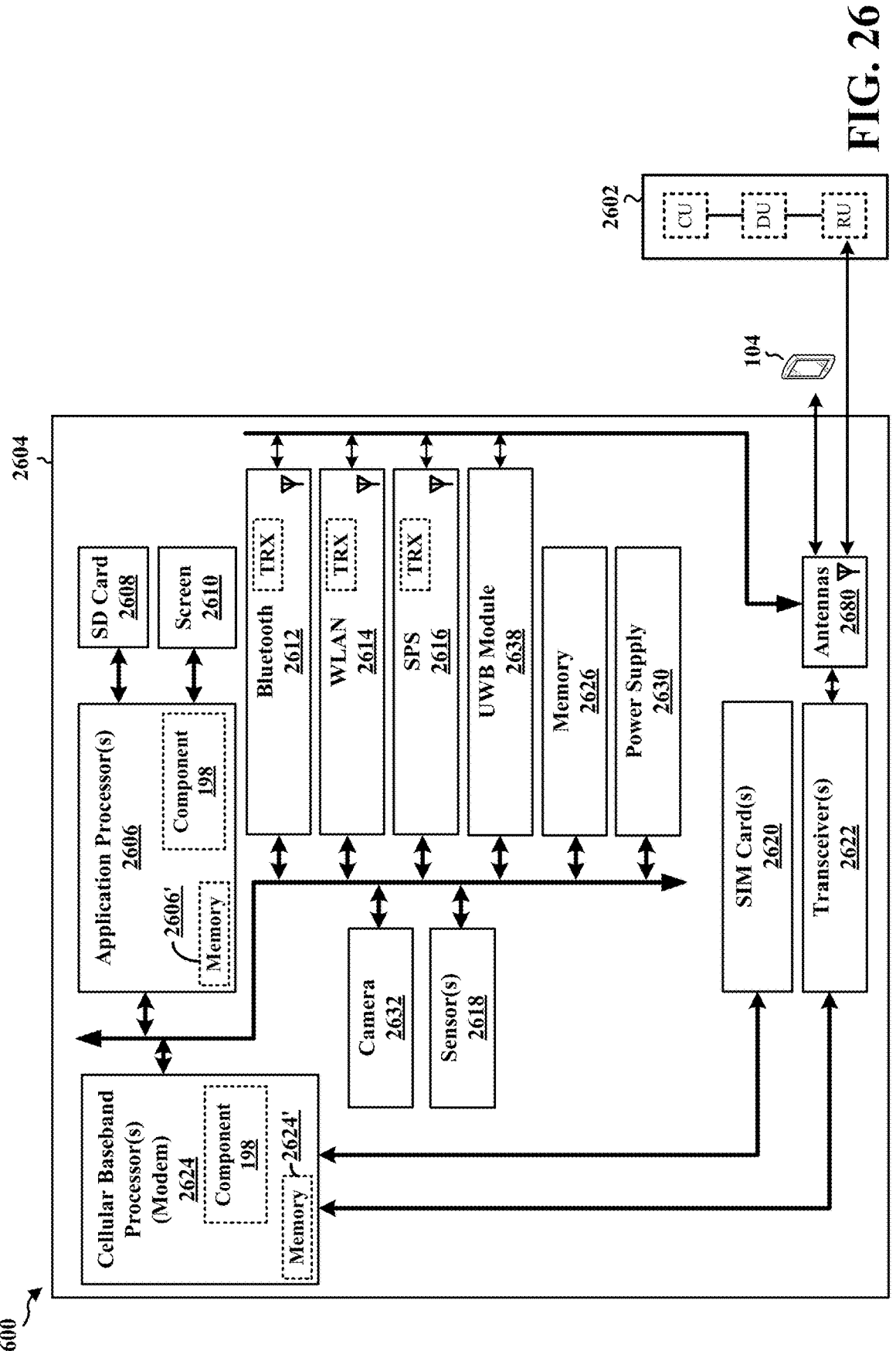
FIG. 26 is a diagram illustrating an example of a hardware implementation for an example apparatus and/or network entity.

FIG. 26 is a diagram 2600 illustrating an example of a hardware implementation for an apparatus 2604. The apparatus 2604 may be a UE, a component of a UE, or may implement UE functionality. In some aspects, the apparatus 2604 may include at least one cellular baseband processor 2624 (also referred to as a modem) coupled to one or more transceivers 2622 (e.g., cellular RF transceiver). The cellular baseband processor(s) 2624 may include at least one on-chip memory 2624'. In some aspects, the apparatus 2604 may further include one or more subscriber identity modules (SIM) cards 2620 and at least one application processor 2606 coupled to a secure digital (SD) card 2608 and a screen 2610. The application processor(s) 2606 may include on-chip memory 2606'. In some aspects, the apparatus 2604 may further include a Bluetooth module 2612, a WLAN module 2614, an ultrawide band (UWB) module 2638, an SPS module 2616 (e.g., GNSS module), one or more sensors 2618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2626, a power supply 2630, and/or a camera 2632. The Bluetooth module 2612, the UWB module 2638, the WLAN module 2614, and the SPS module 2616 may include an on-chip transceiver (TRX) (or in some cases, just a receiver (RX)). The Bluetooth module 2612, the WLAN module 2614, and the SPS module 2616 may include their own dedicated antennas and/or utilize the antennas 2680 for communication. The cellular baseband processor(s) 2624 communicates through the transceiver(s) 2622 via one or more antennas 2680 with the UE 104 and/or with an RU associated with a network entity 2602. The cellular baseband processor(s) 2624 and the application processor(s) 2606 may each include a computer-readable medium/memory 2624', 2606', respectively. The additional memory modules 2626 may also be considered a computer-readable medium/memory. Each computer-readable medium/memory 2624', 2606', 2626 may be non-transitory. The cellular baseband processor(s) 2624 and the application processor(s) 2606 are each responsible for general processing, including the execution of software stored on the computer-readable medium/memory. The software, when executed by the cellular baseband processor(s) 2624/application processor(s) 2606, causes the cellular baseband processor(s) 2624/application processor(s) 2606 to perform the various functions described supra. The cellular baseband processor(s) 2624 and the application processor(s) 2606 are configured to perform the various functions described supra based at least in part of the information stored in the memory. That is, the cellular baseband processor(s) 2624 and the application processor(s) 2606 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 2624/application processor(s) 2606 when executing software. The cellular baseband processor(s) 2624/application processor(s) 2606 may be a component of the UE 350 and may include the at least one memory 360 and/or at least one of the TX processor 368, the RX processor 356, and the controller/processor 359. In one configuration, the apparatus 2604 may be at least one processor chip (modem and/or application) and include just the cellular baseband processor(s) 2624 and/or the application processor(s) 2606, and in another configuration, the apparatus 2604 may be the entire UE (e.g., see UE 350 of FIG. 3) and include the additional modules of the apparatus 2604.

As discussed supra, the OC/FEC encoding and decoding component 198 may be configured to assemble one or more OC symbols of a PDU set into a set of OC blocks, where the PDU set includes a plurality of PDCP packets, where each PDCP packet in the plurality of PDCP packets includes a set of OC symbols. The OC/FEC encoding and decoding component 198 may also be configured to apply an FEC decoding to the set of OC blocks. The OC/FEC encoding and decoding component 198 may also be configured to reconstruct the PDU set from the set of OC blocks based on the FEC decoding. The OC/FEC encoding and decoding component 198 may be within the cellular baseband processor(s) 2624, the application processor(s) 2606, or both the cellular baseband processor(s) 2624 and the application processor(s) 2606. The OC/FEC encoding and decoding component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2604 may include a variety of components configured for various functions. In one configuration, the apparatus 2604, and in particular the cellular baseband processor(s) 2624 and/or the application processor(s) 2606, may include means for assembling one or more OC symbols of a PDU set into a set of OC blocks, where the PDU set includes a plurality of PDCP packets, where each PDCP packet in the plurality of PDCP packets includes a set of OC symbols. The apparatus 2604 may further include means for applying an FEC decoding to the set of OC blocks. The apparatus 2604 may further include means for reconstructing the PDU set from the set of OC blocks based on the FEC decoding.

In one configuration, the apparatus 2604 may further include means for receiving information related to FEC encoding via a CP message or based on PDU set metadata, where the FEC decoding is based on the information related to the FEC encoding.

In another configuration, the means for applying the FEC decoding to the set of OC blocks may include configuring the apparatus 2604 to apply the FEC decoding to the set of OC blocks via an OC sublayer in an RLC layer.

In another configuration, each OC block in the set of OC blocks may include at least one of an OC header or an RLC header, where the OC header may include at least one of: a symbol size (T), a set of source symbols (K), or a symbol index associated with the FEC decoding. In some implementations, the OC header or the RLC header may indicate segmentation or concatenation information for the set of OC symbols. In some implementations, the OC header or the RLC header may indicate at least one of: whether a set of symbols in an OC block in the set of OC blocks or a payload is a second set of source symbols or a set of parity symbols, whether the payload is protected by OC, or whether an FEC header is present. In some implementations, the OC header may include an indication of a boundary for a PDCP packet in the plurality of PDCP packets. In some implementations, the indication may include at least one of a start indicator of the PDCP packet, or a length indicator of the PDCP packet. In some implementations, the OC header may include an indication of a boundary for an RLC packet. In some implementations, the OC header may include an OC block index for a corresponding OC block.

In another configuration, the means for applying the FEC decoding to the set of OC blocks may include configuring the apparatus 2604 to apply the FEC decoding to the set of OC blocks via at least one of: an OC layer, a first OC sublayer in a SDAP layer, a second OC sublayer in a PDCP layer, or a third OC sublayer in a MAC layer.

The means may be the OC/FEC encoding and decoding component 198 of the apparatus 2604 configured to perform the functions recited by the means. As described supra, the apparatus 2604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 27:
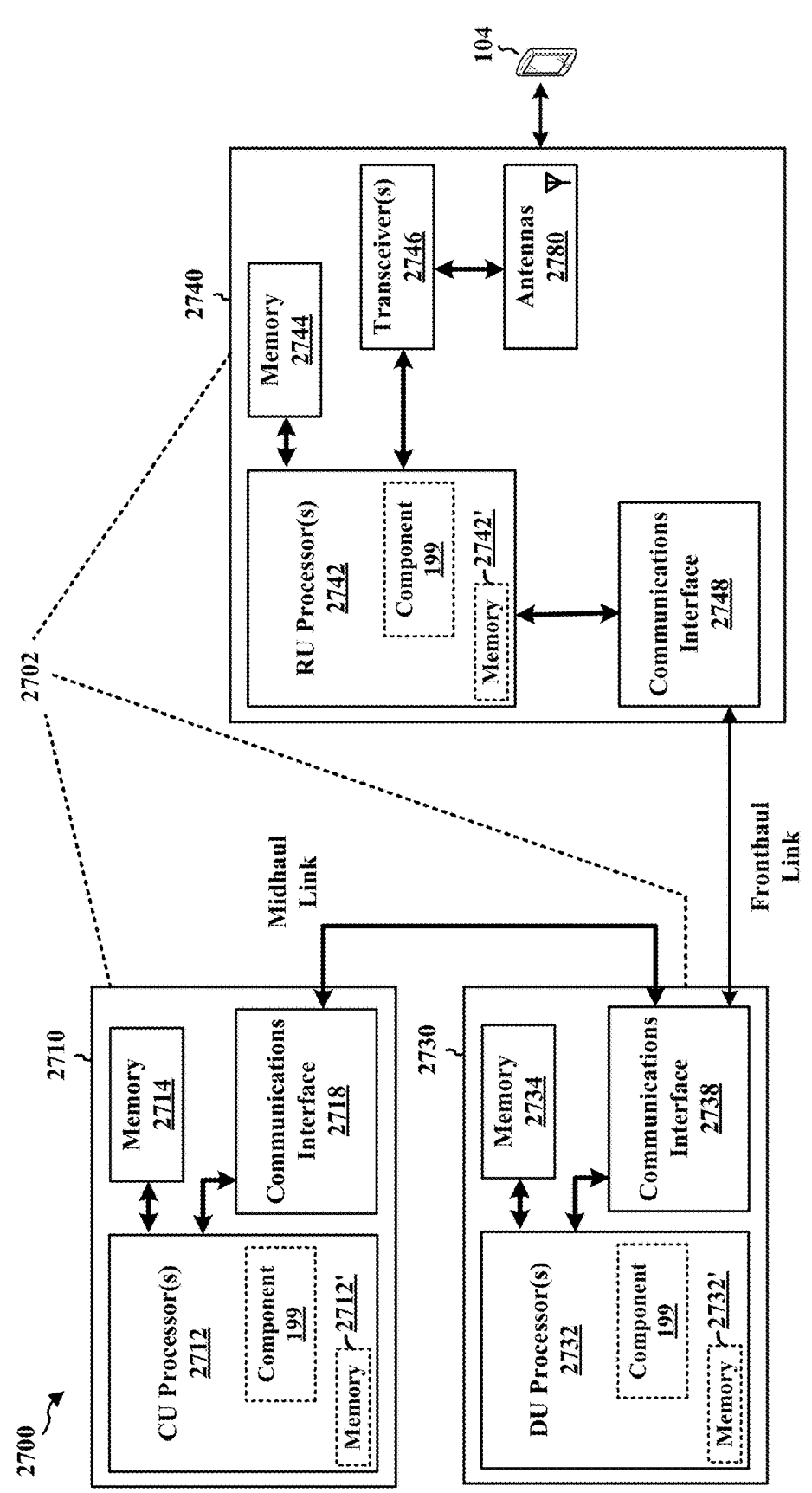
FIG. 27 is a diagram illustrating an example of a hardware implementation for an example network entity.

FIG. 27 is a diagram 2700 illustrating an example of a hardware implementation for a network entity 2702. The network entity 2702 may be a BS, a component of a BS, or may implement BS functionality. The network entity 2702 may include at least one of a CU 2710, a DU 2730, or an RU 2740. For example, depending on the layer functionality handled by the OC/FEC encoding and decoding component 199, the network entity 2702 may include the CU 2710; both the CU 2710 and the DU 2730; each of the CU 2710, the DU 2730, and the RU 2740; the DU 2730; both the DU 2730 and the RU 2740; or the RU 2740. The CU 2710 may include at least one CU processor 2712. The CU processor(s) 2712 may include on-chip memory 2712'. In some aspects, the CU 2710 may further include additional memory modules 2714 and a communications interface 2718. The CU 2710 communicates with the DU 2730 through a midhaul link, such as an F1 interface. The DU 2730 may include at least one DU processor 2732. The DU processor(s) 2732 may include on-chip memory 2732'. In some aspects, the DU 2730 may further include additional memory modules 2734 and a communications interface 2738. The DU 2730 communicates with the RU 2740 through a fronthaul link. The RU 2740 may include at least one RU processor 2742. The RU processor(s) 2742 may include on-chip memory 2742'. In some aspects, the RU 2740 may further include additional memory modules 2744, one or more transceivers 2746, antennas 2780, and a communications interface 2748. The RU 2740 communicates with the UE 104. The on-chip memory 2712', 2732', 2742' and the additional memory modules 2714, 2734, 2744 may each be considered a computer-readable medium/memory. Each computer-readable medium/memory may be non-transitory. Each of the processors 2712, 2732, 2742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the OC/FEC encoding and decoding component 199 may be configured to assemble one or more OC symbols of a PDU set into a set of OC blocks, where the PDU set includes a plurality of PDCP packets, where each PDCP packet in the plurality of PDCP packets includes a set of OC symbols. The OC/FEC encoding and decoding component 199 may also be configured to apply an FEC decoding to the set of OC blocks. The OC/FEC encoding and decoding component 199 may also be configured to reconstruct the PDU set from the set of OC blocks based on the FEC decoding. The OC/FEC encoding and decoding component 199 may be within one or more processors of one or more of the CU 2710, DU 2730, and the RU 2740. The OC/FEC encoding and decoding component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2702 may include a variety of components configured for various functions. In one configuration, the network entity 2702 may include means for assembling one or more OC symbols of a PDU set into a set of OC blocks, where the PDU set includes a plurality of PDCP packets, where each PDCP packet in the plurality of PDCP packets includes a set of OC symbols. The apparatus 2604 may further include means for applying an FEC decoding to the set of OC blocks. The network entity 2702 may further include means for reconstructing the PDU set from the set of OC blocks based on the FEC decoding.

In one configuration, the apparatus 2604 may further include means for receiving information related to FEC encoding via a CP message or based on PDU set metadata, where the FEC decoding is based on the information related to the FEC encoding.

In another configuration, the means for applying the FEC decoding to the set of OC blocks may include configuring the network entity 2702 to apply the FEC decoding to the set of OC blocks via an OC sublayer in an RLC layer.

In another configuration, each OC block in the set of OC blocks may include at least one of an OC header or an RLC header, where the OC header may include at least one of: a symbol size (T), a set of source symbols (K), or a symbol index associated with the FEC decoding. In some implementations, the OC header or the RLC header may indicate segmentation or concatenation information for the set of OC symbols. In some implementations, the OC header or the RLC header may indicate at least one of: whether a set of symbols in an OC block in the set of OC blocks or a payload is a second set of source symbols or a set of parity symbols, whether the payload is protected by OC, or whether an FEC header is present. In some implementations, the OC header may include an indication of a boundary for a PDCP packet in the plurality of PDCP packets. In some implementations, the indication may include at least one of a start indicator of the PDCP packet, or a length indicator of the PDCP packet. In some implementations, the OC header may include an indication of a boundary for an RLC packet. In some implementations, the OC header may include an OC block index for a corresponding OC block.

In another configuration, the means for applying the FEC decoding to the set of OC blocks may include configuring the network entity 2702 to apply the FEC decoding to the set of OC blocks via at least one of: an OC layer, a first OC sublayer in a SDAP layer, a second OC sublayer in a PDCP layer, or a third OC sublayer in a MAC layer.

The means may be the OC/FEC encoding and decoding component 199 of the network entity 2702 configured to perform the functions recited by the means. As described supra, the network entity 2702 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A. B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, comprising: segmenting each packet data convergence protocol (PDCP) packet in a plurality of PDCP packets into a set of outer coding (OC) symbols, wherein the plurality of PDCP packets corresponds to a packet data unit (PDU) set; assembling multiple sets of OC symbols into an OC block; applying a forward error correction (FEC) encoding to the OC block; and outputting the OC block based on the FEC encoding.

Aspect 2 is the method of aspect 1, wherein outputting the OC block based on the FEC encoding comprises: transmitting the OC block based on the FEC encoding; or storing the OC block based on the FEC encoding.

Aspect 3 is the method of aspect 1 or aspect 2, further comprising: transmitting information related to the FEC encoding via a control plane (CP) message or based on PDU set metadata.

Aspect 4 is the method of any of aspects 1 to 3, wherein applying the FEC encoding to the OC block comprises: applying the FEC encoding to the OC block via an OC sublayer in a radio link control (RLC) layer.

Aspect 5 is the method of any of aspects 1 to 4, further comprising: adding at least one of an OC header or a radio link control (RLC) header to the OC block, wherein the OC header includes at least one of: a symbol size (T), a set of source symbols (K), or a symbol index associated with the FEC encoding.

Aspect 6 is the method of any of aspects 1 to 5, wherein adding at least one of the OC header or the RLC header to the OC block comprises: adding at least one of the OC header or the RLC header to the OC block after the application of the FEC encoding to the OC block.

Aspect 7 is the method of any of aspects 1 to 6, wherein the OC header or the RLC header indicates segmentation or concatenation information for the set of OC symbols.

Aspect 8 is the method of any of aspects 1 to 7, further comprising: receiving a bit length configuration for a set of OC header fields in the OC header via a radio resource control (RRC) message.

Aspect 9 is the method of any of aspects 1 to 8, wherein the OC header or the RLC header indicates at least one of: whether a set of symbols in the OC block or a payload is a second set of source symbols or a set of parity symbols, whether the payload is protected by OC, or whether an FEC header is present.

Aspect 10 is the method of any of aspects 1 to 9, wherein the OC header includes an indication of a boundary for a PDCP packet in the plurality of PDCP packets.

Aspect 11 is the method of any of aspects 1 to 10, wherein the indication includes at least one of a start indicator of the PDCP packet, or a length indicator of the PDCP packet.

Aspect 12 is the method of any of aspects 1 to 11, wherein the start indicator and the length indicator are encoded by the FEC encoding.

Aspect 13 is the method of any of aspects 1 to 12, wherein the OC header includes an indication of a boundary for an RLC packet.

Aspect 14 is the method of any of aspects 1 to 13, wherein the OC header includes an OC block index for the OC block.

Aspect 15 is the method of any of aspects 1 to 14, wherein applying the FEC encoding to the OC block comprises: applying the FEC encoding to the OC block via at least one of: an OC layer, a first OC sublayer in a service data adaption protocol (SDAP) layer, a second OC sublayer in a PDCP layer, or a third OC sublayer in a medium access control (MAC) layer.

Aspect 16 is an apparatus for wireless communication at a wireless device, including: at least one memory; and at least one processor coupled to the at least one memory and, based at least in part on information stored in the at least one memory, the at least one processor, individually or in any combination, is configured to implement any of aspects 1 to 15.

Aspect 17 is the apparatus of aspect 16, further including at least one of a transceiver or an antenna coupled to the at least one processor.

Aspect 18 is an apparatus for wireless communication including means for implementing any of aspects 1 to 15.

Aspect 19 is a computer-readable medium (e.g., a non-transitory computer-readable medium) storing computer executable code, where the code when executed by a processor causes the processor to implement any of aspects 1 to 15.

Aspect 20 is a method of wireless communication at a wireless device, comprising: assembling one or more outer coding (OC) symbols of a packet data unit (PDU) set into a set of OC blocks, wherein the PDU set includes a plurality of packet data convergence protocol (PDCP) packets, wherein each PDCP packet in the plurality of PDCP packets includes a set of OC symbols; applying a forward error correction (FEC) decoding to the set of OC blocks; and reconstructing the PDU set from the set of OC blocks based on the FEC decoding.

Aspect 21 is the method of aspect 20, further comprising: receiving information related to FEC encoding via a control plane (CP) message or based on PDU set metadata, wherein the FEC decoding is based on the information related to the FEC encoding.

Aspect 22 is the method of aspect 20 or aspect 21, wherein applying the FEC decoding to the set of OC blocks comprises: applying the FEC decoding to the set of OC blocks via an OC sublayer in a radio link control (RLC) layer.

Aspect 23 is the method of any of aspects 20 to 22, wherein each OC block in the set of OC blocks includes at least one of an OC header or a radio link control (RLC) header, wherein the OC header includes at least one of: a symbol size (T), a set of source symbols (K), or a symbol index associated with the FEC decoding.

Aspect 24 is the method of any of aspects 20 to 23, wherein the OC header or the RLC header indicates segmentation or concatenation information for the set of OC symbols.

Aspect 25 is the method of any of aspects 20 to 24, wherein the OC header or the RLC header indicates at least one of: whether a set of symbols in an OC block in the set of OC blocks or a payload is a second set of source symbols or a set of parity symbols, whether the payload is protected by OC, or whether an FEC header is present.

Aspect 26 is the method of any of aspects 20 to 25, wherein the OC header includes an indication of a boundary for a PDCP packet in the plurality of PDCP packets.

Aspect 27 is the method of any of aspects 20 to 26, wherein the indication includes at least one of a start indicator of the PDCP packet, or a length indicator of the PDCP packet.

Aspect 28 is the method of any of aspects 20 to 27, wherein the OC header includes an indication of a boundary for an RLC packet.

Aspect 29 is the method of any of aspects 20 to 28, wherein the OC header includes an OC block index for a corresponding OC block.

Aspect 30 is the method of any of aspects 20 to 29, wherein applying the FEC decoding to the set of OC blocks comprises: applying the FEC decoding to the set of OC blocks via at least one of: an OC layer, a first OC sublayer in a service data adaption protocol (SDAP) layer, a second OC sublayer in a PDCP layer, or a third OC sublayer in a medium access control (MAC) layer.

Aspect 31 is an apparatus for wireless communication at a wireless device, including: at least one memory; and at least one processor coupled to the at least one memory and, based at least in part on information stored in the at least one memory, the at least one processor, individually or in any combination, is configured to implement any of aspects 20 to 30.

Aspect 32 is the apparatus of aspect 31, further including at least one of a transceiver or an antenna coupled to the at least one processor.

Aspect 33 is an apparatus for wireless communication including means for implementing any of aspects 20 to 30.

Aspect 34 is a computer-readable medium (e.g., a non-transitory computer-readable medium) storing computer executable code, where the code when executed by a processor causes the processor to implement any of aspects 20 to 30.

What is claimed is:

1. An apparatus for wireless communication at a wireless device, comprising:
   at least one memory; and
   at least one processor coupled to the at least one memory, wherein the at least one processor is configured to:
   segment each packet data convergence protocol (PDCP) packet in a plurality of PDCP packets into a set of outer coding (OC) symbols, wherein the plurality of PDCP packets corresponds to a packet data unit (PDU) set;
   assemble multiple sets of OC symbols into an OC block;
   apply a forward error correction (FEC) encoding to the OC block;
   add an OC header or a radio link control (RLC) header to the OC block, wherein the OC header or the RLC header includes an indication of a boundary for each PDCP packet in the plurality of PDCP packets, wherein the indication includes at least one of a start indicator of each PDCP packet in the plurality of PDCP packets or a length indicator of each PDCP packet in the plurality of PDCP packets; and
   output the OC block based on the FEC encoding.

2. The apparatus of claim 1, wherein to output the OC block based on the FEC encoding, the at least one processor, individually or in any combination, is configured to:

transmit the OC block based on the FEC encoding; or
   store the OC block based on the FEC encoding.

3. The apparatus of claim 1, wherein the at least one processor, individually or in any combination, is further configured to:
   transmit information related to the FEC encoding via a control plane (CP) message or based on PDU set metadata.

4. The apparatus of claim 1, wherein to apply the FEC encoding to the OC block, the at least one processor, individually or in any combination, is configured to:
   apply the FEC encoding to the OC block via an OC sublayer in a radio link control (RLC) layer.

5. The apparatus of claim 1, wherein the OC header or the RLC header further indicates segmentation or concatenation information for the set of OC symbols.

6. The apparatus of claim 1, wherein the at least one processor, individually or in any combination, is further configured to:
   receive a bit length configuration for a set of OC header fields in the OC header via a radio resource control (RRC) message.

7. The apparatus of claim 1, wherein the OC header or the RLC header indicates at least one of:
   whether a set of symbols in the OC block or a payload is a second set of source symbols or a set of parity symbols,
   whether the payload is protected by OC, or
   whether an FEC header is present.

8. The apparatus of claim 1, wherein the OC header or the RLC header includes a symbol size (T), a set of source symbols (K), and a symbol index associated with the FEC encoding.

9. The apparatus of claim 1, wherein the start indicator and the length indicator are encoded by the FEC encoding.

10. The apparatus of claim 1, wherein the OC header includes an second indication of a second boundary for an RLC packet.

11. The apparatus of claim 1, wherein the OC header includes an OC block index for the OC block.

12. The apparatus of claim 1, wherein to apply the FEC encoding to the OC block, the at least one processor, individually or in any combination, is configured to:
   apply the FEC encoding to the OC block via at least one of:
      an OC layer,
      a first OC sublayer in a service data adaption protocol (SDAP) layer,
      a second OC sublayer in a PDCP layer, or
      a third OC sublayer in a medium access control (MAC) layer.

13. The apparatus of claim 1, further comprising a transceiver coupled to the at least one processor, wherein to output the OC block, the at least one processor, individually or in any combination, is configured to:
   output the OC block via the transceiver.

14. A method of wireless communication at a wireless device, comprising:
   segmenting each packet data convergence protocol (PDCP) packet in a plurality of PDCP packets into a set of outer coding (OC) symbols, wherein the plurality of PDCP packets corresponds to a packet data unit (PDU) set;
   assembling multiple sets of OC symbols into an OC block;
   applying a forward error correction (FEC) encoding to the OC block;

adding an OC header or a radio link control (RLC) header to the OC block, wherein the OC header or the RLC header includes an indication of a boundary for each PDCP packet in the plurality of PDCP packets, wherein the indication includes at least one of a start indicator of each PDCP packet in the plurality of PDCP packets or a length indicator of each PDCP packet in the plurality of PDCP packets; and outputting the OC block based on the FEC encoding.

15. An apparatus for wireless communication at a wireless device, comprising:

at least one memory; and at least one processor coupled to the at least one memory, wherein the at least one processor, individually or in any combination, is configured to:

assemble one or more outer coding (OC) symbols of a packet data unit (PDU) set into a set of OC blocks, wherein the PDU set includes a plurality of packet data convergence protocol (PDCP) packets, wherein each PDCP packet in the plurality of PDCP packets includes a set of OC symbols, wherein each OC block in the set of OC blocks includes at least one of an OC header or a radio link control (RLC) header, wherein the OC header or the RLC header includes an indication of a boundary for each PDCP packet in the plurality of PDCP packets, wherein the indication includes at least one of a start indicator of each PDCP packet in the plurality of PDCP packets or a length indicator of each PDCP packet in the plurality of PDCP packets;

apply a forward error correction (FEC) decoding to the set of OC blocks; and reconstruct the PDU set from the set of OC blocks based on the FEC decoding.

16. The apparatus of claim 15, wherein the at least one processor, individually or in any combination, is further configured to:

receive information related to FEC encoding via a control plane (CP) message or based on PDU set metadata, wherein the FEC decoding is based on the information related to the FEC encoding.

17. The apparatus of claim 15, wherein to apply the FEC decoding to the set of OC blocks, the at least one processor, individually or in any combination, is configured to:

apply the FEC decoding to the set of OC blocks via an OC sublayer in a radio link control (RLC) layer.

18. The apparatus of claim 15, wherein the OC header or the RLC header further indicates segmentation or concatenation information for the set of OC symbols.

19. The apparatus of claim 15, wherein the OC header or the RLC header indicates at least one of:

whether a set of symbols in an OC block in the set of OC blocks or a payload is a second set of source symbols or a set of parity symbols, whether the payload is protected by OC, or whether an FEC header is present.

20. The apparatus of claim 15, wherein the OC header or the RLC header includes a symbol size (T), a set of source symbols (K), and a symbol index associated with a FEC decoding.

21. The apparatus of claim 15, wherein the OC header includes second indication of a second boundary for an RLC packet.

22. The apparatus of claim 15, wherein the OC header includes an OC block index for a corresponding OC block.

23. The apparatus of claim 15, wherein to apply the FEC decoding to the set of OC blocks, the at least one processor, individually or in any combination, is configured to:

apply the FEC decoding to the set of OC blocks via at least one of:

an OC layer, a first OC sublayer in a service data adaption protocol (SDAP) layer, a second OC sublayer in a PDCP layer, or a third OC sublayer in a medium access control (MAC) layer.

24. The apparatus of claim 15, further comprising a transceiver coupled to the at least one processor, wherein the at least one processor, individually or in any combination, is further configured to:

receive the one or more OC symbols via the transceiver.

25. A method of wireless communication at a wireless device, comprising:

assembling one or more outer coding (OC) symbols of a packet data unit (PDU) set into a set of OC blocks, wherein the PDU set includes a plurality of packet data convergence protocol (PDCP) packets, wherein each PDCP packet in the plurality of PDCP packets includes a set of OC symbols, wherein each OC block in the set of OC blocks includes at least one of an OC header or a radio link control (RLC) header, wherein the OC header or the RLC header includes an indication of a boundary for each PDCP packet in the plurality of PDCP packets, wherein the indication includes at least one of a start indicator of each PDCP packet in the plurality of PDCP packets or a length indicator of each PDCP packet in the plurality of PDCP packets;

applying a forward error correction (FEC) decoding to the set of OC blocks; and reconstructing the PDU set from the set of OC blocks based on the FEC decoding.

* * * * *